US012735283B2

United States Patent
(12) United States Patent
Gamliel et al.

(10) Patent No.: US 12,735,283 B2
(45) Date of Patent: Sep. 15, 2026

(54) DOCK LEVELER WITH REINFORCED LIP PLATE

(71) Applicant: Overhead Door Corporation, Lewisville, TX (US)

(72) Inventors: Dor Gamliel, Dallas, TX (US); Keith T. Kee, Dallas, TX (US)

(73) Assignee: Overhead Door Corporation, Lewisville, TX (US)

(*) Notice: Subject to any disclaimer, the term of this patent is extended or adjusted under 35 U.S.C. 154(b) by 616 days.

(21) Appl. No.: 18/332,480

(22) Filed: Jun. 9, 2023

(65) Prior Publication Data

US 2024/0409340 A1 Dec. 12, 2024

(51) Int. Cl.
*B65G 69/28* (2006.01)

(52) U.S. Cl.
CPC ................................ *B65G 69/2858* (2013.01)

(58) Field of Classification Search
CPC .................................................. B65G 69/2858
USPC .................................................. 14/69.5–71.5
See application file for complete search history.

(56) References Cited

U.S. PATENT DOCUMENTS 2,644,971 A 7/1953 Rowe
3,021,545 A * 2/1962 Le Clear ............ B65G 69/2858 14/71.3
3,071,790 A 1/1963 Le Clear
3,137,017 A 6/1964 Pfleger
3,235,896 A 2/1966 Riggs
3,255,478 A * 6/1966 Lambert ............ B65G 69/2823 14/71.7
3,316,575 A 5/1967 Larsen
3,323,158 A 6/1967 Loomis
3,334,368 A 8/1967 Mcintosh
3,368,229 A 2/1968 Pfleger
3,411,168 A 11/1968 Hecker, Jr.
3,460,175 A 8/1969 Beckwith
3,475,778 A 11/1969 Merrick
3,486,181 A 12/1969 Hecker, Jr.
3,493,984 A 2/1970 Reinhard
3,500,486 A 3/1970 Le Clear
3,516,103 A 6/1970 Hecker, Jr.
3,570,033 A 3/1971 Hovestad
3,583,014 A 6/1971 Brown
3,587,126 A 6/1971 Potter
3,636,578 A 1/1972 Dieter
3,646,627 A 3/1972 Potter
3,665,538 A 5/1972 Smith
3,766,585 A 10/1973 Yoon
3,786,530 A 1/1974 Leclear
3,835,497 A 9/1974 Smith
3,839,761 A 10/1974 Stevenson
(Continued)

OTHER PUBLICATIONS

US 9,376,274 B1, 06/2016, Stone (withdrawn)

*Primary Examiner* — Raymond W Addie
(74) *Attorney, Agent, or Firm* — Haynes and Boone, LLP

(57) ABSTRACT

A dock leveler comprises a deck plate and a lip assembly hingedly connected to the deck plate. The lip assembly comprises a lip plate and a lip subplate. The lip plate includes a traction side and a bottom side and has a lip plate crown. The lip subplate includes a top side and a bottom side and has a lip subplate crown. The lip subplate is coupled to a bottom side of the lip plate in a manner that provides structural rigidity to the lip plate. The lip subplate crown is aligned and nested with the lip plate crown.

20 Claims, 57 Drawing Sheets

(56) References Cited

U.S. PATENT DOCUMENTS

| | | | | |
|---|---|---|---|---|
| 3,858,264 | A | 1/1975 | Kuhns | |
| 3,882,563 | A | 5/1975 | Smith | |
| 3,883,917 | A | 5/1975 | Alten | |
| 3,921,241 | A | 11/1975 | Smith | |
| 3,967,337 | A | 7/1976 | Artzberger | |
| 3,974,537 | A | 8/1976 | Ellis | |
| 3,982,295 | A | 9/1976 | Burnham | |
| 3,997,932 | A | 12/1976 | Artzberger | |
| 4,014,059 | A | 3/1977 | Artzberger | |
| 4,065,824 | A | 1/1978 | Ellis | |
| 4,068,338 | A | 1/1978 | Artzberger | |
| 4,081,874 | A | 4/1978 | Artzberger | |
| 4,091,488 | A | 5/1978 | Artzberger | |
| 4,126,909 | A | 11/1978 | Smith | |
| RE30,104 | E | 10/1979 | Burnham | |
| 4,257,137 | A | 3/1981 | Hipp | |
| 4,398,315 | A | 8/1983 | Driear | |
| 4,402,100 | A | 9/1983 | Slusar | |
| 4,450,598 | A * | 5/1984 | Larsen | B65G 69/287 14/71.1 |
| 4,455,703 | A | 6/1984 | Fromme | |
| 4,525,887 | A | 7/1985 | Erlandsson | |
| 4,531,248 | A | 7/1985 | Swessel | |
| 4,570,277 | A | 2/1986 | Hahn | |
| 4,665,579 | A | 5/1987 | Bennett | |
| 4,689,846 | A | 9/1987 | Sherrod | |
| 4,703,534 | A | 11/1987 | Pedersen | |
| 4,776,052 | A | 10/1988 | Delgado | |
| 4,847,935 | A | 7/1989 | Alexander | |
| 4,865,507 | A | 9/1989 | Trickle | |
| 4,935,979 | A | 6/1990 | Walker | |
| 4,937,906 | A | 7/1990 | Alexander | |
| 4,974,276 | A | 12/1990 | Alexander | |
| 5,040,258 | A | 8/1991 | Hahn | |
| 5,117,526 | A | 6/1992 | Alexander | |
| 5,123,135 | A | 6/1992 | Cook | |
| 5,195,205 | A | 3/1993 | Cook | |
| 5,214,818 | A | 6/1993 | Cook | |
| 5,274,867 | A | 1/1994 | Hageman | |
| 5,303,443 | A | 4/1994 | Alexander | |
| 5,311,628 | A | 5/1994 | Springer | |
| 5,317,775 | A | 6/1994 | das Dores | |
| 5,343,583 | A | 9/1994 | Cook | |
| 5,440,772 | A | 8/1995 | Springer | |
| 5,450,643 | A | 9/1995 | Warner | |
| 5,551,113 | A | 9/1996 | Marler | |
| 5,560,063 | A | 10/1996 | Alten | |
| 5,586,355 | A | 12/1996 | Metz | |
| 5,621,938 | A | 4/1997 | Warner | |
| 5,644,812 | A | 7/1997 | Neufeldt | |
| 5,657,502 | A | 8/1997 | Ellis | |
| 6,061,859 | A | 5/2000 | Winter | |
| 6,085,375 | A | 7/2000 | Holm | |
| 6,098,227 | A | 8/2000 | Meichtry | |
| 6,112,353 | A | 9/2000 | Winter | |
| 6,125,491 | A | 10/2000 | Alexander | |
| 6,163,913 | A | 12/2000 | Disieno | |
| 6,205,606 | B1 | 3/2001 | Zibella | |
| 6,240,587 | B1 | 6/2001 | Meichtry | |
| 6,327,733 | B1 | 12/2001 | Alexander | |
| 6,368,043 | B1 | 4/2002 | Leum | |
| 6,405,397 | B1 | 6/2002 | Alexander | |
| 6,442,783 | B1 * | 9/2002 | Yoon | B65G 69/2841 14/71.1 |
| 6,473,926 | B2 | 11/2002 | Lounsbury | |
| 6,481,038 | B2 | 11/2002 | Lounsbury | |
| 6,487,741 | B2 | 12/2002 | Alexander | |
| 6,629,328 | B2 | 10/2003 | Widule | |
| 6,711,774 | B2 | 3/2004 | Hodges | |
| 6,760,944 | B2 | 7/2004 | Hodges | |
| 6,769,149 | B2 | 8/2004 | Alexander | |
| 6,820,295 | B2 | 11/2004 | Webster | |
| 6,834,409 | B2 | 12/2004 | Gleason | |
| 6,892,411 | B1 | 5/2005 | Yoon | |
| 6,910,239 | B2 | 6/2005 | Hodges | |
| 6,931,686 | B2 | 8/2005 | Hoofard | |
| 6,951,041 | B2 | 10/2005 | Hoofard | |
| 6,973,693 | B1 | 12/2005 | Mayer | |
| 6,988,289 | B2 | 1/2006 | Pedersen | |
| 7,013,519 | B2 | 3/2006 | Gleason | |
| 7,017,220 | B2 | 3/2006 | Alexander | |
| 7,032,267 | B2 | 4/2006 | Mitchell | |
| 7,043,790 | B2 | 5/2006 | Alexander | |
| 7,047,584 | B2 | 5/2006 | Hoofard | |
| 7,062,813 | B2 | 6/2006 | Hoofard | |
| 7,100,233 | B2 | 9/2006 | Alexander | |
| 7,131,160 | B2 | 11/2006 | Alexander | |
| 7,134,159 | B2 | 11/2006 | Muhl | |
| 7,162,761 | B2 | 1/2007 | Alexander | |
| 7,213,285 | B2 | 5/2007 | Mitchell | |
| 7,213,286 | B2 | 5/2007 | Hoofard | |
| 7,216,392 | B2 | 5/2007 | Hoofard | |
| 7,225,493 | B2 | 6/2007 | Hoofard | |
| 7,353,558 | B2 | 4/2008 | Alexander | |
| 7,363,670 | B2 | 4/2008 | Mitchell | |
| 7,409,739 | B2 | 8/2008 | Whitley | |
| D579,754 | S | 11/2008 | Gleason | |
| 7,546,655 | B2 | 6/2009 | Mitchell | |
| 7,657,957 | B2 | 2/2010 | Alexander | |
| 7,865,992 | B1 | 1/2011 | Ion | |
| 7,926,140 | B2 | 4/2011 | Whitley | |
| 7,996,943 | B2 | 8/2011 | Wallis | |
| 8,132,280 | B2 | 3/2012 | Gleason | |
| 8,141,189 | B2 | 3/2012 | Mitchell | |
| 8,327,486 | B2 | 12/2012 | Fontaine | |
| 8,407,842 | B2 | 4/2013 | Story | |
| 8,544,130 | B2 | 10/2013 | Sveum | |
| 8,627,529 | B1 | 1/2014 | Palmersheim | |
| 9,150,368 | B2 | 10/2015 | Hodges | |
| 9,284,135 | B2 | 3/2016 | Sveum | |
| 9,546,056 | B2 | 1/2017 | Stone | |
| 9,938,094 | B1 | 4/2018 | Leum | |
| 9,944,475 | B1 | 4/2018 | Leum | |
| 10,040,646 | B2 | 8/2018 | Yule | |
| 10,597,242 | B1 | 3/2020 | Sivakumar | |
| 11,273,999 | B1 | 3/2022 | Leum | |
| 11,511,954 | B2 | 11/2022 | Leum | |
| 2005/0011020 | A1 | 1/2005 | Alexander | |
| 2005/0132512 | A1 | 6/2005 | Muhl et al. | |
| 2005/0160540 | A1 | 7/2005 | Hoofard | |
| 2005/0251934 | A1 | 11/2005 | Yoon | |
| 2005/0273949 | A1 | 12/2005 | Gleason | |
| 2006/0042030 | A1 | 3/2006 | Yoon | |
| 2006/0045678 | A1 | 3/2006 | Andersen | |
| 2006/0156493 | A1 | 7/2006 | Alexander | |
| 2007/0017043 | A1 | 1/2007 | Alexander | |
| 2007/0017044 | A1 | 1/2007 | Alexander | |
| 2007/0226923 | A1 | 10/2007 | Alexander | |
| 2015/0013083 | A1 | 1/2015 | Palmersheim | |
| 2017/0073176 | A1 | 3/2017 | Yule | |
| 2022/0332528 | A1 | 10/2022 | Shahbazian | |

* cited by examiner

DOCK LEVELER WITH REINFORCED LIP PLATE

FIELD

The present disclosure is directed to loading and unloading operations, and more particularly to systems and methods relating to dock levelers.

BACKGROUND

Dock levelers bridge the gap between a loading dock and a movable platform such as a trailer, a truck bed, or a boat, among other things, allowing for the safe and efficient transfer of goods. They are commonly used at warehouses, distribution centers, and other facilities where large quantities of goods need to be loaded and unloaded. Dock levelers also compensate for up and down float of the transport during loading and unloading. Dock levelers typically consist of a metal plate that is raised and lowered. There are several types of dock levelers available, including pit-style, vertical-storing, and edge-of-dock levelers. The choice of leveler will depend on factors such as the facility layout, the types of vehicles being loaded and unloaded, and the frequency and volume of goods being handled.

Pit-style levelers are installed in a recessed pit at the edge of the loading dock. When not in use, the leveler is stored in the pit, flush with the floor. When a truck or trailer is positioned at the dock, the leveler is raised hydraulically or mechanically, creating a bridge between the dock and the vehicle. Vertical-storing levelers are similar to pit-style levelers in that they are installed in a recessed pit at the edge of the dock. However, instead of swinging out horizontally, these levelers raise and lower vertically, storing above the dock level when not in use. This type of leveler is often used in facilities where temperature control is important, as it can create a seal at the dock door when the leveler is in use. Edge-of-dock levelers are installed directly onto the edge of the loading dock, making them a good option for facilities where a recessed pit is not practical. Edge-of-dock levelers do not require a pre-formed pit in the dock and can be utilized with existing docks. Edge-of-dock levelers are typically less expensive and easier to install than pit-style or vertical-storing levelers.

Dock levelers, due to their hinged nature, often struggle to sufficiently handle the weight that traverses back and forth from the dock to the truck/trailer. Therefore, there is a need to reinforce and spread forces along the deck plate and other portions of dock levelers.

Dock levelers are heavy and exert significant internal impact, dynamic, and static loads when operated. Furthermore, dock levelers, due to their geometry, require support at locations lower on the face plate than the face plate would otherwise need to extend. This results in increased material costs when manufacturing the face plate as well as significant stresses at the point of attachment to the face plate. Therefore, there is a need to reduce material costs during manufacturing and a need to reduce the internal loads felt by dock levelers.

Dock levelers sometimes use springs for assistance in lifting and lowering the lip. The springs are often manufactured with at least one conical end, to facilitate attachment to other components. There are difficulties presented in manufacturing conical-ended springs. Further, the conical portion increases material costs. Furthermore, the spring constant of the spring will vary and decrease across the conical portion of the spring. Therefore, there is a need to simplify the manufacturing of dock leveler springs as well as a need to reduce material costs during manufacturing of dock leveler springs. Additionally, there is a need to increase and make uniform the spring constant across the length of dock leveler springs.

Dock levelers are often manually operated. Manual operation of dock levelers presents a number of difficulties. For example, mechanisms used to lift the dock levelers which are left in a stowed position can become burred and sharp at places where an operator interacts with the lift mechanism. Furthermore, continually retrieving a lift mechanism from a stowed position requires repetitive bending and squatting by the operator. Additionally, lift mechanism can easily be lost and misplaced. Therefore, there is a need to reduce burring in various lifting mechanisms, reduce bending and squatting movements required by operators, and to reduce the number of lost and misplaced lifting mechanisms.

Dock levelers may experience unwanted movement between lowered, lifted, and extended positions. The unintended movement of dock levelers can have unintended consequences. For example, an operator may not wish to lower a dock leveler until a truck/trailer has backed all the way up to a docking station and is ready to be loaded. In other situations, an operator may wish to keep a dock leveler in a particular position to signal that docking station is not ready for loading or to prevent movement from the dock to a truck/trailer. Therefore, there is a need to hold dock levelers selectively and securely in desired positions.

Dock levelers extend using a variety of methods. It is common for mechanical dock levelers to malfunction during the operative cycled, due to the number of moving parts involved and the variable factors in each cycle. Furthermore, current dock levelers may be prone to malfunction when they are extended when no truck/trailer is present to extend on. Therefore, there is a need to reduce malfunctions of dock levelers and a need to increase the flexibility of dock levelers to function properly in a wider range of circumstances.

The surfaces of dock levelers effectuate the transport of vehicles, humans, robots, and cargo back and forth from loading docks to other movably platforms (e.g., trucks/trailers). The surfaces of dock levelers are in repetitive contact with the items they transport. Dock levelers are often made of metal, making the surfaces of dock levelers slippery. Certain attempts have been made to provide dock levelers with proper traction. These attempts have fallen short because they do not provide sufficient traction and do not have long lifespans. For example, many top surfaces of dock levelers lose traction soon after being applied, requiring consistent maintenance and re-application. Other attempts break apart and leave loose particles or matter on the top of dock levelers, increasing the likelihood of slippage. Furthermore, the loose particles can be unintentionally carried off of the dock and onto a truck/trailer or into a freight house. Current surfaces of dock levelers pose many risks and challenges. Therefore, there is a need to provide reliable traction (in all environmental conditions) by increasing friction on dock leveler surfaces. Furthermore, there is a need to extend the life of traction on dock leveler surfaces.

SUMMARY

Consistent with some examples, a dock leveler comprises a deck plate and a lip assembly hingedly connected to the deck plate. The lip assembly comprises a lip plate and a lip subplate. The lip plate includes a traction side and a bottom side and has a lip plate crown. The lip subplate includes a top side and a bottom side and has a lip subplate crown. The lip subplate is coupled to a bottom side of the lip plate in a manner that provides structural rigidity to the lip plate. The lip subplate crown is aligned and nested with the lip plate crown.

Consistent with some examples, a dock leveler comprises a face plate and a pivot anchor. The face plate is disposed to abut against a wall of a dock. The pivot anchor projects laterally away from the face plate, The pivot anchor has a pivot hole configured to receive a pivot pin of the dock leveler. The pivot anchor comprises a top portion and a bottom portion. The top portion is configured to abut against the face plate and having at least one protrusion configured to couple with at least one hole in the face plate of the dock leveler. The bottom portion is disposed below the face plate and has a support surface configured to contact a wall of a dock.

Consistent with some examples, a dock leveler comprises a counterbalancing assembly comprising a spring and an anchor plate. The anchor plate spans a width of the spring to permit coupling of the counterbalancing assembly and a linkage system. The anchor plate comprises a first end portion wrapped around a first outer surface of a spring of the dock leveler to secure the anchor plate to the spring, a middle portion adjacent the first end portion, and a second end portion adjacent the middle portion, the second end portion wrapped around a second outer surface of the spring to secure the anchor plate to the spring.

Consistent with some examples, a dock leveler comprises a lift lever operably graspable by a user to lift, lower, and extend the dock leveler. The dock leveler further comprises a lift lever retainer having an opening shaped and sized to slidably receive the lift lever. The lift lever comprises a top portion including a handle graspable by a user, a middle portion adjacent the top portion, and a bottom portion adjacent the middle portion, the bottom portion engageable with the lift lever retainer when lifting, lowering, or extending the dock leveler. The lift lever further comprises a stopper disposed on the middle portion or on the top portion. A combined width of the lift lever and the stopper is greater than a width of the opening of the lift lever retainer.

Consistent with some examples, a dock leveler comprises a maintenance strut rotatable between a maintenance position and a stowed position, the maintenance strut being configured to secure the dock leveler in an accessible position when in the maintenance position. The maintenance strut has a latch hole and a pivot hole formed therein. The dock leveler further comprises a latch configured to selectively maintain the maintenance strut in the maintenance position or the stowed position. The latch comprises a pin selectively extendable through the latch hole, the pin having a first end and a second end, and a retainer having a first end fixedly attached to the first end of the pin and a second end selectively attachable to the second end of the pin.

Consistent with some examples, a dock leveler comprises a face plate disposable adjacent a dock wall, a deck plate hingedly connected to the face plate, a lip assembly hingedly connected to the deck plate. The dock leveler further comprises a lip extender support coupled to the face plate, and a lip extender. The lip extender has a first end rotatably coupled to the lip assembly, and a second end selectively engageable with the lip extender support to extend the lip assembly with respect to the deck plate.

Consistent with some examples, a method for increasing friction on a traction surface of a deck plate or a lip plate of a dock leveler comprises pre-treating the traction surface of the deck plate or the lip plate of the dock leveler, the traction surface having a first lower coefficient of friction. The method further comprises applying a coating to the traction surface of the deck plate or the lip plate of the dock leveler. The coating is a thermosetting super durable polyester powder coating comprising friction-increasing particles, the friction-increasing particles being applied as a part of the powder coating to the dock leveler. The method further comprises curing the coating on the traction surface of the deck plate or the lip plate of the dock leveler to increase friction on the traction surface of the deck plate or the lip plate to a second higher coefficient of friction.

Other examples include corresponding methods, computer systems, apparatus, and computer programs recorded on one or more computer storage devices, each configured to perform the actions described herein.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

Figure 1:
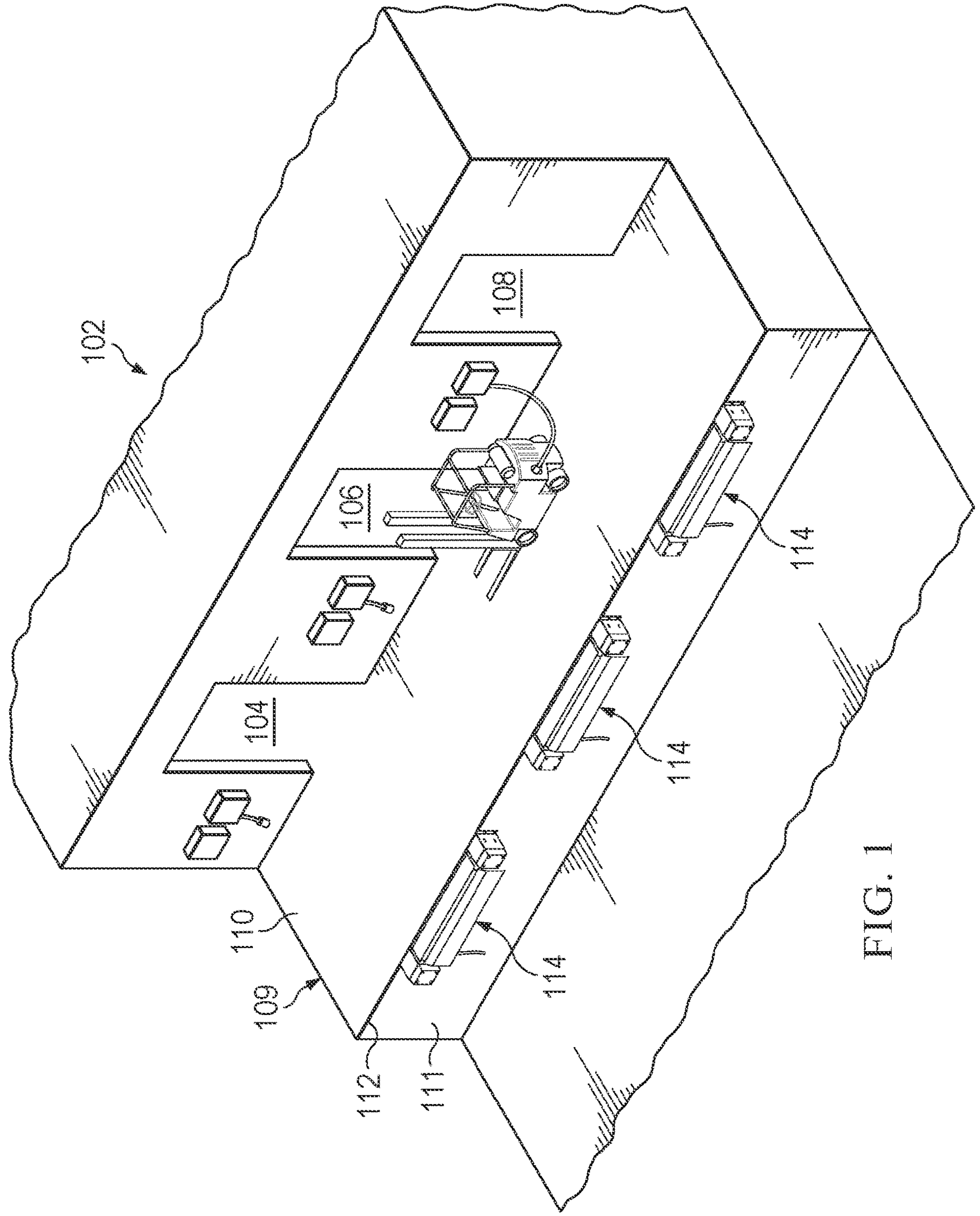
FIG. 1 is a perspective view of a freight house with multiple dock levelers installed on docking stations of the freight house in accordance with an example of the present disclosure.

Examples of the present disclosure and their advantages are best understood by referring to the detailed description that follows. It should be appreciated that like reference numerals are used to identify like elements illustrated in one or more of the figures, wherein showings therein are for purposes of illustrating examples of the present disclosure and not for purposes of limiting the same.

DETAILED DESCRIPTION

Accordingly, the present disclosure contemplates dock leveler systems and methods. The disclosed examples may provide additional advantages including, but not limited to: reinforcing and spreading force along lip plates and other portions of dock levelers, lowering lip grade, reducing material costs during manufacturing of face plates of dock levelers, reducing internal loads felt by dock levelers, simplifying manufacturing of dock leveler springs, reducing material costs during manufacturing of dock leveler springs, increasing and unifying the spring constant across the length of dock leveler springs, reducing burring in lift levers, reduce bending and squatting movements required to operate dock levelers, reducing the number of lost and misplaced lift levers, maintaining dock levelers selectively and securely in desired positions, reducing malfunctions of dock levelers, increasing the flexibility of dock levelers to function properly in a wide range of circumstances, providing reliable traction (in all environmental conditions) by increasing friction on dock leveler surfaces, and extending the life of traction on dock leveler surfaces.

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or figures, when those same elements or features appear in subsequent figures, without such a high level of detail.

FIG. 1 illustrates a portion of a freight house 102, including multiple dock stations 104, 106, and 108 for loading and unloading freight, each of which includes portions of a dock 109. The dock 109 has a generally horizontal dock surface 110 which is met with a generally vertical wall 111 to form a dock edge 112. Each of the dock stations 104, 106, and 108 may be fitted with a dock leveler 114 at the dock edge 112. The dock leveler 114 of each dock station is fastened, immovably or removably, to the vertical wall 111 or the horizontal dock surface 110, or both. The dock leveler 114 may be fastened or coupled through a dock plate 116 (e.g., curb angle), as described further with respect to FIG. 2. Fastening of the dock leveler 114 to the vertical wall 111 may occur through a variety of methods. During loading and unloading operations, the dock leveler 114 bridges the gap and/or height difference between the dock edge 112 and the truck or trailer positioned for loading or unloading.

Figure 2:
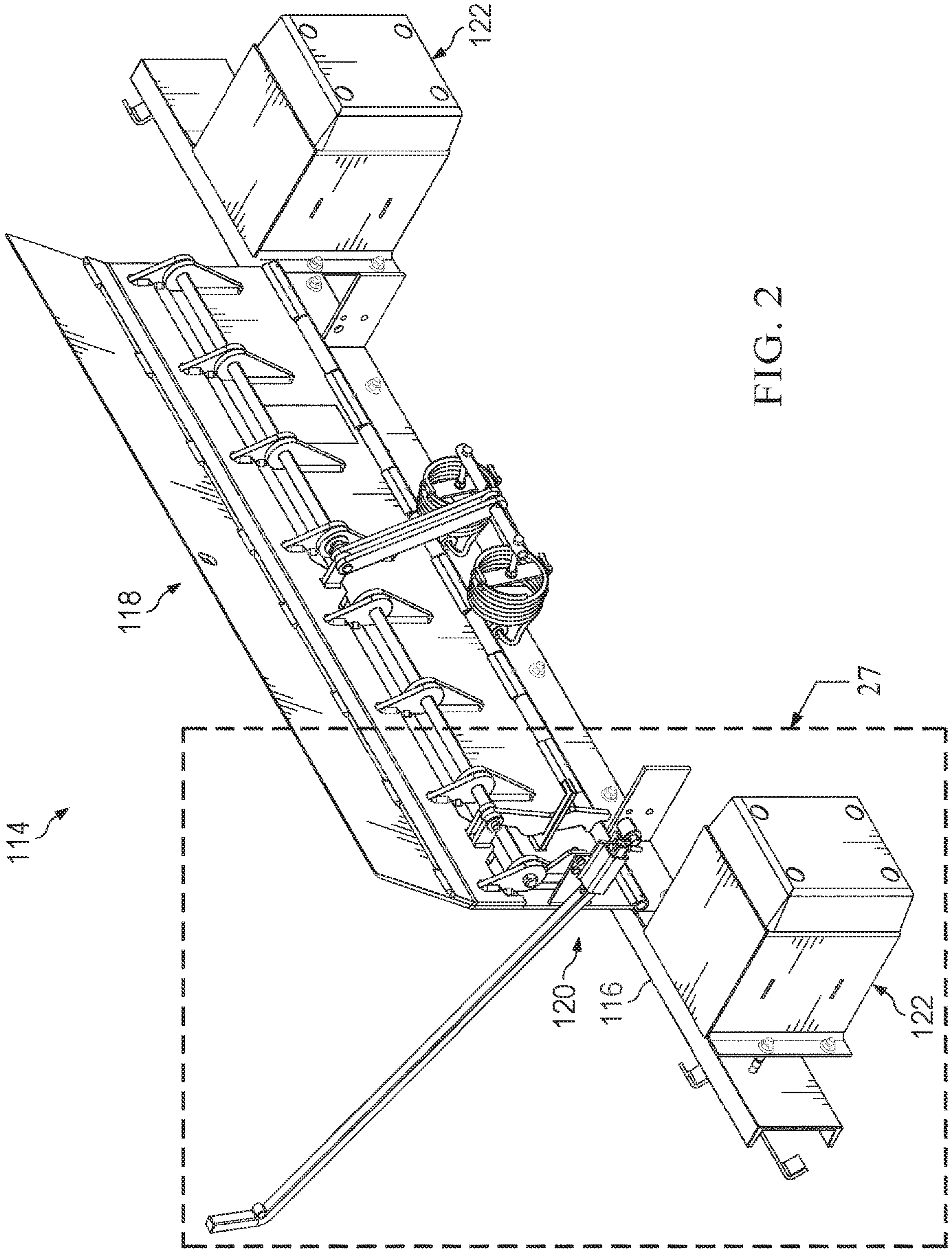
FIG. 2 is a perspective view of a dock leveler in accordance with an example of the present disclosure.

FIG. 2 illustrates, from a perspective view, the dock leveler 114 in a lifted position. In some examples, the dock leveler 114 is fastened to the vertical wall 111 of the dock 109 or the dock plate 116 which is secured to the vertical wall 111. A bridge assembly 118 of the dock leveler 114 is fastened to the dock plate 116. The bridge assembly 118 may be operated manually or automatically. For example, a lifting assembly 120 may be used to manually lift, lower, and extend the bridge assembly 118. In some examples, one or a plurality of bumpers 122 may be fastened to the dock plate 116. The bumpers 122 protect the dock leveler 114, the dock 109, and trucks/trailers from damage during loading and unloading operations. Further, the bumpers 122 ensure that the loading end of the truck/trailer remains far enough away from the dock plate 116 such that the bridge assembly 118 has space to move between the lowered, lifted, and extended positions.

Figure 3:
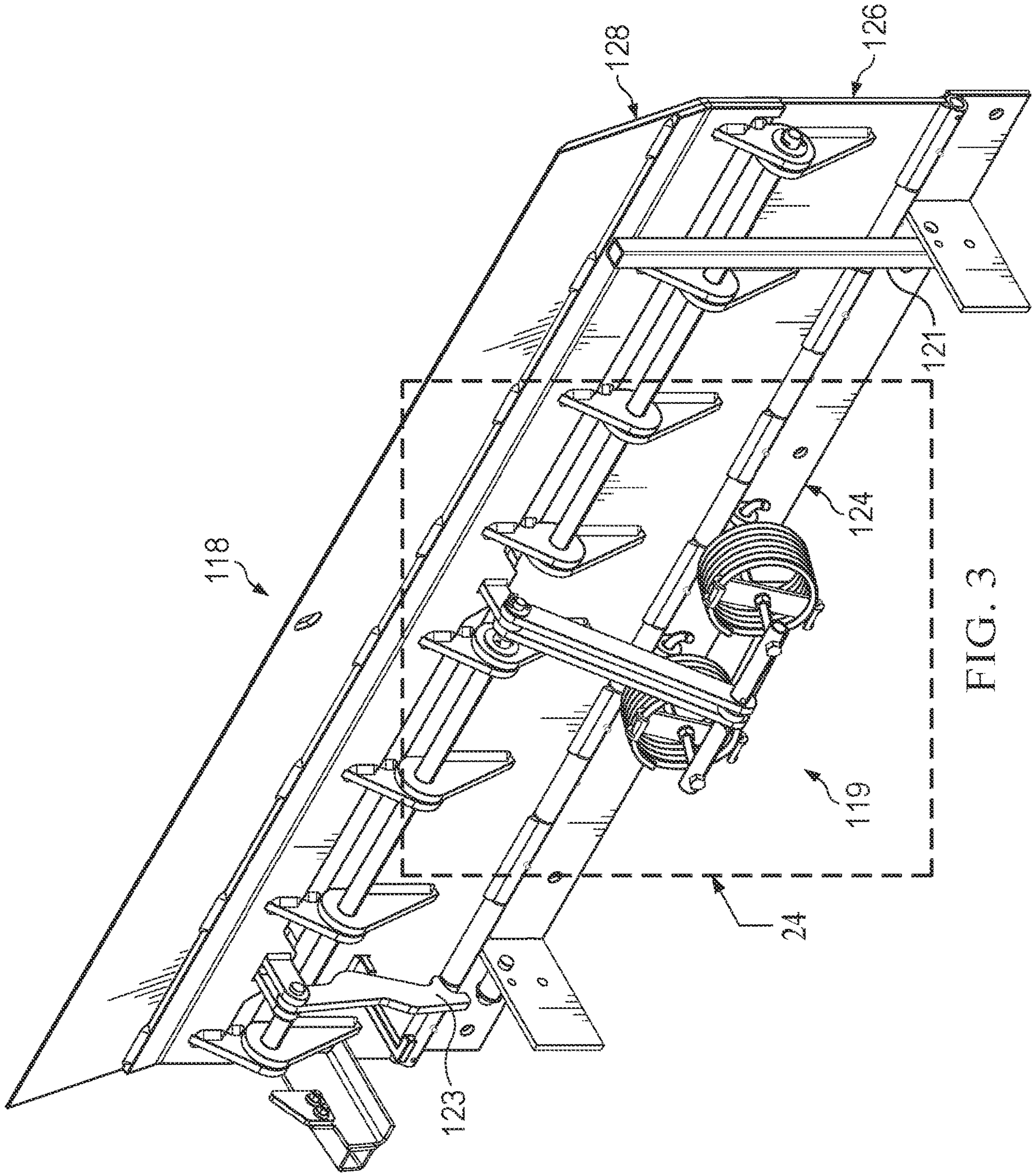
FIG. 3 is a perspective view of a bridge assembly of a dock leveler in accordance with an example of the present disclosure.

FIG. 3 illustrates, from a perspective view, the bridge assembly 118. The bridge assembly 118 is shown in a lifted position, exposing the underside of the assembled components. In some examples, the bridge assembly 118 may include a face assembly 124, a deck assembly 126, and a lip assembly 128. The face assembly 124 may attach to the dock plate 116, securing the dock leveler 114 to the dock 109. In some examples, the face assembly 124, the deck assembly 126, and the lip assembly 128 are hingedly connected, allowing for movement of the dock leveler 114 between the lowered, lifted, and extended positions. In some examples, the face assembly 124 may remain fixed with respect to the dock plate 116, while the deck assembly 126 and the lip assembly 128 are movable. A counterbalancing assembly 119 holds the bridge assembly toward the lowered, lifted, and/or extended positions. A safety brace 121 may be integrated with the leveler and may by selectively deployed as shown in FIG. 3 to prevent the deck assembly 126 and the lip assembly 128 from inadvertently falling forward. A lip extending assembly 123 may interact with the deck assembly 126 and the lip assembly 128 to manipulate the position of the lip assembly 128 relative to the deck assembly 126 when bridge assembly moves during at least one of the lowered, lifted, and extended positions. Further explanation of each of the face assembly 124, the deck assembly 126, and the lip assembly 128 will be provided below with respect to FIGS. 4-8.

Figure 4:
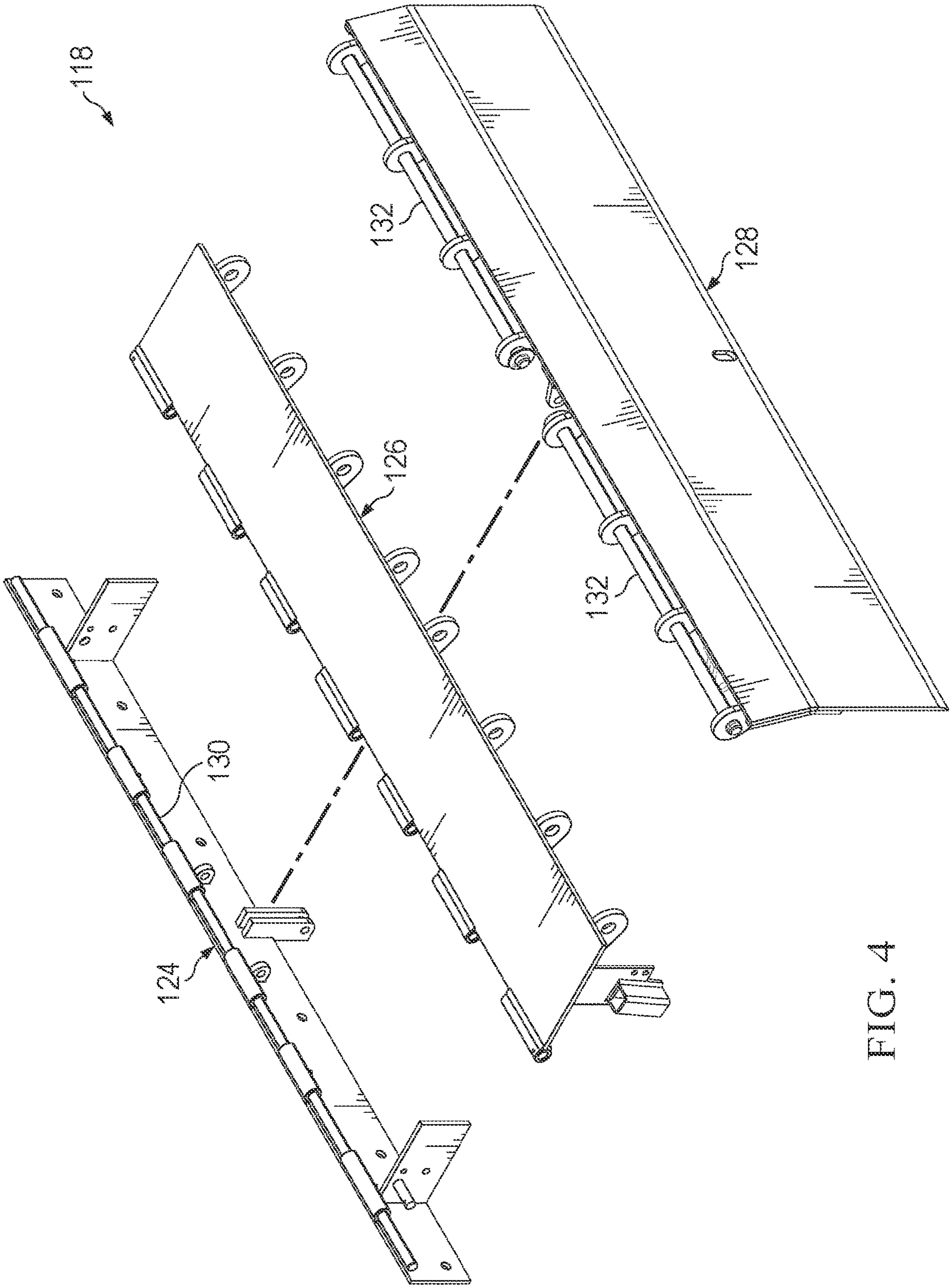
FIG. 4 is an exploded view showing subassemblies of a bridge assembly of a dock leveler in accordance with an example of the present disclosure.

FIG. 4 illustrates some primary subassemblies of the bridge assembly 118, including the face assembly 124, the deck assembly 126, and the lip assembly 128. The face assembly 124 may hingedly connect to the deck assembly 126 by a face hinge shaft 130. In the example shown, the hinge is a continuous or piano hinge having tube hinges that abut or are directly adjacent each other, although other hinges and other tube hinges could be used. In some examples, more than one of the face hinge shafts 130 can be used. For example, there may be two or more of the face hinge shafts 130 extending about the length of the face assembly 124 and the deck assembly 126. In some examples, the deck assembly 126 is also hingedly connected to the lip assembly 128 by one or more hinges. In this example, the one or more hinges are hinges having lug hinges spaced apart, although other hinges and tube hinges could be used. The hinges may include one or more lip hinge shafts 132. For example, as shown in FIG. 4, two of the lip hinge shafts 132 may be used. It may be advantageous as described herein for the lip hinge shafts 132 to be separated, allowing for attachment of a linkage bar therebetween.

In some examples, the longest dimension of each of the assemblies of the bridge assembly are the same or are generally comparable in length. For typical uses, the longest dimension of the deck assembly 126 and the lip assembly 128 is wide enough to allow passage of a forklift from the dock 109 to the truck/trailer. However, the examples described herein can vary and can be applied for other uses. For example, the bridge assembly 118 could be wide enough to allow passage of larger vehicles and equipment from one platform to another. Further, the bridge assembly 118 could be of smaller dimensions for use in smaller scale operations, where only humans or robots are traversing the gap between the dock and a movable platform such as a truck bed.

Figure 5:
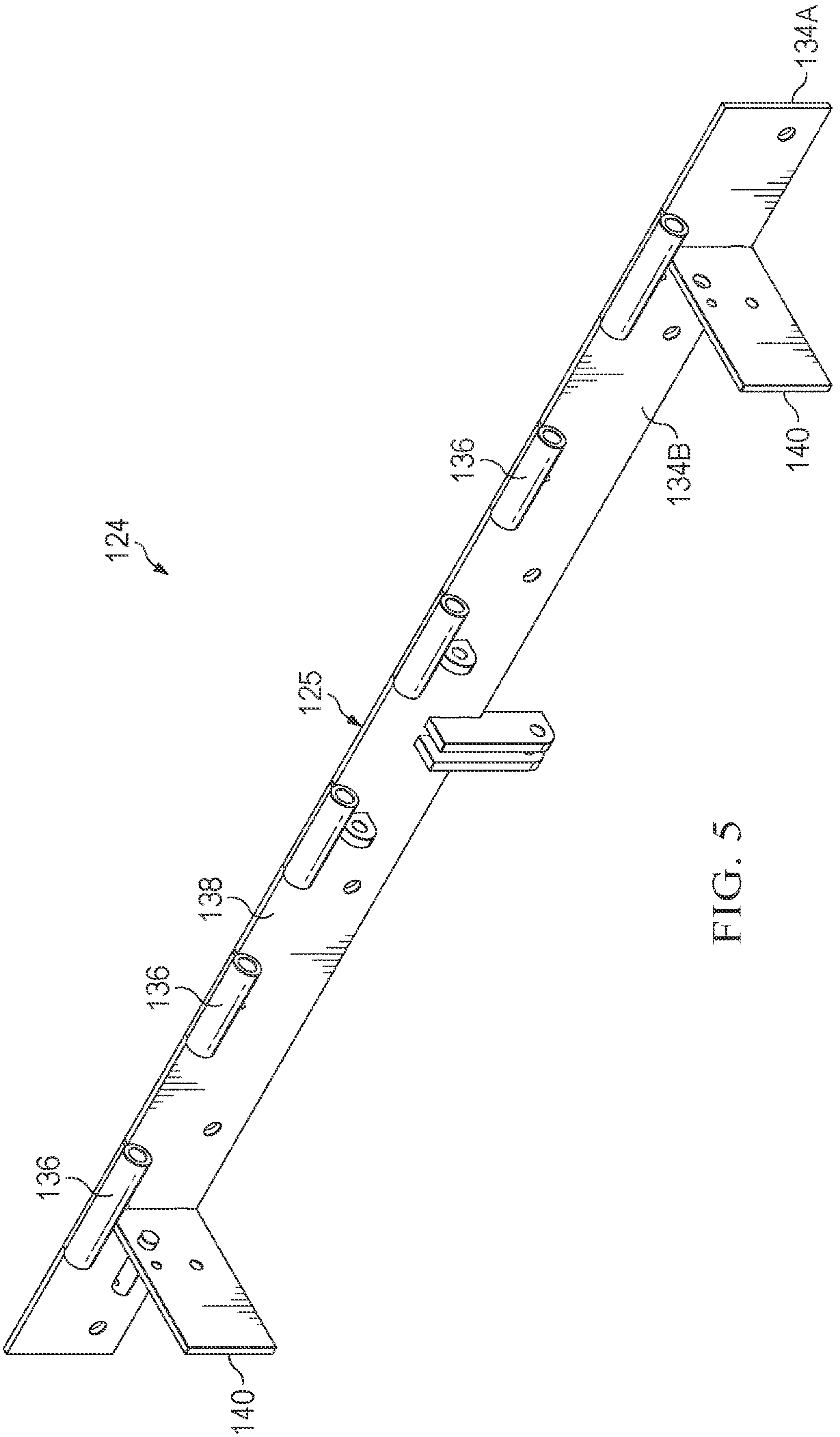
FIG. 5 is a perspective view of a face assembly of a dock leveler in accordance with example of the present disclosure.

FIG. 5 illustrates the face assembly 124 unattached from the previously identified dock 109 and the deck assembly 126. In some examples, the face assembly 124 includes a face plate 125, which is generally flat. The face plate 125 has a dock face 134A configured for abutment against the dock plate 116 and a dock-opposing face 134B with a plurality of tube hinges 136 disposed thereon. Any number of the tube hinges 136 may be used, for example five or six of the tube hinges 136. The tube hinges 136 may be cylindrical in shape with a lumen extending therethrough for receiving the face hinge shaft 130. In some examples, the tube hinges 136 are disposed on an upper portion 138 of the face plate 125 to provide for a smooth transition between the dock edge 112 and the deck assembly 126.

The dock-opposing face 134B of the face plate 125 may also have outwardly extending gussets 140 affixed or welded thereto. The gussets 140 may provide support for and act to stop the deck assembly 126 from rotating too far downward when the operator lowers the dock leveler 114. The gussets 140 may extend perpendicularly outwards from the face plate 125. The angle of a top edge of the gussets 140 with respect to the face plate can be less than or greater than 90 degrees in some instances. For example, the angle of a top edge of the gussets 140 may be within a range of about 75 to 105 degrees, although other ranges are contemplated. Furthermore, the gussets 140 can act to support the lifting assembly 120 (FIG. 2).

Figure 6:
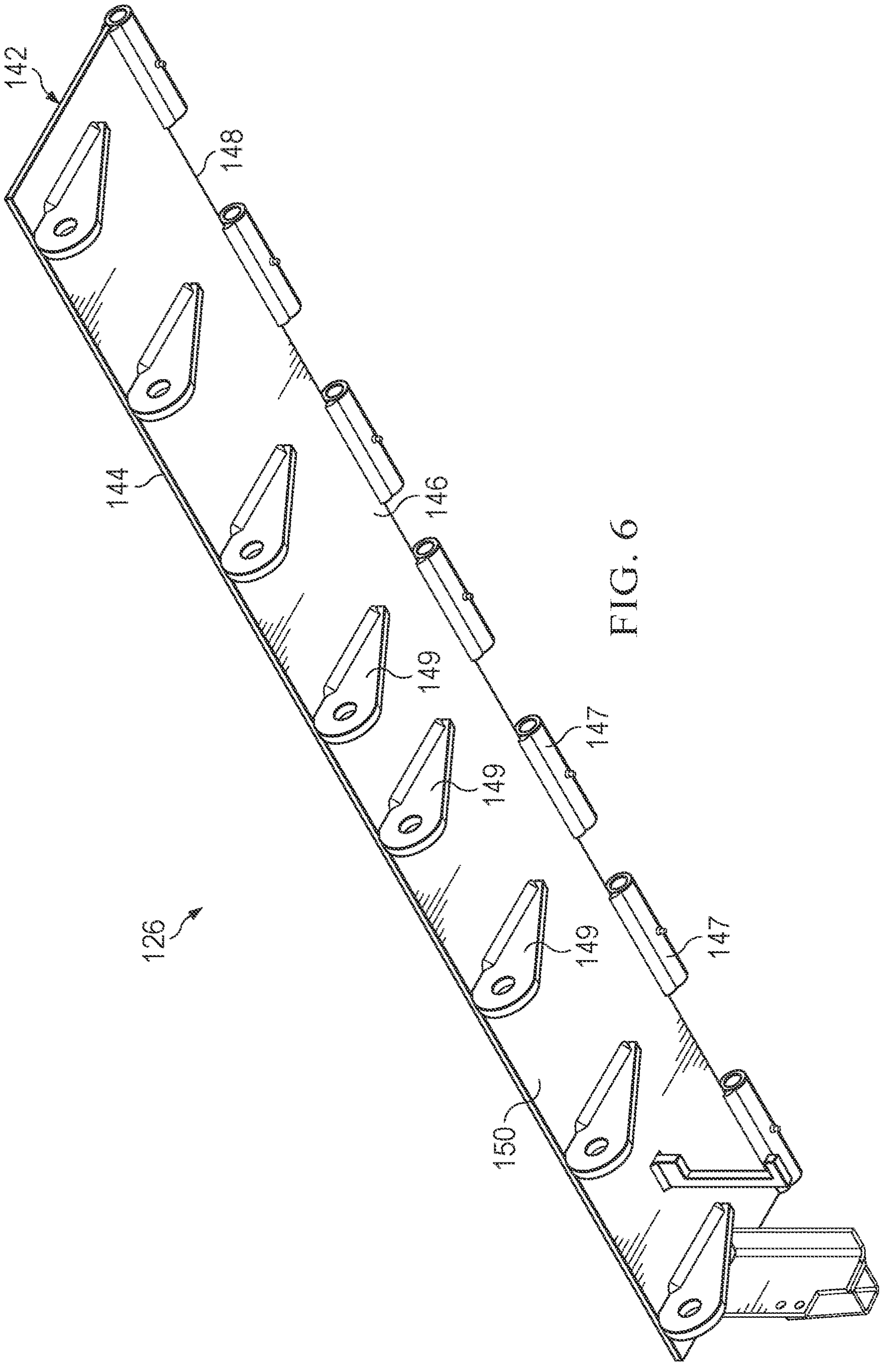
FIG. 6 is a perspective view of a deck assembly of a dock leveler in accordance with an example of the present disclosure.

FIG. 6 illustrates the deck assembly 126 unattached from the face assembly 124 and the lip assembly 128. In some examples, the deck assembly 126 includes a deck plate 142, which is generally flat. The deck plate 142 has a traction side including a traction surface 144. The traction side may be an upper side and the traction surface 144 may be an upper surface. The deck plate 142 also has a bottom surface 146. The traction surface 144 may be flat to allow for equipment, vehicles, humans, and robots to cross from the dock 109 to a truck/trailer with ease. Like the face assembly 124, the deck assembly 126 also supports tube hinges 147. The tube hinges 147 of the deck assembly 126 may be disposed on and connected to the bottom surface 146 of the deck plate 142. In some examples, the tube hinges 147 may be disposed on a proximal edge 148 of the deck plate 142. The tube hinges 136,147 on the face plate 125 and the deck plate 142, respectively, may be spaced such that they mesh with one another. That is, the face hinge shaft(s) 130 may extend through the lumens of the tube hinges 136, 147 on both the face assembly 124 and the deck assembly 126, thereby creating a hinged connection. The bottom surface 146 additionally supports attachment lug hinges 149. The attachment lug hinges 149 can be disposed on a distal portion 150 of the deck plate 142 near the lip assembly 128. The attachment lug hinges 149 each define a hole to allow passage of a lip hinge shaft(s) 132.

Figure 7:
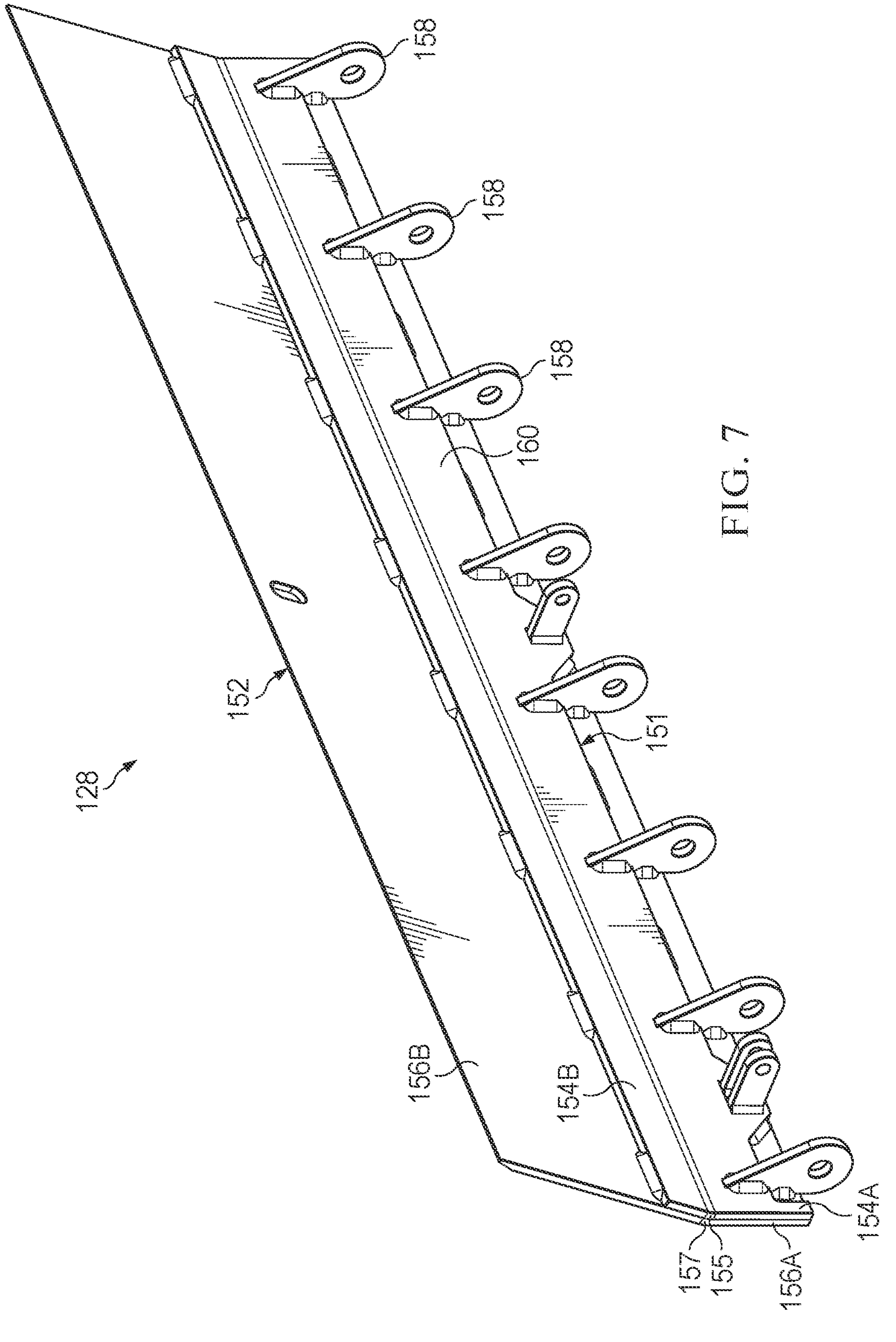
FIG. 7 is a perspective view of a lip assembly of a dock leveler in accordance with an example of the present disclosure.

FIG. 7 illustrates the lip assembly 128 unattached from the deck assembly 126. In some examples, the lip assembly 128 may include a lip subplate 151 and a lip plate 152 extending distally beyond the lip subplate 151. In some examples, the lip plate 152 may be welded to the lip subplate 151 such that the lip subplate 151 and the lip plate 152 are formed as one component. In other examples, the lip subplate 151 and the lip plate 152 may be held together in other ways. As shown, the lip subplate 151 may be formed such that it has a proximal portion 154A and a distal portion 154B separated lip subplate crown 155. The distal portion 154B may be angled with respect to the proximal portion 154A at the lip subplate crown 155. In some examples, the width of the distal portion 154B is smaller than the width of the proximal portion 154A. In some examples, the width of the distal portion 154B beyond the lip subplate crown 155 is shorter than the width of the proximal portion 154A.

The lip plate 152 has a traction side and a bottom side. The traction side includes an traction surface that is exposed to the vehicles, equipment, humans, etc. that may be traversing the dock leveler 114. The traction side and the traction surface may face upwards with respect to the horizontal dock surface 110. The bottom side faces the lip subplate 151. Similar to the lip subplate 151, the lip plate 152 may be formed to have both a proximal portion 156A and a distal portion 156B separated by a lip plate crown 157. The distal portion 156B may be angled with respect to the proximal portion 156A at the lip plate crown 157. Each of the distal portion 154B and the distal portion 156B may extend at similar or the same angles from each of the proximal portion 154A and the proximal portion 156A. That is, the lip subplate crown 155 and the lip plate crown 157 may have the same angle, thereby allowing them to nest together on both sides of the crowns 155,157.

In some examples, the lip subplate crown 155 is nested in the lip plate crown 157. For example, when the lip subplate 151 and the lip plate 152 are mated or welded together, the proximal and distal portions of each may be substantially flush against one another, due to the angle at which the distal portions extend from the proximal portions and the width of each of the distal and proximal portions. To allow for this to occur, the proximal portion 156A of the lip plate 152 may be of similar or the same width as the proximal portion 154A of the lip subplate 151. Further, the distal portion 156B of the lip plate 152 may be of greater width than the width of the distal portion 154B of the lip subplate 151, allowing the lip plate 152 to extend distally beyond the lip subplate 151. In some examples, the distal portion 154B of the lip subplate 151 is less than half the width of the distal portion 156B of the lip plate 152. The distal portion 154B of the lip subplate 151 may have an average width shorter than the average width of the distal portion 154B of the lip plate 152. The distal portion 154B of the lip subplate 151 may have an average width shorter than the average width of the proximal portion 154A of the lip subplate 151. Because the lip plate 152 extends beyond the lip subplate 151, a smooth transition can occur between the deck assembly 126 and the lip assembly 128 and between the lip assembly 128 and the truck/trailer, when the dock leveler 114 is in an extended position and ready for loading/unloading.

Like the deck assembly 126, the lip assembly 128 may support a plurality of lug hinges 158 disposed on a bottom side 160 of the lip subplate 151, the bottom side opposing a top side of the lip subplate 151. The lug hinges 158 on the lip assembly 128 are configured to receive the lip hinge shaft(s) 132. When the lip hinge shaft(s) 132 pass through both the lug hinges 158 and the attachment lug hinges 149, a hinged connection occurs between the deck assembly 126 and the lip assembly 128. The lug hinges 158 may be welded to both the lip subplate 151 and the lip plate 152, thereby distributing force into the subplate and minimizing the stress felt at the point of attachment of the lug hinges 158 when forces are applied downward on the extended dock leveler 114.

Figure 8:
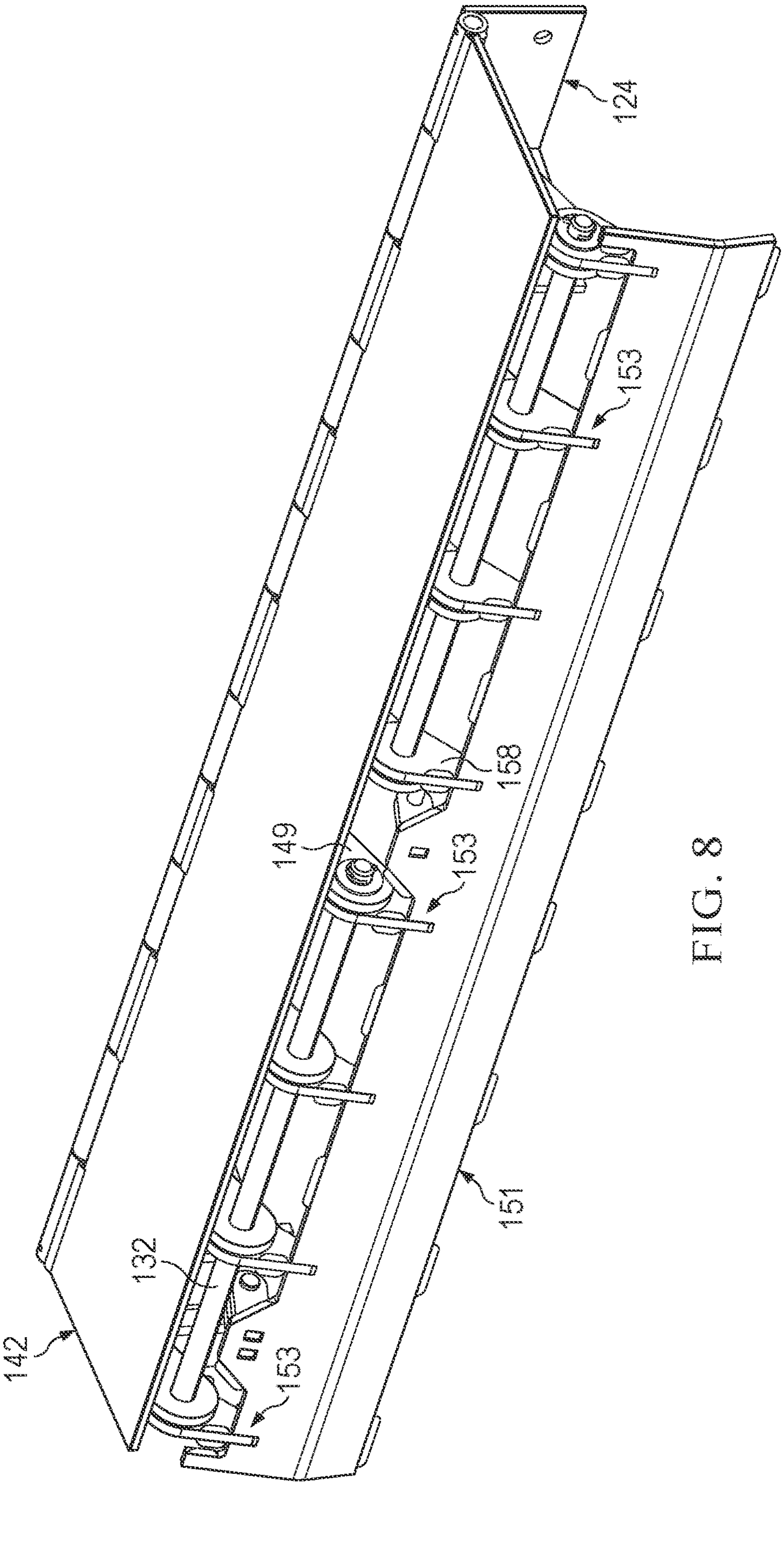
FIG. 8 is a perspective view of lip subplate connected to a deck assembly in accordance with an example of the present disclosure.

FIG. 8 illustrates the lip subplate 151 hingedly connected to the deck plate 142. The lip plate 152 has been removed to show particular features of the lip subplate 151, in some examples. For example, the lip subplate 151 may have a plurality of cutouts 153 configured to receive the attachment lug hinges 149 on the lip plate 152. The cutouts 153 may further promote the distribution of forces to the lip subplate 151. The cutouts 153 may increase the strength and longevity of the areas where the lug hinges 158 are welded to the lip plate 152 and/or the lip subplate 151.

Figure 9:
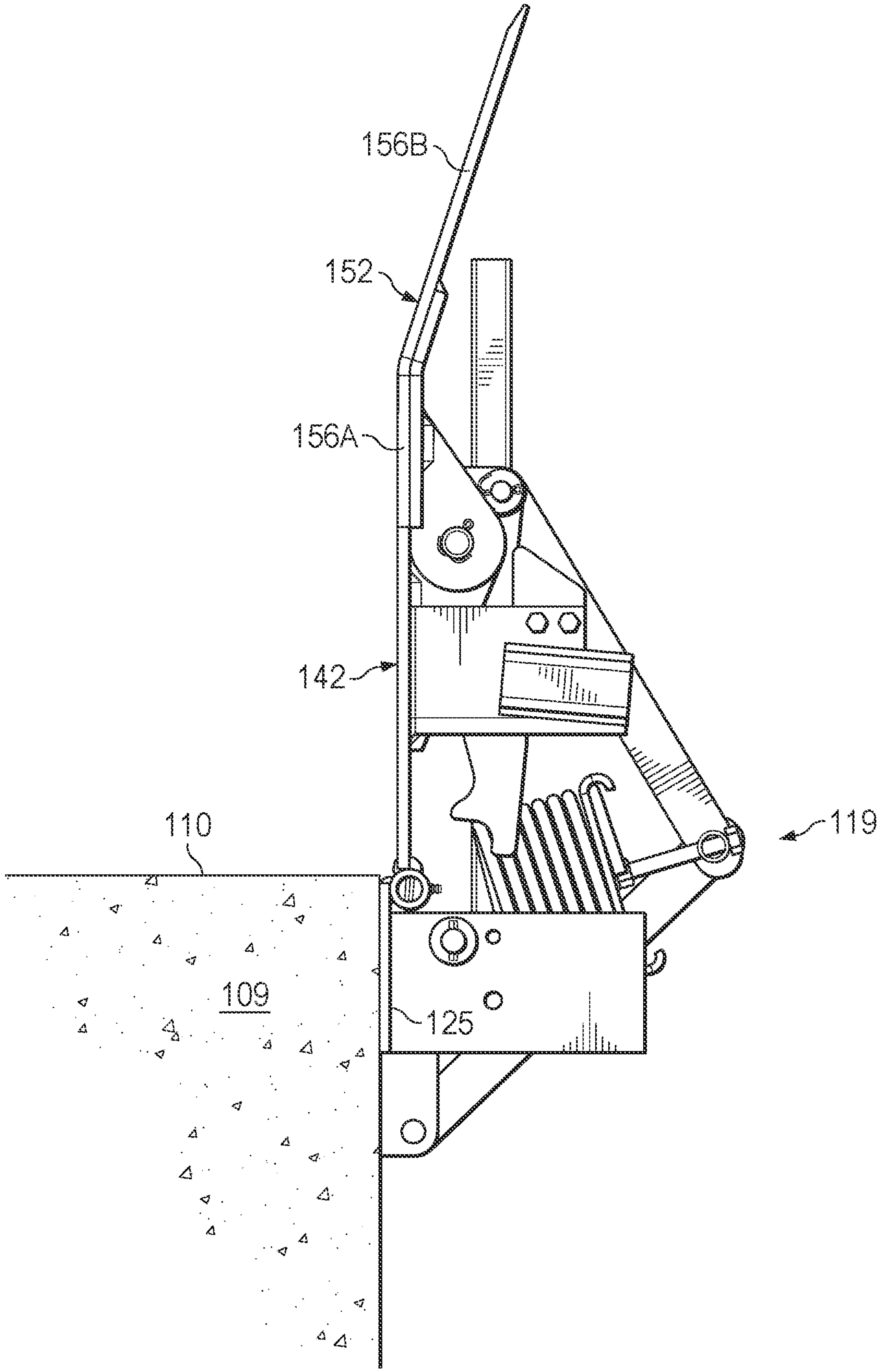
FIG. 9 is a side view of a dock leveler in a lifted position in accordance with an example of the present disclosure.
Figure 10:
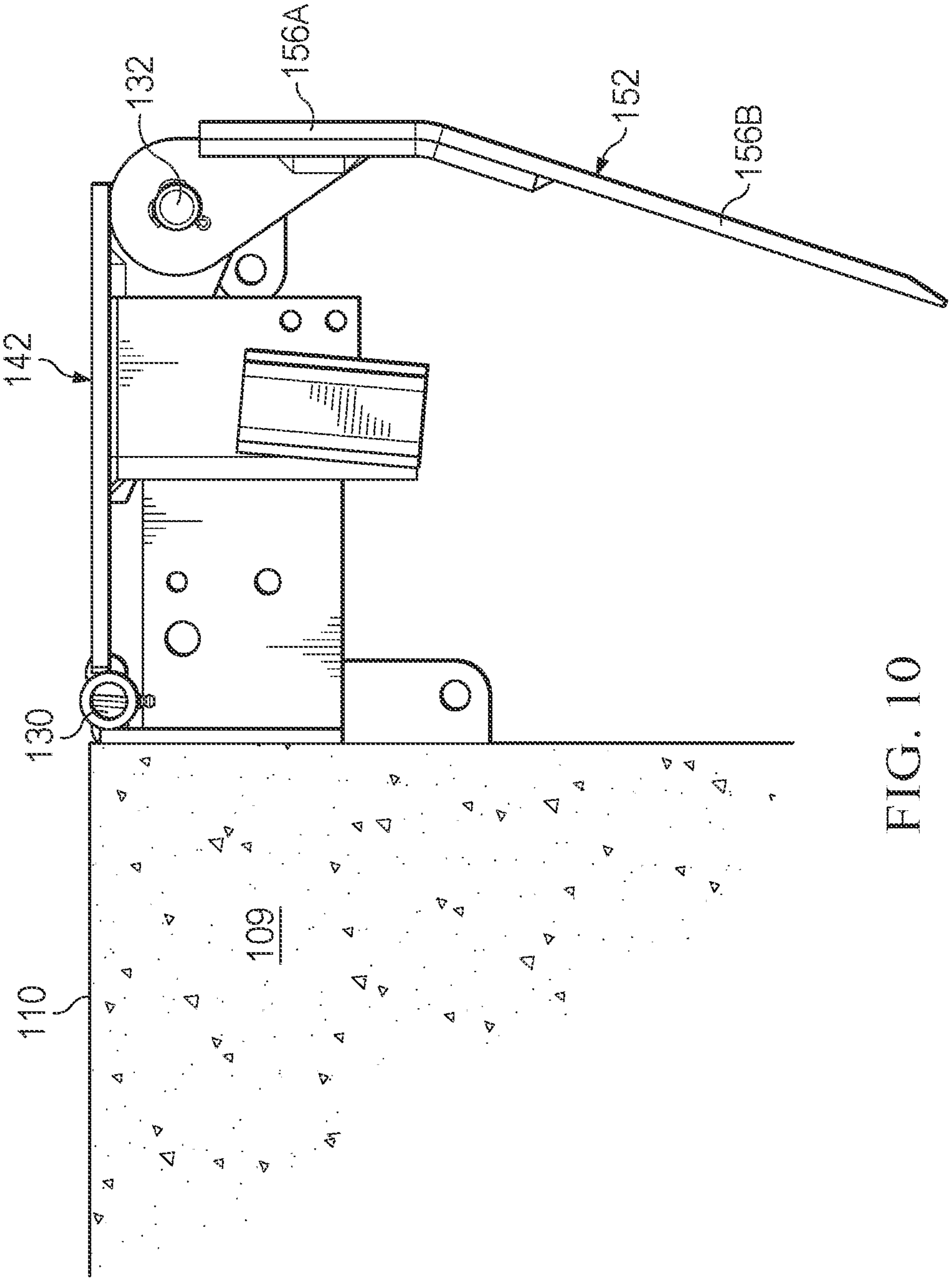
FIG. 10 is a side view of a dock leveler in a lowered position in accordance with an example of the present disclosure.

FIGS. 9 and 10 illustrate the bridge assembly 118 of the dock leveler 114 in lifted and lowered positions, respectively. As mentioned previously, the bridge assembly 118 may be brought into the lifted or lowered positions using the lifting assembly 120 (not shown in FIGS. 9 and 10) or automatically, using hydraulics or other methods. The dock leveler 114 may be stored in either the lifted or lowered positions. Storing the dock leveler 114 in the lifted position may be helpful in preventing operators and/or equipment from falling off of the loading dock. Further, it may signal to workers that the truck/trailer is not yet ready for loading/unloading, even if it the truck/trailer is parked near the dock 109. The lowered position allows for the dock 109 to be used for other purposes or for other loading/unloading operations that do not require the dock leveler 114.

In the lifted position of FIG. 9, the face plate 125, the deck plate 142, and the proximal portion 156A of the lip plate 152 are oriented vertically and may be substantially aligned. In some examples, the deck plate 142 and the proximal portion 156A may extend perpendicularly with respect to the horizontal dock surface 110. In other examples, the deck plate 142 and the proximal portion 156A may extend, in the upright position, at angles ranging from 60 to 130 degrees with respect to the horizontal dock surface 110. For example, 60 degrees, 70 degrees, 80 degrees, 90 degrees, 110 degrees, 120 degrees, or 130 degrees. In some examples, the lifted position is one in which the proximal portion 156A of the lip plate 152 is substantially parallel/horizontal with respect to the horizontal dock surface 110, while the deck plate 142 is substantially perpendicular/vertical.

In the lowered position of FIG. 10, the deck plate 142 may be oriented horizontally while the proximal portion 156A of the lip plate 152 may be oriented vertically downward. To move from the lifted position to the lowered position, the deck assembly 126 pivots about the face hinge shaft(s) 130 while the face assembly 124 remains fixed to the dock 109. Additionally, the lip assembly 128 pivots about the lip hinge shaft(s) 132. In some examples, the deck plate 142 is locked at an angle of about 180 degrees with respect to the horizontal dock surface 110. Extending at such an angle allows for the dock 109 to be used and accessed, even when the dock leveler 114 is not in an extended position. In some examples of the lowered position, the proximal portion 156A of the lip plate 152 extends or hangs downward and is at an angle about 270 degrees or more with respect to the horizontal dock surface 110. The distal portion 156B of the lip plate 152 can be positioned at an angle greater than 270 degrees with respect to the horizontal dock surface 110, due to the angle that the distal portion 156B is formed with respect to the proximal portion 156A.

Figure 11:
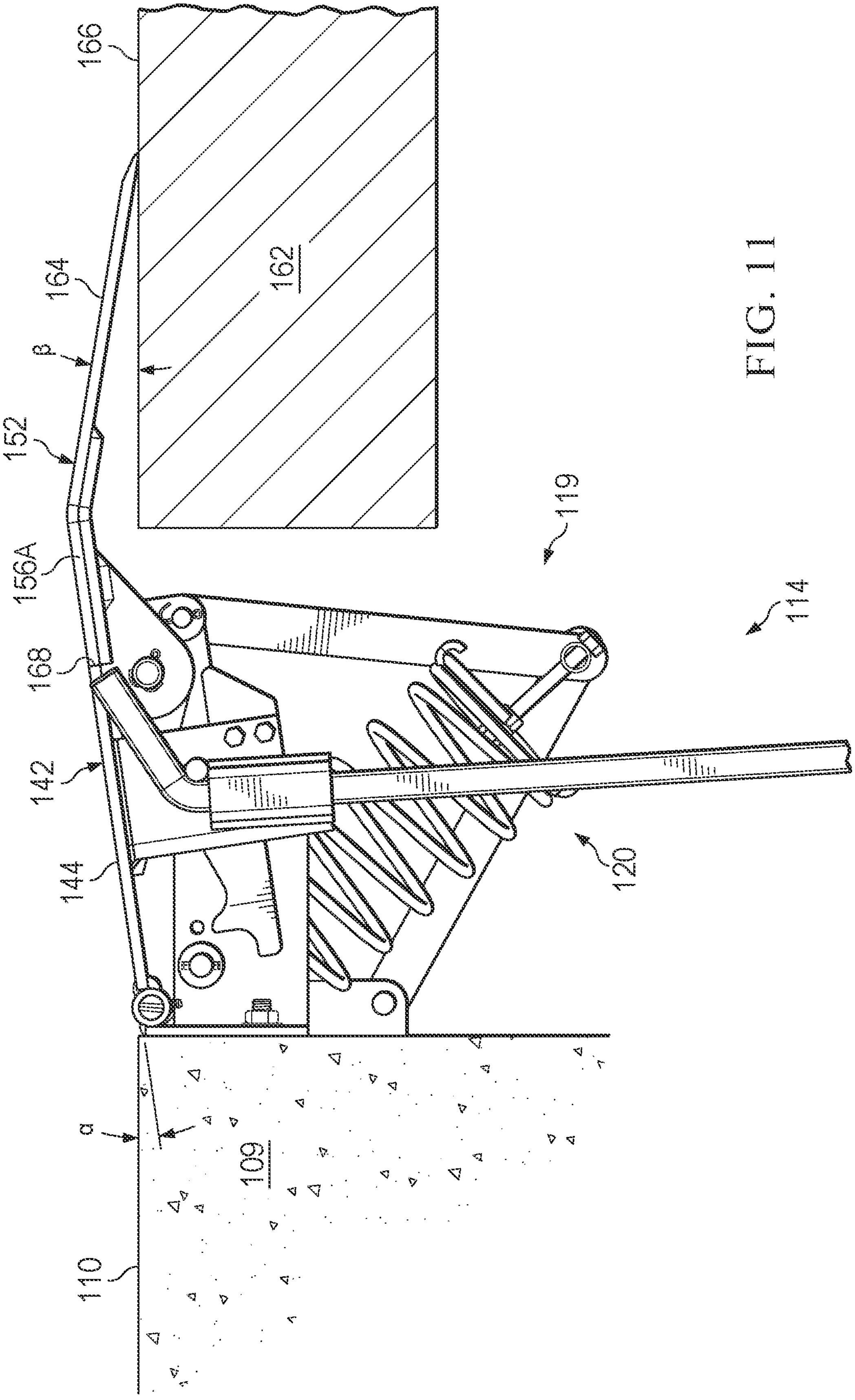
FIG. 11 is a side view of a dock leveler in an extended position in accordance with an example of the present disclosure

FIG. 11 illustrates the dock leveler 114 in an extended position. The dock leveler 114 is shown bridging the gap between the dock 109 and a truck/trailer 162. The extended position is variable, depending on the application, to account for differences in the height and distance of the truck/trailer 162 from the dock 109. The ramp grade α (alpha) shown in FIG. 9 depends on the orientation of the traction surface 144 of the deck plate 142 with respect to the horizontal dock surface 110 of the dock 109. The lip grade β (beta) depends on the orientation of a top traction surface 164 of the lip plate 152 with respect to the 166 of the truck/trailer 162. In some examples of the extended position, the deck plate 142 and the proximal portion 156A of the lip plate 152 meet at a seam 168. It is advantageous that the seam 168 be smooth to facilitate traversal of equipment over the dock leveler 114. In other examples, the deck plate 142 may overlap the proximal portion 156A of the lip plate 152, thereby creating a smooth transition. For example, the distal edge of the deck plate 142 may form a point or a taper, minimizing any height difference between the deck plate 142 and the lip plate 152 in the extended position. In some examples, the lip plate 152 may extend over the deck plate 142 and the distal end of the distal portion 156B of the lip plate 152 may be pointed or tapered, to minimize height difference.

Figure 12:
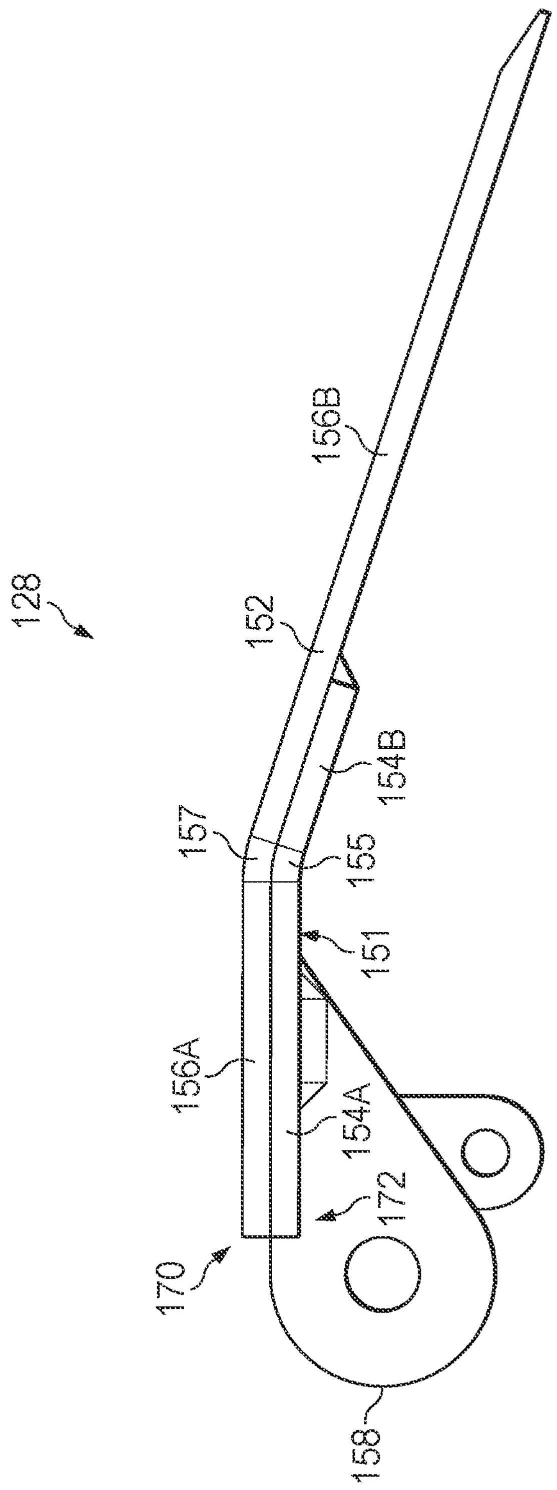
FIG. 12 is a side view of a lip assembly of a dock leveler in accordance with an example of the present disclosure.

FIG. 12 illustrates the lip assembly 128 from a side view. Incorporating the lip subplate 151 in the lip assembly 128 introduces a variety of advantages. Among other things, the lip subplate 151 reinforces the lip assembly 128 near the lip hinge shaft 132 and distributes forces applied to the dock leveler 114 along the lip plate 152. The lip subplate 151 may be coupled to the bottom side of the lip plate 152 in a manner that provides structural rigidity to the lip plate 152. Furthermore, the lip subplate 151 allows the crowns 155 and 157 to be located closer to the seam 168, thereby lowering the lip grade β (beta), providing a smooth traversal of the gap between the dock 109 and the truck/trailer 162.

In some examples, a proximal end 170 of the lip plate 152 and a proximal end 172 of the lip subplate 151 may be aligned, while another portion of the proximal end 170 of the lip plate 152 and the proximal end 172 of the lip subplate 151 may be offset, due to the varying widths of the lip subplate 151 across the length of the lip subplate 151 (see FIG. 8). The proximal end 170 can be disposed adjacent the deck plate 142. When the dock leveler 114 is in an extended position, a distal end 174 of the deck plate 142 may abut against the proximal end 170 of the lip plate 152. forming the seam 168. The proximal end 170 of the lip plate 152 may not abut against the lip subplate 151. Alternatively, the distal end 174 of the deck plate 142 may abut with both the proximal end 172 of the lip subplate and the proximal end 170 of the lip plate. In some examples, when the dock leveler 114 is in an extended position, a top surface of the deck plate 142 and a top surface of the lip plate 152 are aligned. In some examples, the lip subplate 151 overlaps the deck plate 142 when the dock leveler is extended.

As shown in FIG. 12, in some examples, the lip subplate crown 155 and the lip plate crown 157 are substantially flush against one another, promoting the distribution of force along the lip plate 152. Various dimension and sizes of the lip plate 152 and the lip subplate 151 are contemplated. In some examples, the width of the lip subplate 151 may be less than or more than half the width of the lip plate 152. For example, the width of the lip subplate 151 may be in a range of about 20-70% of the width of the lip plate 152. A portion of the lip subplate 151 may cover more than half the width of the lip plate 152 and a portion of the lip subplate 151 may cover less than half the width of the lip plate 152.

In some examples, the length of the lip subplate 151 is less than or more than half the length of the lip plate 152. It is contemplated that the lip subplate 151 need not be a continuous structure as shown. For example, a plurality of lip subplates 151 may be spaced apart and extend underneath the lip plate 152. Furthermore, there may be a plurality of the lip subplates 151 stacked on top of one another. The thickness of the lip subplate 151 and the lip plate 152 may vary. In some examples, the lip subplate 151 has a thickness of about 50-150% of a thickness of the lip plate 152.

Figure 13:
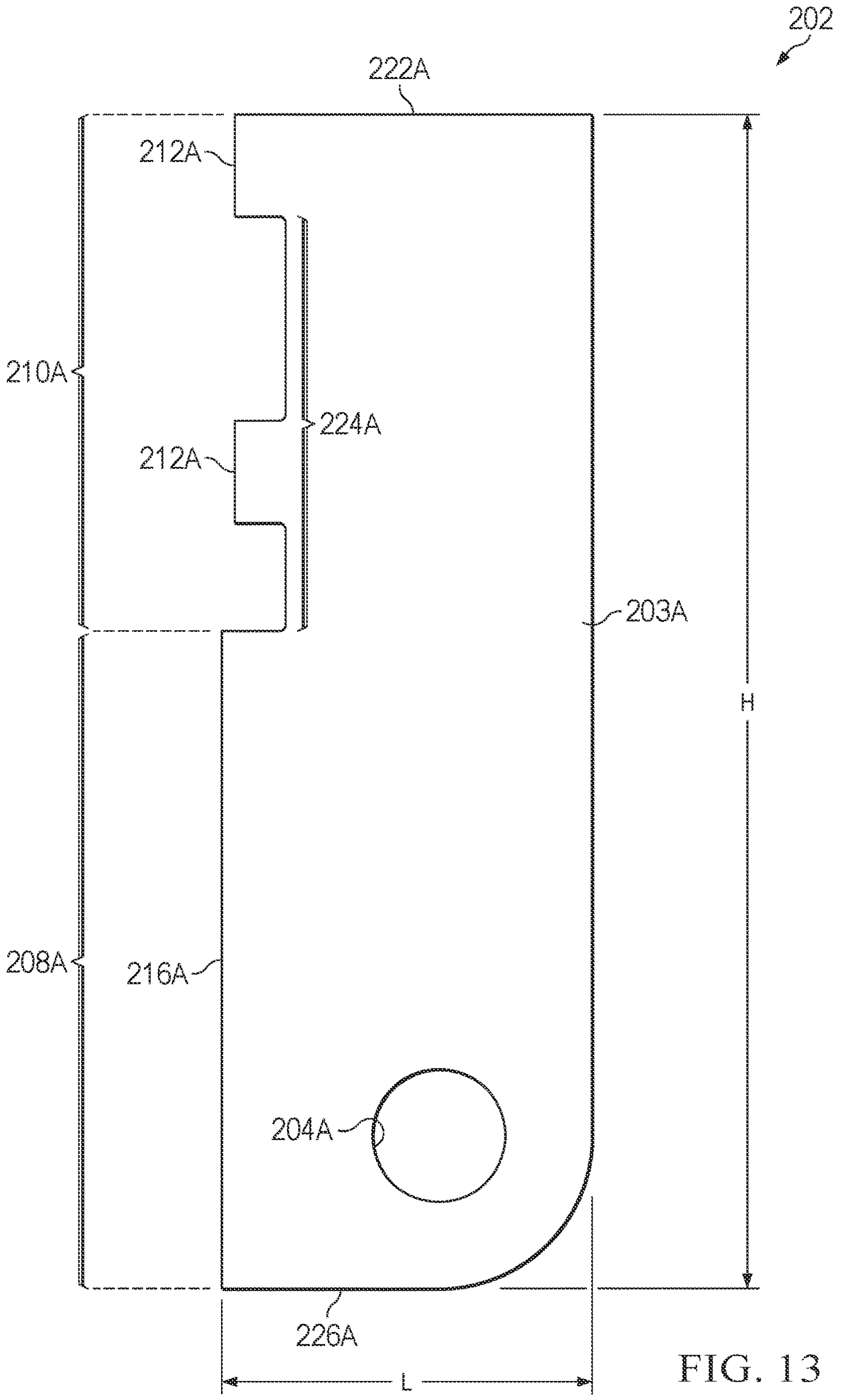
FIG. 13 is a side view of a pivot anchor of a dock leveler in accordance with an example of the present disclosure.
Figure 14:
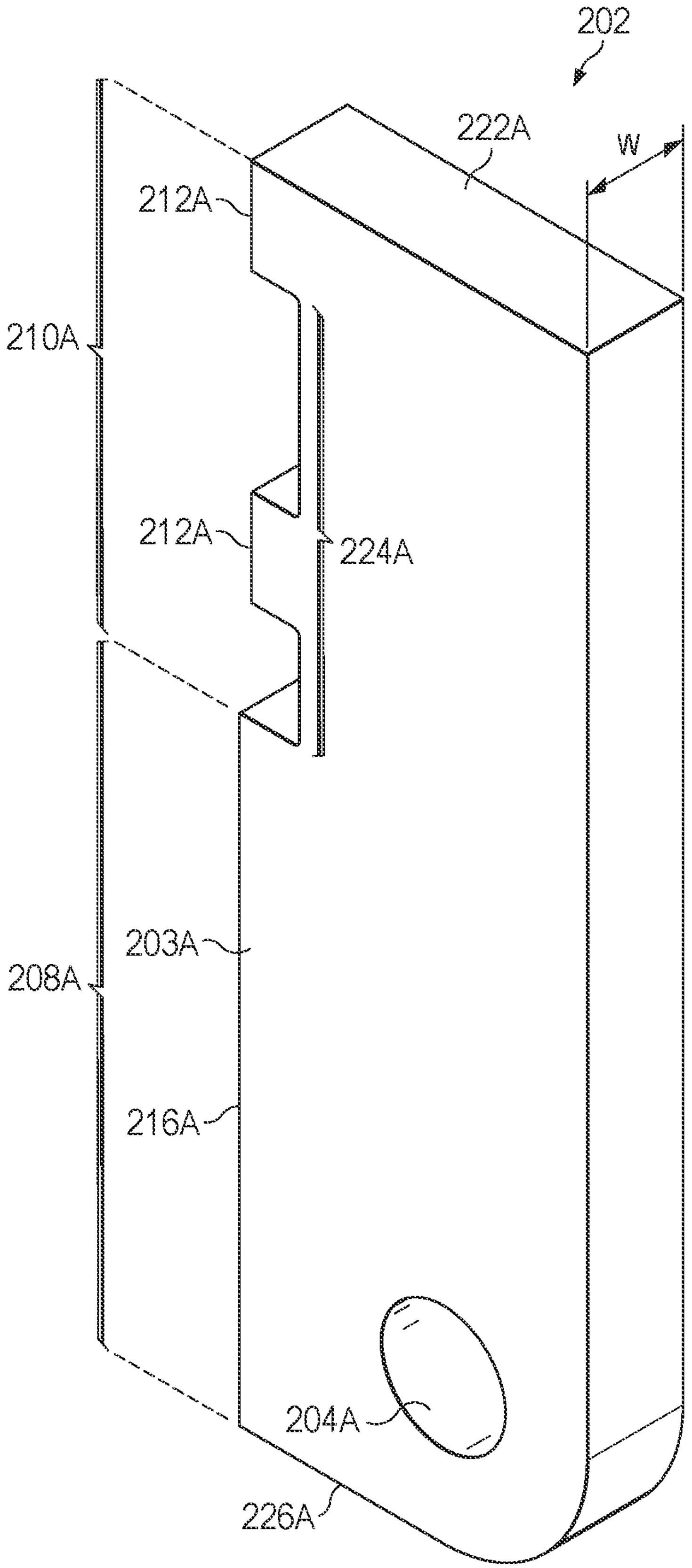
FIG. 14 is a perspective view of a pivot anchor of a dock leveler in accordance with an example of the present disclosure.

FIGS. 13-14 illustrate a pivot anchor 202 of the dock leveler 114. The pivot anchor 202 is configured to project laterally away from the face plate 125. Among other things, the pivot anchor 202 reduces material costs during manufacturing of the dock leveler 114 and reduces the internal loads felt by the dock leveler 114. Specifically, the pivot anchor 202 reduces the required dimensions of the face plate 125 and reduces the loads felt at the point of attachment of the pivot anchor 202 to the face plate 125, by distributing the loads to the dock 109. In some examples, the pivot anchor 202 may comprise a body 203A. The pivot anchor 202 may comprise any number of bodies.

Figure 15:
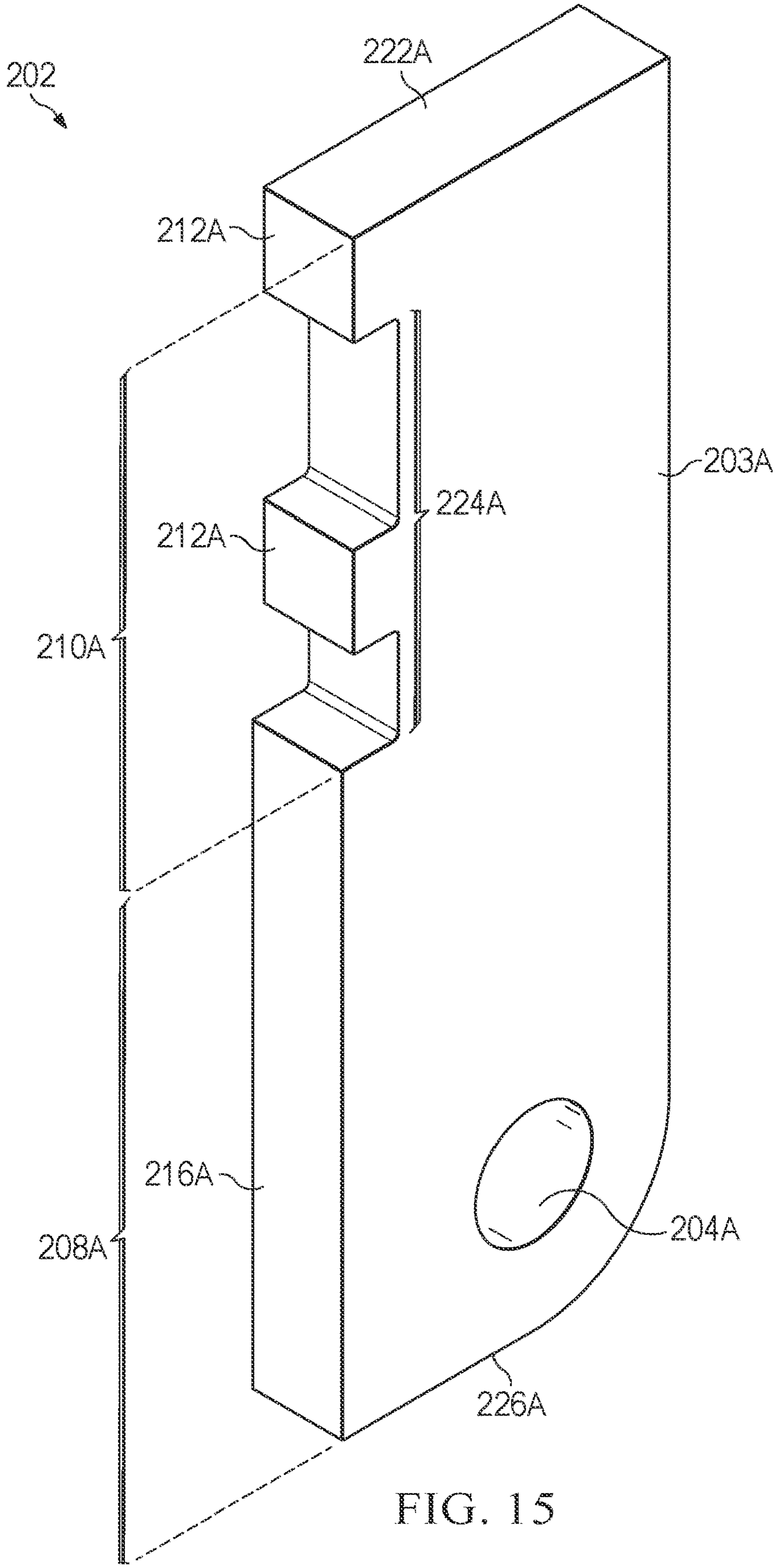
FIG. 15 is a perspective view of a pivot anchor of a dock leveler in accordance with an example of the present disclosure.

As shown in FIGS. 13-15, the body 203A of the pivot anchor 202 has a pivot hole 204A. The pivot hole 204A may be positioned in a bottom portion 208A of the body 203A, which may be disposed below the face plate 125. The pivot hole 204A may alternatively be positioned in a top portion 210A of the body 203A, or any other portion of the body 203A. The top portion 210A can be configured to abut against or extend from the face plate 125. Positioning the pivot hole 204A in different portions of the body 203A may change the amount of force exerted on various locations on the body 203A. For example, positioning the pivot hole 204A in the top portion 210A may result in greater amounts of stress on the face plate 125, while positioning the pivot hole 204A in the bottom portion 208A may result in greater force being exerted on the vertical wall 111, rather than on the face plate 125 and the pivot anchor 202. Positioning the pivot hole 204A in the top portion 210A may result in more stress at the place(s) where the body 203A couples to the face plate 125, compared to when the pivot hole 204A is position in the bottom portion 208A.

In some examples, the top portion 210A has at least one protrusion 212A. The at least one protrusion 212A can be configured to couple with at least one hole in the face plate 125 of the dock leveler 114. In some examples, the at least one hole in the face plate 125 is a recess, an indentation, or a groove, among other things. The body 203A may be centered about the length of the face plate 125. Alternatively, the body 203A may be located at any point on the face plate 125. In some examples, the pivot anchor plate is welded to the face plate 125 where the at least one protrusion 212A couples with the at least one hole in the face plate 125. In some examples, the at least one protrusion 212A is one protrusion. In other examples, the at least one protrusion 212A is any number of protrusions. A protrusion of the at least one protrusion 212A may extend from an uppermost wall 222A of the body 203A. Another protrusion of the at least one protrusion 212A may extend from a recess 224A in the top portion 210A of the body 203A. As shown, the height of the at least one protrusion 212A may be less than half the height of the top portion 210A. If the at least one protrusion 212A comprises multiple protrusions, the combined height of the multiple protrusions may be less than half the height of the top portion 210A. In other examples, the length of the at least one protrusion 212A is more than half the length of the top portion 210A.

Figure 16:
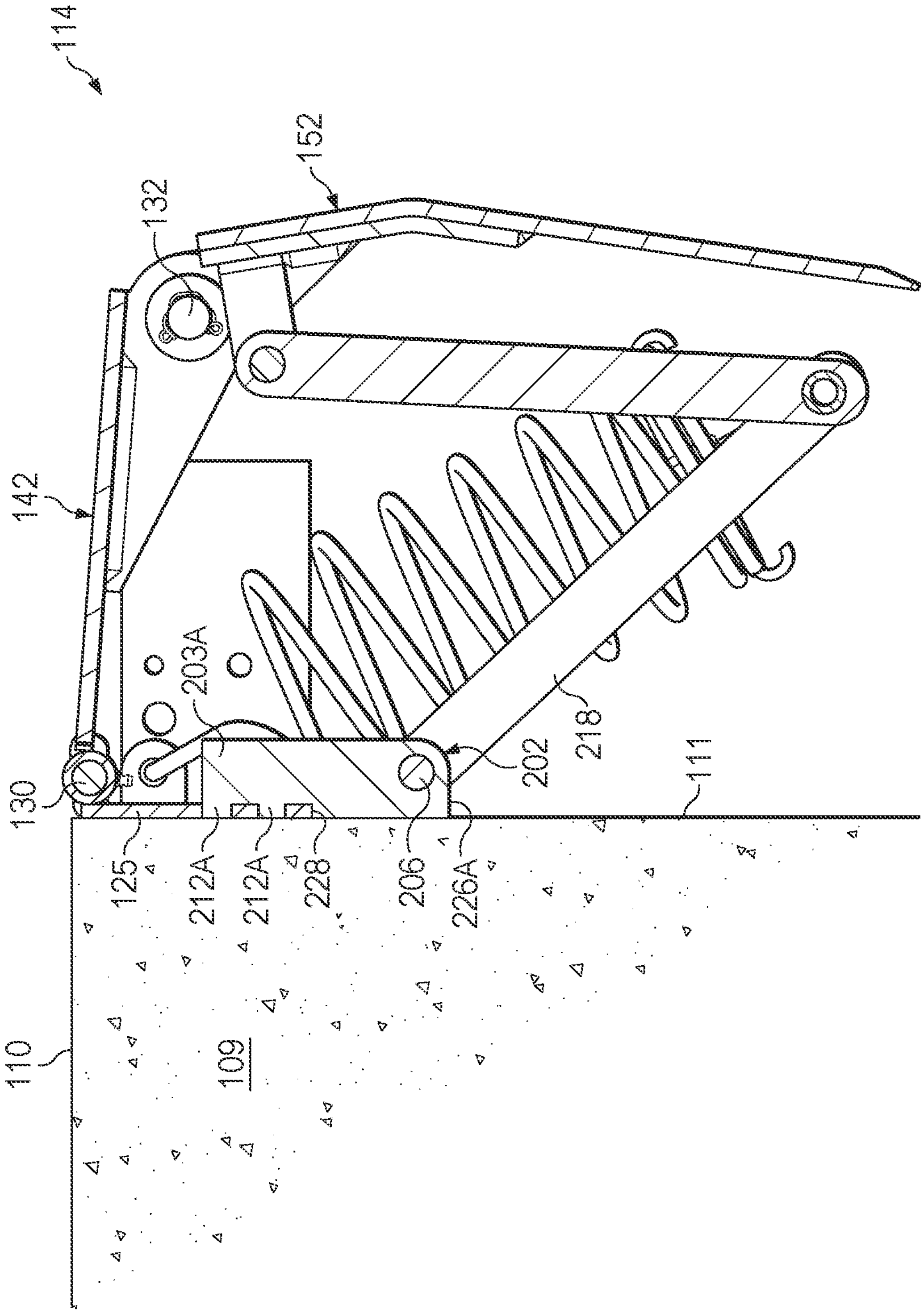
FIG. 16 is a section view of a dock leveler in accordance with an example of the present disclosure.
Figure 17:
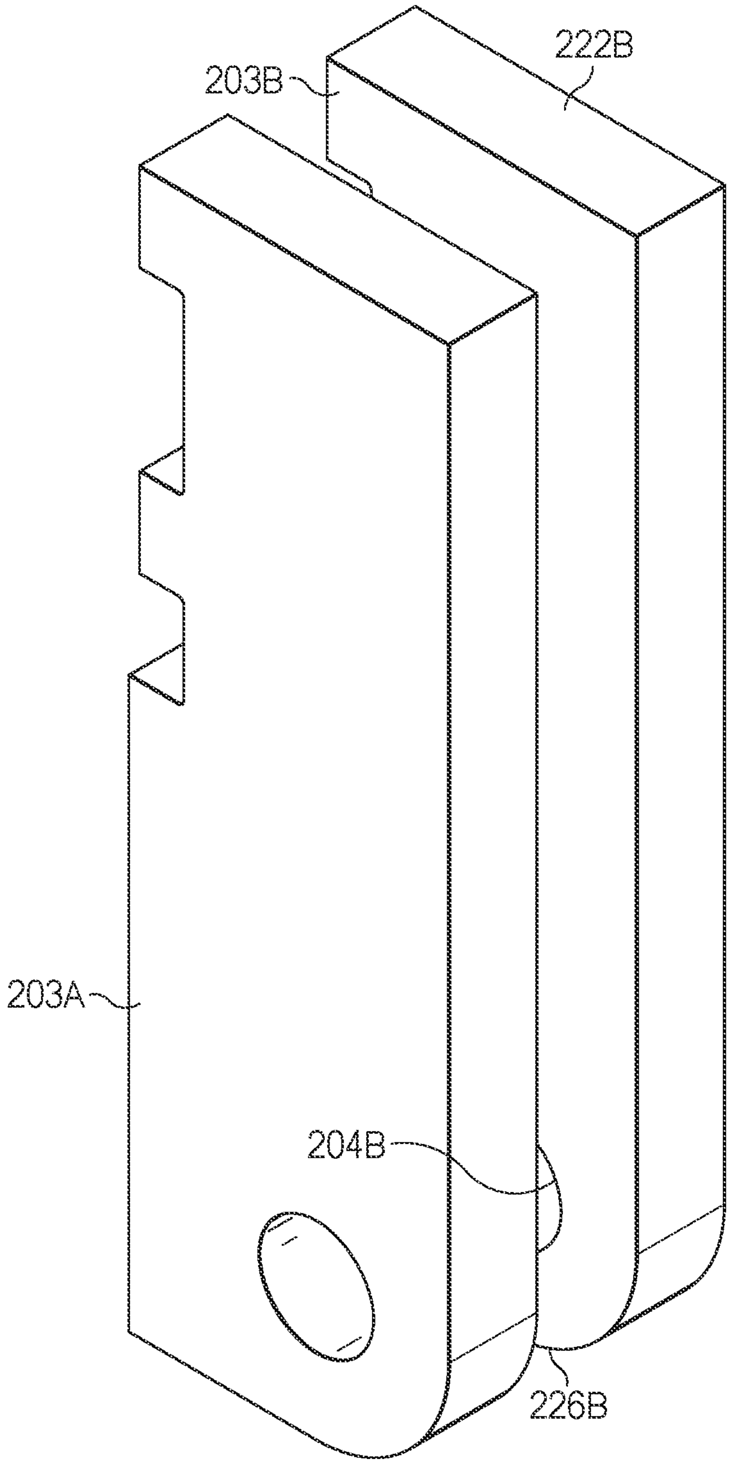
FIG. 17 is a perspective view of a pivot anchor of a dock leveler in accordance with an example of the present disclosure.
Figure 18:
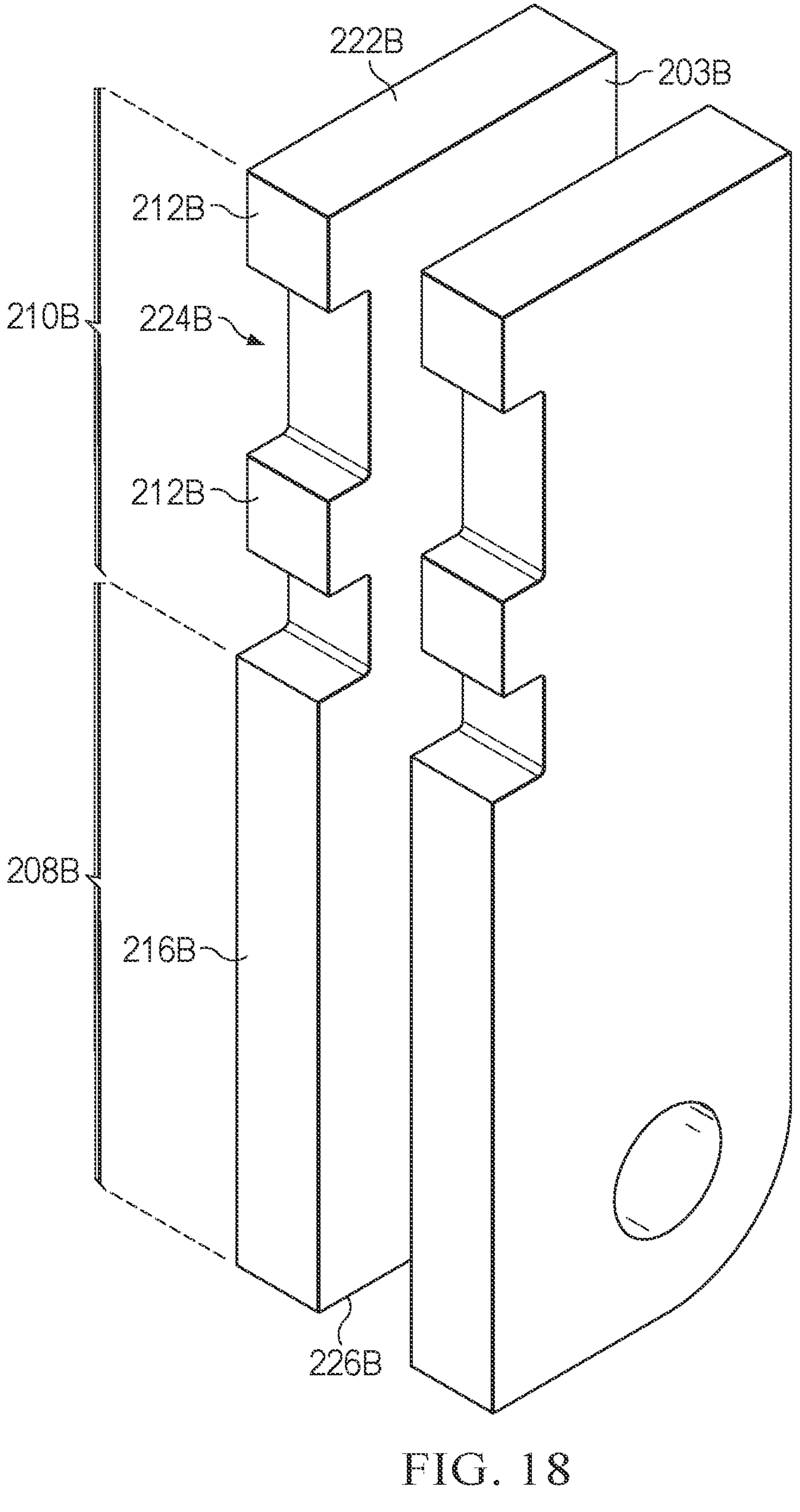
FIG. 18 is a perspective view of a pivot anchor of a dock leveler in accordance with an example of the present disclosure.
Figure 19:
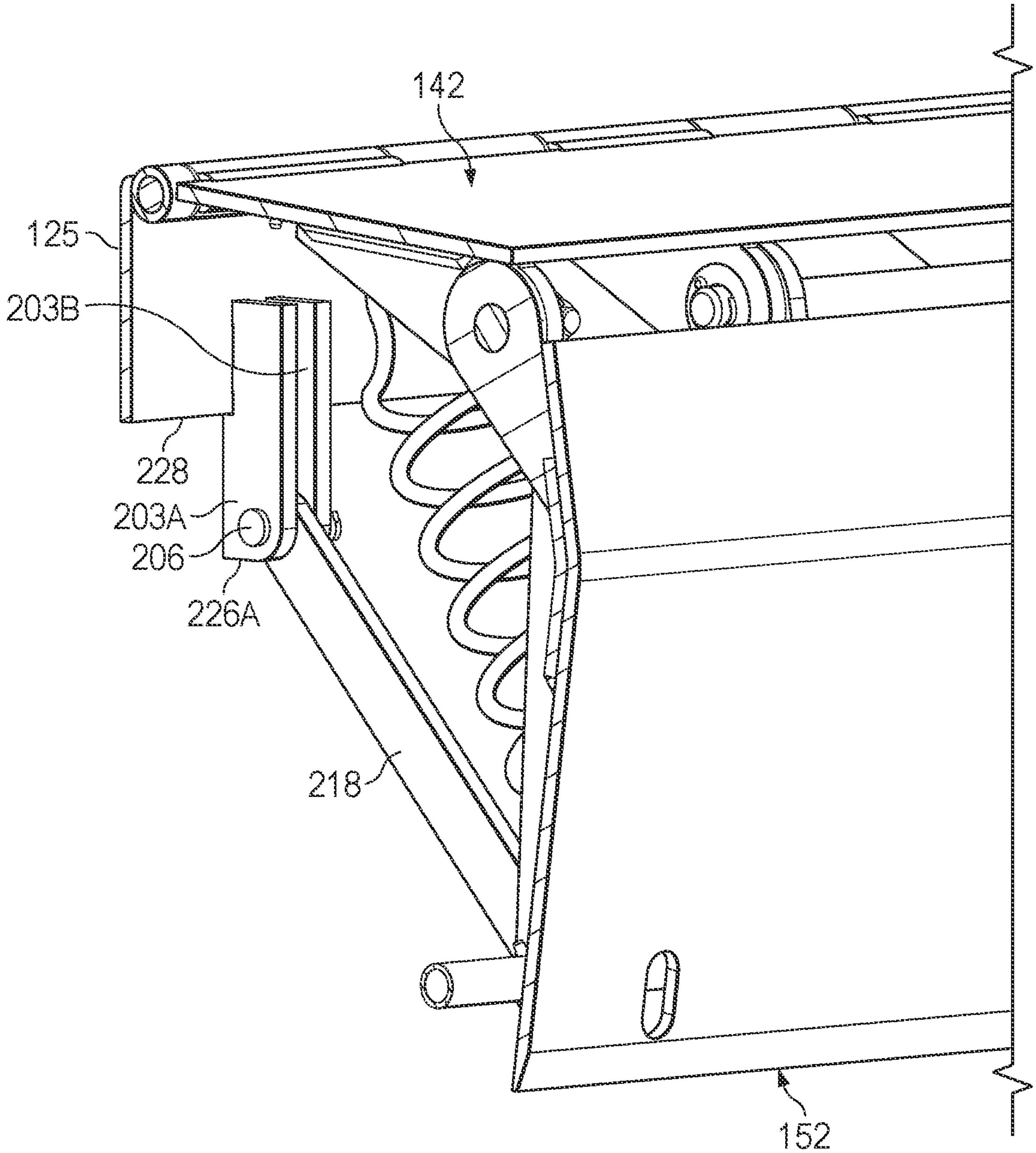
FIG. 19 is a perspective section view of a dock leveler in accordance with an example of the present disclosure.
Figure 20:
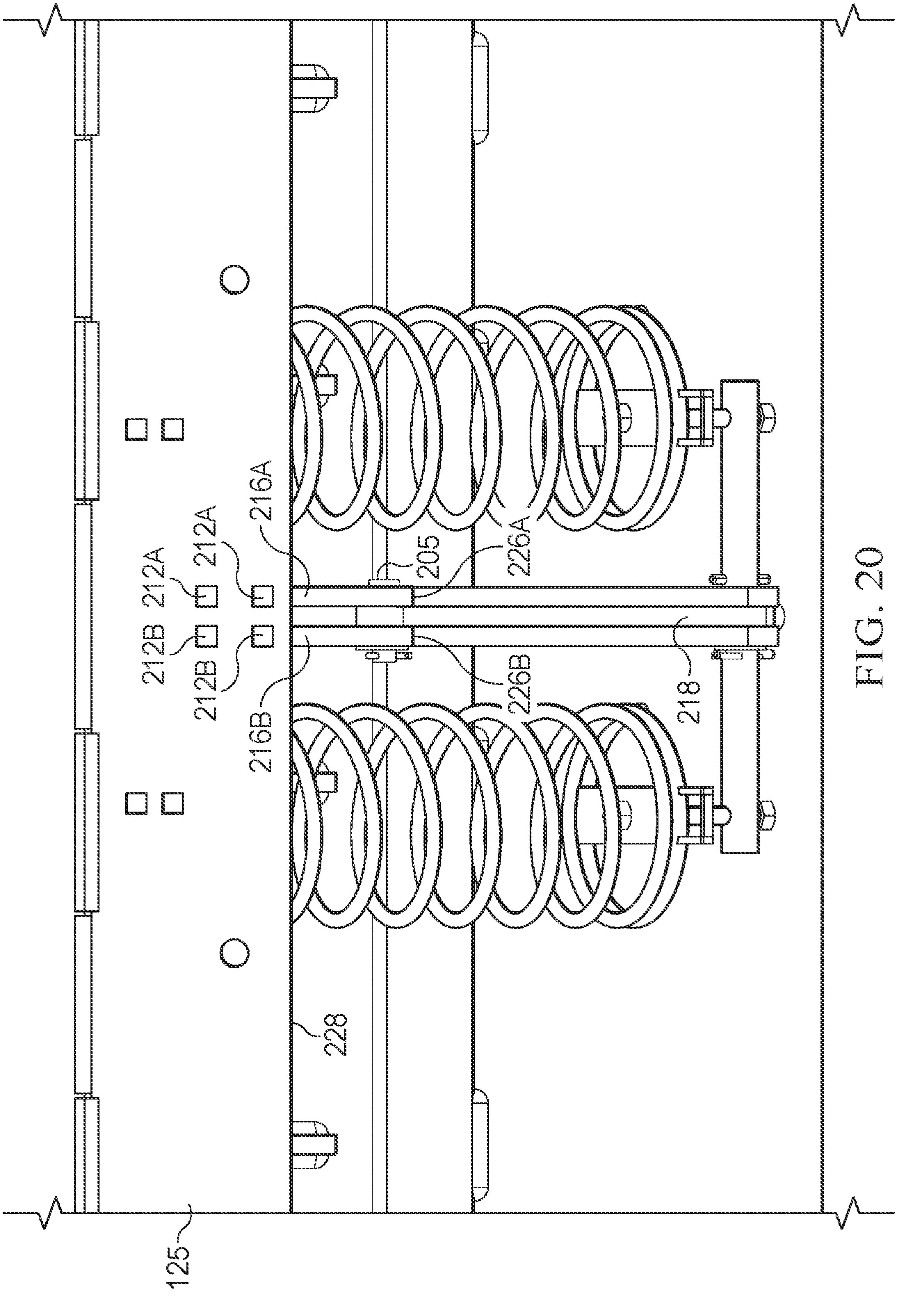
FIG. 20 is a rear view of a dock leveler in accordance with an example of the present disclosure.

As shown in FIG. 16, the pivot hole 204A in the body 203A may be configured to receive a pivot pin 206 of the dock leveler 114. The pivot pin 206 may be a pivotable member. The pivot hole 204A may extend through the width (W) of the body 203A from one side of the body 203A to another side of the body 203A. The bottom portion 208A of the body 203A has a support surface 216A configured to contact the vertical wall 111 of the dock 109. In some examples, the at least one protrusion 212A and the support surface 216A are oriented in substantially the same direction, for example, in a direction towards the vertical wall 111. A bottom edge 226A of the bottom portion 208A may be positioned lower on the vertical wall 111 than a bottom edge 228 of the face plate 125. The contact between the support surface 216A and the vertical wall 111 provides support for the dock leveler 114. For example, when the dock leveler 114 is operated, a lower linkage bar 218 coupled to the pivot pin 206 may apply a force to the pivot pin 206, which then applies a force to the pivot anchor 202, which then applies a force to the vertical wall 111 of the dock 109 and/or to the face plate 125. Generally, the length of the bottom portion 208A may be greater than the length of the top portion 210A, causing more force to be distributed to the dock 109, rather than to the face plate 125. It may not be necessary for the bottom portion 208A to be greater in length than the top portion 210A to distribute force from the pivot pin 206 to the dock 109, rather than to the face plate 125. Additionally, the width (W) of the body 203A may be less than the height (H) of the body 203A, increasing the stability of the pivot anchor 202 and minimizing forces felt where the body 203A couples to the face plate 125.

As shown in FIGS. 17-20, the pivot anchor 202 may comprise a plurality of bodies 203A, 203B. For example, the pivot anchor 202 may comprise the body 203A and a body 203B. In other examples, any number of bodies may be included in the pivot anchor 202. When the pivot anchor 202 includes a plurality of bodies, for example, the bodies 203A, 203B, the pivot anchor 202 may have heightened stability and strength. In some examples, the bodies 203A and 203B are connected, further increasing their stability and their ability to withstand internal loads and stresses. The bodies 203A,203B may both be configured to project laterally away from the face plate 125.

When the pivot anchor 202 comprises the bodies 203A and 203B, the lower linkage bar 218 may be rotatably connected to the pivot pin 206 between the body 203A and the body 203B. When the pivot anchor 202 only comprises one of the bodies 203A, the lower linkage bar 218 may couple to the pivot pin 206 on either side of the body 203A. In some examples, when the pivot anchor 202 only comprises one of the bodies 203A, multiple of the lower linkage bars 218 may be attached to the pivot pin 206 on both sides of the body 203A. In some examples, when the pivot anchor 202 comprises a plurality of the bodies 203A, 203B, multiple lower linkage bars 218 may be rotatably connected to the pivot pin 206 on the external sides of the body 203A and the body 203B, respectively.

The features of the body 203B may be substantially the same as, or different than, the features of the body 203A. For example, the body 203B may be manufactured with the same dimensions and specifications of the body 203A. In some examples, the pivot hole 204A and a pivot hole 204B are positioned in the bottom portion 208A and a bottom portion 208B of the body 203B, respectively. Like the bottom portion 208A, the bottom portion 208 may be disposed below the face plate 125. The at least one protrusion 212A of the top portion 210A and at least one protrusion 212B of a top portion 210B may be oriented in substantially the same direction as the support surface 216A and a support surface 216B of the body 203B. The top portions 210A, 210B can be configured to abut against the vertical wall 111. In some examples, the height of the at least one protrusion 212A of the body 203A and the at least one protrusion 212B of the body 203B are less than half the height of the top portion 210A and the top portion 210B, respectively. In some examples, the height of the at least one protrusion 212A and the at least one protrusion 212B are greater than half the height of the top portion 210A and the top portion 210B, respectively.

In some examples, the protrusion of the at least one protrusion 212A extends from the uppermost wall 222A and a protrusion of the at least one protrusion 212B extends from an uppermost wall 222B of the body 203B. Another protrusion of the at least one protrusion 212A may extend from the recess 224A in the body 203A, while another protrusion of the at least one protrusion 212B may extend from a recess 224B in the top portion 210B in the body 203B. When the pivot anchor 202 comprises the bodies 203A and 203B, the bottom edge 226A and a bottom edge 226B of the body 203B can both be positioned lower on the vertical wall 111 of the dock 109 than the bottom edge 228 of the face plate 125. The body 203A and the body 203B may be collectively centered about the length of the face plate 125. In some examples, the length (L) of the body 203A and the length of the body 203B are less than the height of the body 203A and the body 203B, respectively.

Distributing greater force to the dock 109, rather than to the face plate 125, reduces the amount of stress placed at the area where the pivot pin 206 is coupled to the pivot anchor 202 as well as the stress placed at the area where and the face plate 125 attaches to the pivot anchor 202. Reduction of stress at these areas of the dock leveler 114 reduces the likelihood of mechanical failure. Additionally, the pivot anchor 202 allows the face plate 125 to be manufactured in smaller dimensions, reducing material and manufacturing costs.

FIGS. 21-25 illustrate a spring anchor 302 and a spring assembly 304. The spring assembly 304 may be part of the counterbalancing assembly 119 of the dock leveler 114. Among other things, the spring anchor 302 simplifies manufacturing of a spring(s) 306 of the dock leveler 114, reduces material costs during manufacturing of the springs 306, and increases and unifies the spring constant across the length of springs 306. In some examples, the spring assembly 304 may comprise one spring 306. In some examples, the spring assembly 304 may comprise a plurality of springs 306. Correspondingly, the spring assembly 304 may comprise one of the spring anchors 302 or a plurality of the spring anchors 302. Typically, the number of the spring anchors 302 corresponds to the number of the springs 306. However, the number of the spring anchors 302 need not correspond directly to the number of the springs 306. For example, the spring assembly 304 may include two of the springs 306 and four of the spring anchors 302, two of the spring anchors 302 for each spring 306. Other variations are contemplated, for example, where there are more of the springs 306 than the spring anchors 302.

Figure 21:
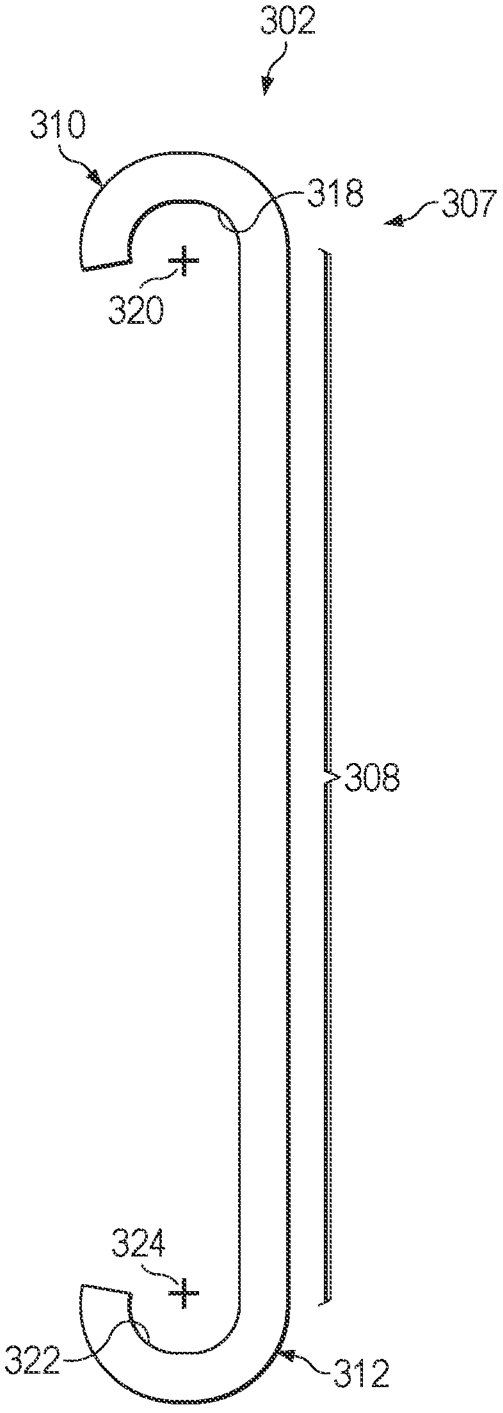
FIG. 21 is a side view of a spring anchor of a dock leveler in accordance with an example of the present disclosure.
Figure 22:
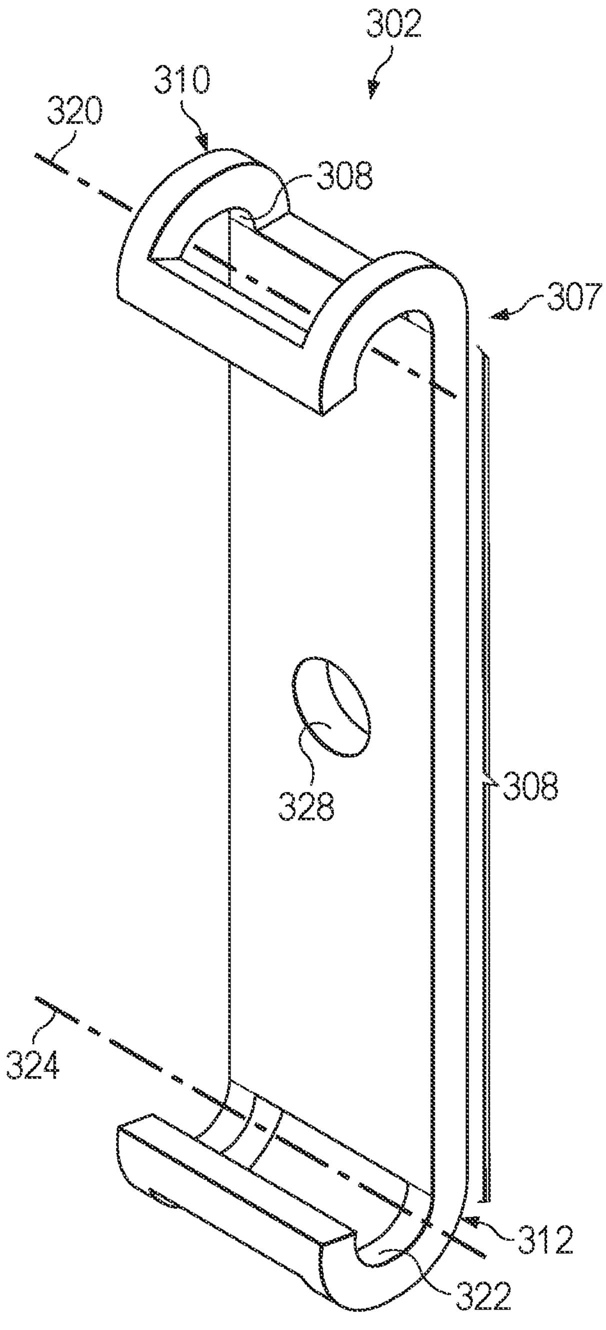
FIG. 22 is a perspective view of a spring anchor of a dock leveler in accordance with an example of the present disclosure.

As shown in FIGS. 21 and 22, the spring anchor 302 comprises an anchor plate 307. The anchor plate 307 has may span a width of the spring 306 of the dock leveler 114 to permit coupling of the counterbalancing assembly 119 and the linkage system 326. In some embodiments, the anchor plate includes a middle portion 308. The anchor plate may also include an end portion 310 and an end portion 312, the end portions 310 and 312 adjacent the middle portion 308. The end portion 310 and the end portion 312 may form opposite ends of the anchor plate 307 of the spring anchor 302. The end portion 310 may be configured to wrap around an outer surface 314 of the spring 306 to secure the anchor plate to the spring. The end portion 312 may be configured to wrap around an outer surface 316 of the spring 306 to secure the anchor plate to the spring. When the end portion 310 is wrapped around the outer surface 314 the spring 306 and the end portion 312 is wrapped around the outer surface 316 of the spring 306, the anchor plate 307 and the spring 306 can forcibly secure themselves to one another due to the opposing forces they exert.

In some examples, the end portion 310 has a curved inner surface 318 that wraps around the spring 306. The curved inner surface 318 may extend greater than 90 degrees, but less than 180 degrees about a longitudinal axis 320 of the end portion 310. The curved inner surface 318 may extend 180 degrees about the longitudinal axis 320. In some examples, as shown in FIG. 21, the curved inner surface 318 extends greater than 180 degrees about the longitudinal axis 320 of the end portion 310.

In some examples, the end portion 312 has a curved inner surface 322 that wraps around the spring 306. In some examples, the curved inner surface 322 extends greater than 90 degrees, but less than 180 degrees about a longitudinal axis 324 of the end portion 312. The curved inner surface 322 may extend 180 degrees about the longitudinal axis 324. In some examples, as shown in FIG. 21, the curved inner surface 322 extends greater than 180 degrees about the longitudinal axis 324 of the end portion 312.

The anchor plate 307 of the spring anchor 302 may be configured to couple to the linkage system 326. The linkage system 326 may be part of the counterbalancing assembly 119 of the dock leveler 114. In some examples, the anchor plate 307 is configured to couple to the linkage system 326 through a hole 328 defined in the middle portion 308 of the anchor plate 307. In some examples, the hole 328 is configured to receive a connection member 330 of the linkage system 326. The hole 328 and the connection member 330 may be threaded, to facilitate connection. Further, nuts and washers or other fastening components may be used to maintain the connection between the hole 328 and the connection member 330. A tension of the spring 306 can be manipulated by rotating the connection member 330 in and out of the threaded hole. For example, if an operator desires more tension in the spring, the connection member 330 can be rotated further through the hole 328, forcing the spring to expand. Conversely, if less tension is desired, the operator may rotate the connection member 330 further out of the hole 328, shortening the distance the spring 306 is required to cover. This is explained more fully below, while providing further details regarding the spring assembly 304.

In some examples, the end portion 310 and the end portion 312 may be thinner than the middle portion 308, to increase the flexibility and workability of the end portion 310 and the end portion 312. Furthermore, the end portion 310 and the end portion 312 may not be solid. For example, they may have a cutout, gap, or hole defined therein. Reducing the material in the end portions 310 and 312 may allow the end portions 310 and 312 to more easily wrap around the outer surface 314 and the outer surface 316 of the spring, respectively.

Figure 23:
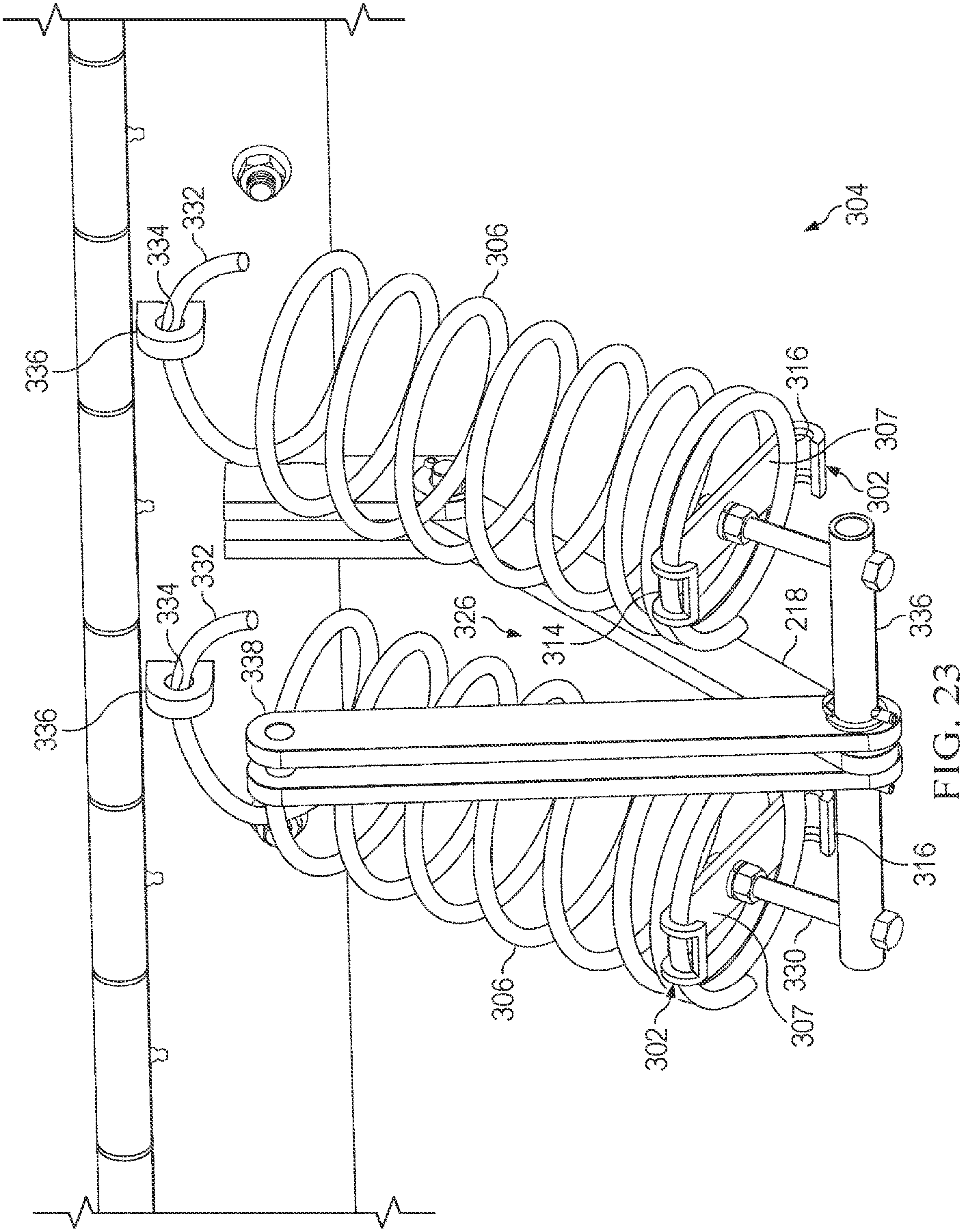
FIG. 23 is a perspective view of a spring assembly of a dock leveler in accordance with an example of the present disclosure.
Figure 24:
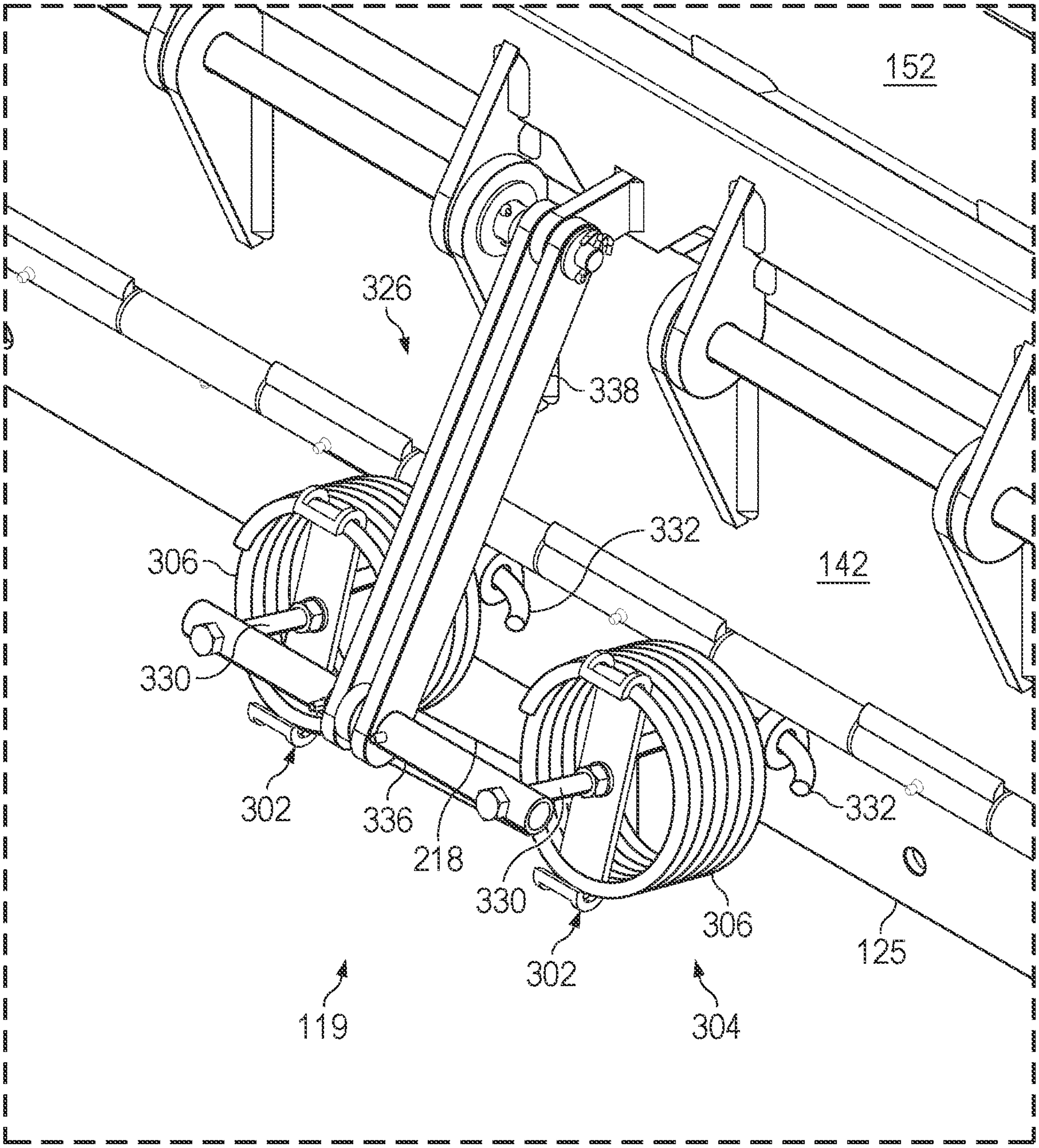
FIG. 24 is a perspective view of a spring assembly of a dock leveler in accordance with an example of the present disclosure.
Figure 25:
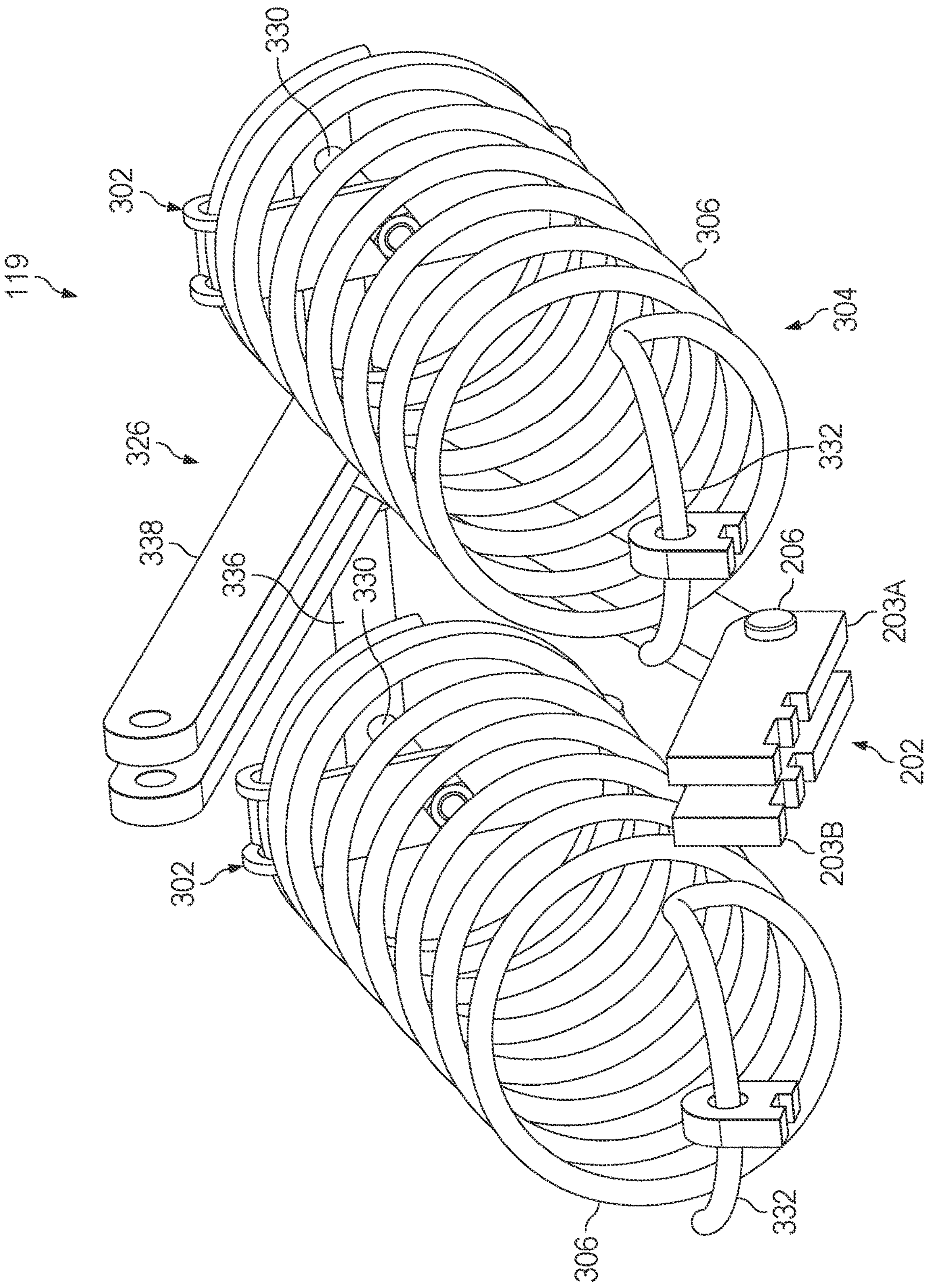
FIG. 25 is a perspective view of a spring assembly of a dock leveler in accordance with an example of the present disclosure.

FIGS. 23-25 show the spring assembly 304 coupled to the linkage system 326. In some examples, the spring assembly 304 and the linkage system 326 form the counterbalancing assembly 119. In some examples, the spring assembly includes at least one of the springs 306. The spring 306 may have an end 332 coupled to the face plate 125 of the dock leveler 114. The end 332 may be curved and may be inserted through an opening 334 in a tab 336, the tab 336 extending from the face plate 125. In other examples, the end 332 may be welded to the face plate 125. The tension in the spring 306 and the curved shape of the end 332 may prevent the spring from becoming unattached from the face plate 125. The spring assembly 304 further includes at least one of the anchor plates 307 described above with respect to the spring anchor 302. The at least one of the anchor plates 307 may be secured to the at least one of the springs 306 as described above. The hole 328 defined by the middle portion 308 may couple the spring assembly 304 to the linkage system 326.

In some examples, the spring assembly 304 includes a plurality of the springs 306 and a plurality of the spring anchors 302. For example, as shown, the spring assembly 304 can include two of the springs 306 and two of the spring anchors 302. In such an example, both of the springs 306 may be coupled to the face plate 125 and to the linkage system 326. The connection members 330 may attach to a crossbar 337 of the linkage system 326. The crossbar 337 can extend through the lower linkage bar 218 and an upper linkage bar 338. The crossbar 337 and the connection members 330 distribute force through the spring anchors 302 and into the springs 306. The crossbar 337 may provide stability to the counterbalancing assembly 119 as the dock leveler 114 moves between the lowered, lifted, and extended positions. The crossbar 337 may also ensure that equal amounts of force are applied to each of the springs 306.

Although the spring anchor 302 is shown in a vertical orientation, other orientations of the spring anchor 302 are contemplated. For example, the spring anchors 302 may span horizontally across widths of the springs 306. Any rotational orientation of the spring anchor is possible. Additionally, the spring anchor 302 may be positioned on any coil of the spring 306, to ensure that the spring anchor does not become unattached from the spring 306, due to the terminal end of the spring 306. Positioning the spring anchor 302 on various coils may alter the tension and compression the spring 306 provides. This may be advantageous, depending on the application of the dock leveler 114.

Using the one or more spring anchor 302 as described allows for the use of springs 306 which do not have a conical or tapered end. The springs 306 may be substantially uniform throughout the majority or all of the spring 306. This simplifies the manufacturing process of the springs 306 and reduces material costs. Furthermore, because the springs 306 are not conical or tapered, the spring constant across the length of the springs 306 is increased as well as more uniform, leading to efficiency, consistency, and predictability, in operating the dock leveler 114.

Figure 26:
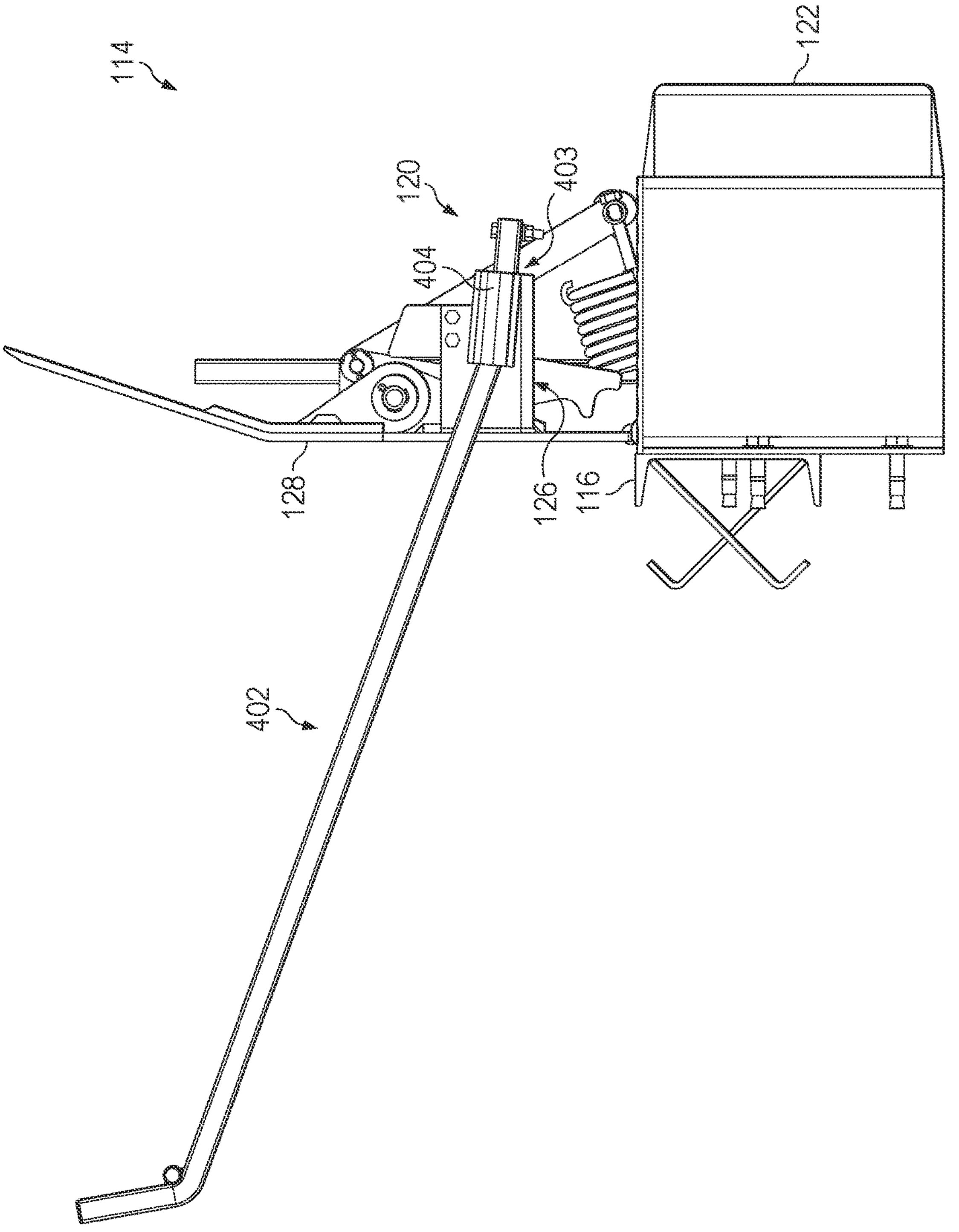
FIG. 26 is a side view of a dock leveler including a lifting assembly in accordance with an example of the present disclosure.
Figure 27:
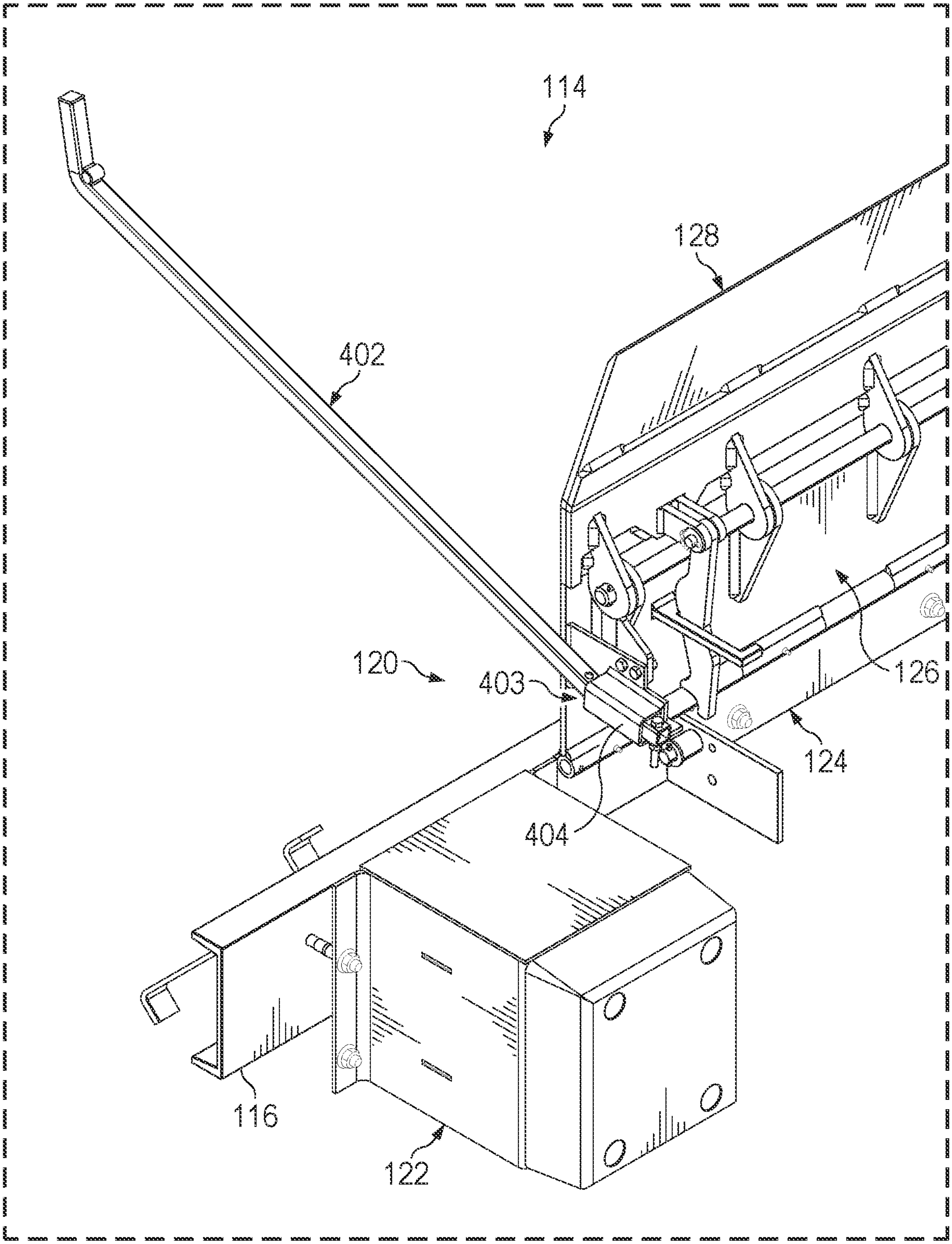
FIG. 27 is a perspective view of a dock leveler including a lifting assembly in accordance with an example of the present disclosure.

FIGS. 26-35 illustrate a lift lever 402 and a lift lever retainer 404 of the lifting assembly 120. The lifting assembly 120 may be operably graspable by a user to lift, lower, and extend the bridge assembly 118. The lifting assembly 120 may be part of the dock leveler 114. Among other things, aspects of the lifting assembly 120 reduce burring in the lift lever 402, reduce bending and squatting movements required by operators, and reduce the number of the lift levers 402 that may become lost or misplaced. The lift lever retainer 404 may be coupled to the deck assembly 126, as shown in FIGS. 26 and 27. In some examples, the lift lever retainer 404 is coupled to the face assembly 124 or the lip assembly 128. In some examples, the dock leveler 114 includes a plurality of lift levers 402 and/or includes a plurality of lift lever retainers 404. The number of the lift lever retainers 404 need not be equivalent to the number of lift levers 402. For example, the dock leveler 114 may have two of the lift lever retainers 404 and only one lift lever 402.

Figure 28:
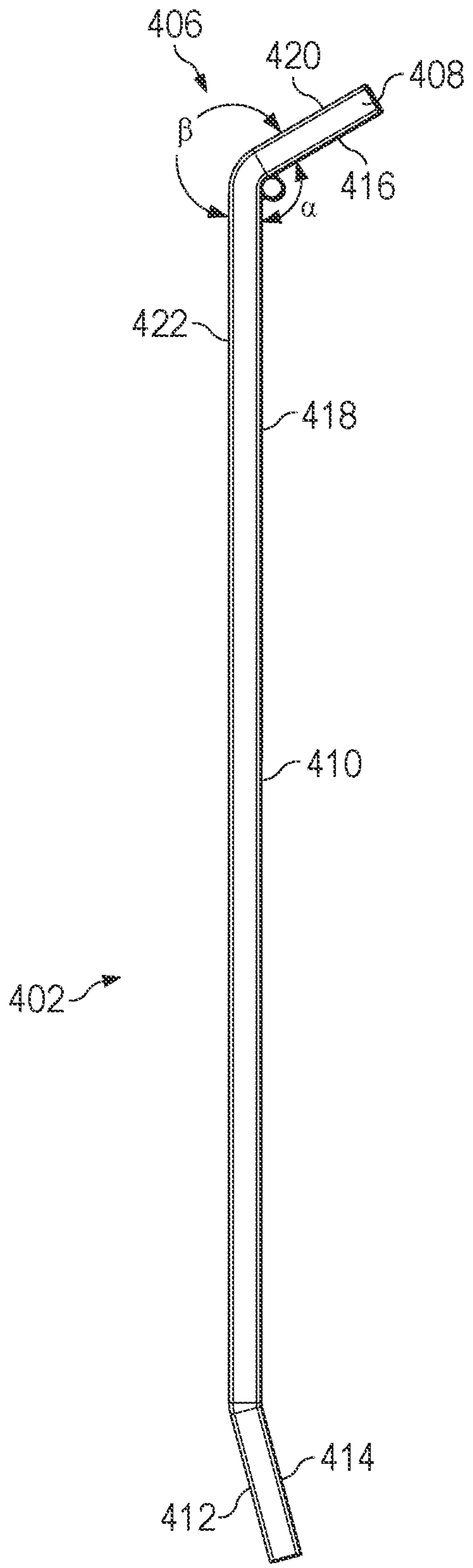
FIG. 28 is a side view of a lift lever of a dock leveler in accordance with an example of the present disclosure.
Figure 29:
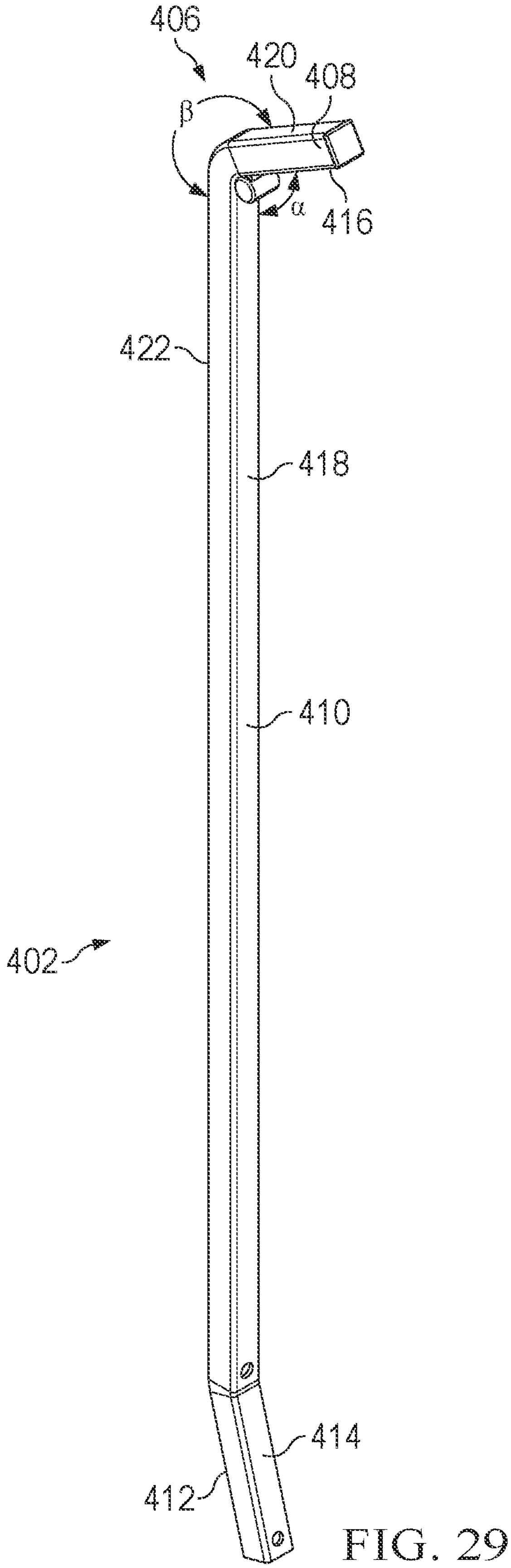
FIG. 29 is a perspective view of a lift lever of a dock leveler in accordance with an example of the present disclosure.

FIGS. 28 and 29 illustrate the lift lever 402 of the lifting assembly 120. The lift lever 402 is slidably engageable with an opening 403 defined by the lift lever retainer 404. All or some of the lift lever 402 may be slidably engageable with the lift lever retainer 404. Portions of the lift lever 402 may have a smaller circumference and maximum diameter than those of the lift lever retainer 404, respectively. The lift lever 402 is selectively stowable and has a top portion 406 including a handle 408 graspable by a user. A middle portion 410 is adjacent the top portion 406 and a bottom portion 412. The bottom portion is engageable with the lift lever retainer when, for exerting force on the lift lever retainer 404 when raising, lowering, or extending. The bottom portion 412 may be angled with respect to the middle portion 410, to provide additional leverage and to case the angles with which an operator needs to apply force to the lift lever 402 to operate the dock leveler 114. The lift lever retainer 404 may transfer the force into the dock leveler 114, causing the dock leveler 114 to move between the lifted, lowered, and extended positions.

The handle 408 of the top portion 406 may extend from the middle portion 410 in such a way as to form a first angle alpha ($\alpha$) between a side 416 of the handle 408 and a side 418 of the middle portion 410. A second angle beta ($\beta$) may be formed between a side 420 of the handle 408 and a side 422 of the middle portion 410 of the lift lever 402. In some examples, the first angle alpha ($\alpha$) is smaller than the second angle beta ($\beta$) and in some examples the first angle alpha ($\alpha$) is larger than the second angle beta ($\beta$). Similar angles are formed between the bottom portion 412 and the middle portion 410.

Figure 30:
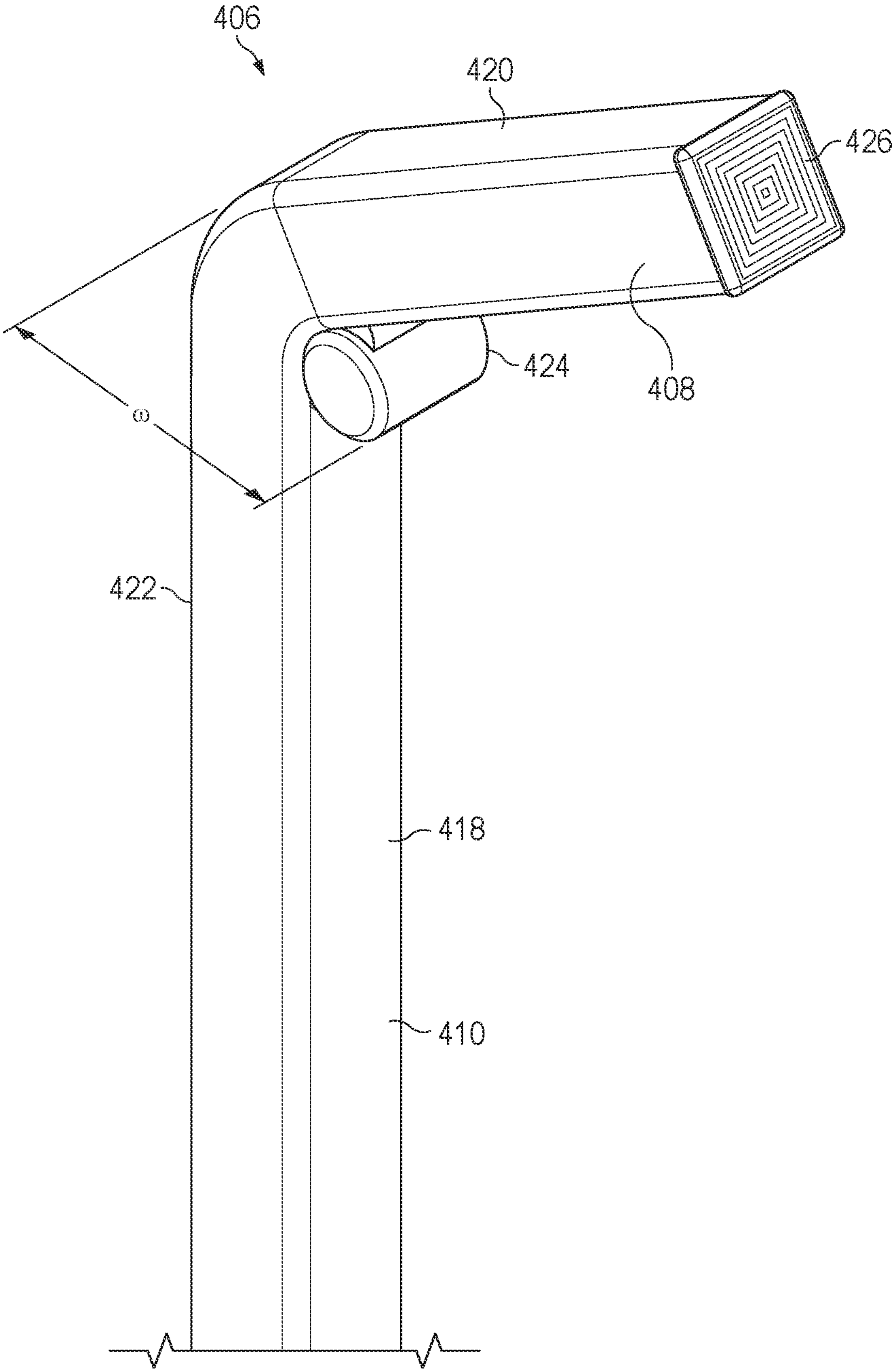
FIG. 30 is a perspective view of a top portion of a lift lever in accordance with an example of the present disclosure.

FIG. 30 illustrates a stopper 424 of the lifting assembly 120. The stopper 424 may help to reduce burring in the lift lever 402 and may help to reduce noise when the lift lever 402 is dropped to a stowed position within the lift lever retainer 404. The stopper 424 may be disposed on any portion of the lift lever 402. In some examples, the stopper 424 is disposed on the side 416 of the handle and the side 418 of the middle portion 410. Such a placement may have a variety of advantages. For example, the sides 416 and 418 are not visible to the operator. Further, the stopper 424 may provide added traction for the operator's hand as the operator pulls on the handle 408 of the lift lever 402 to operate the dock leveler 114.

A combined width (w) of the stopper 424 may be greater than a width of the opening 403 in the lift lever retainer 404. Because the width of the stopper 424 and the lift lever 402 is greater than the opening 403 in the lift lever retainer 404, the stopper 424 stops the lift lever 402 from sliding further through the lift lever retainer 404. In some examples, where the stopper 424 is not included in the lifting assembly 120, the shape of the handle 408 prevents the lift lever 402 from falling through the lift lever retainer 404. In some examples, the handle 408 may not prevent the lift lever 402 from falling through the lift lever retainer 404, depending on how the handle 408 is maneuvered.

Placing the stopper 424 on the middle portion 410 and/or the top portion 406 helps to prevent the portions of the lift lever 402 above the stopper 424 from sliding downwardly through the lift lever retainer 404. The stopper 424 can be sized larger than the opening 403 in the lift lever retainer. In some examples, the stopper 424 may be placed where the top portion 406 and the middle portion 410 merge. In such an example, the lift lever 402 can be stowed in a lowered position. If the stopper 424 is located on the middle portion 410 or the bottom portion 412, the lift lever 402 can be stowed in raised or suspended positions.

Further, the stopper 424 presents other advantages such as preventing contact between the handle 408 and the lift lever retainer 404 to prevent burs from forming in the handle 408 over time. Additionally, preventing contact between the handle 408 and the lift lever retainer 404 may reduce noise. For example, the stopper 424 may be solid, dampening the audible noise created when the lift lever 402 engages the lift lever retainer 404 as it is moved to a stowed position. In some examples, the stopper is a metal or a metal alloy and may be welded to the lift lever 402. The stopper 424 may also be a polymer. When the stopper 424 is a polymer and is coupled to the lift lever 402, the polymer can absorb the impact generated when the lift lever 402 is dropped through the lift lever retainer 404 by an operator. This may reduce noise. Placing an end cap 426 on the top end of the handle 408 may further reduce noise, and may make grasping the handle more comfortable, and may be aesthetically pleasing.

Figure 31:
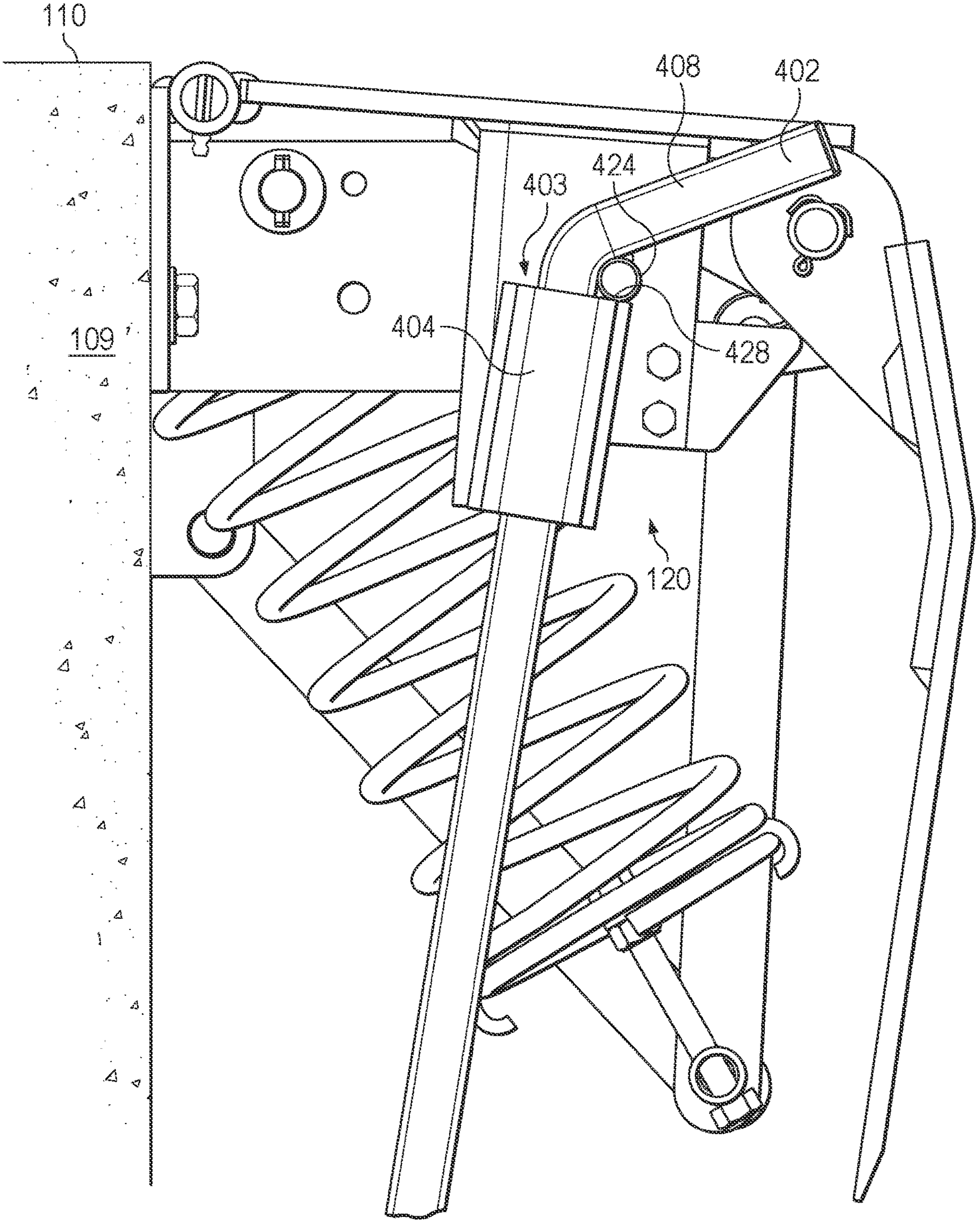
FIG. 31 is a side view of a lift lever in a stowed position in accordance with an example of the present disclosure.
Figure 32:
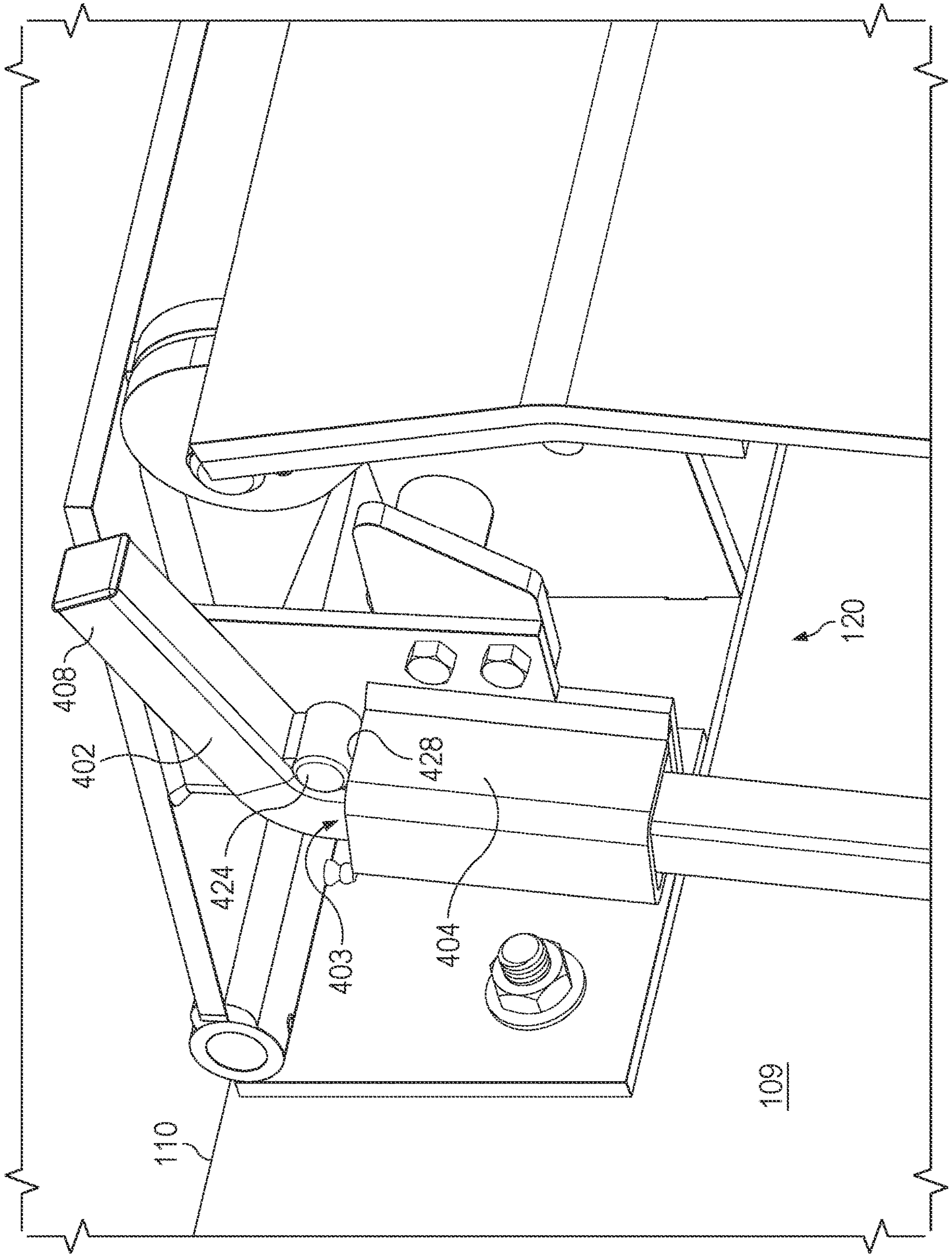
FIG. 32 is a perspective view of a lift lever in a stowed position in accordance with an example of the present disclosure.

FIGS. 31 and 32 illustrate the lifting assembly 120 in a stowed position. The stopper 424 is preventing the lift lever 402 from falling through the lift lever retainer 404. In some examples, the stopper 424 rests on an upper edge 428 of the lift lever retainer 404. Because the stopper 424 is positioned between the handle 408 and the lift lever retainer 404, the handle 408 is protected from the upper edge 428 of the lift lever retainer 404. As shown, the lift lever retainer 404 may be connected to the dock leveler 114 through a gusset member 429. In some examples, the lift lever retainer 404 is positioned on a side of the dock leveler 114.

Figure 33:
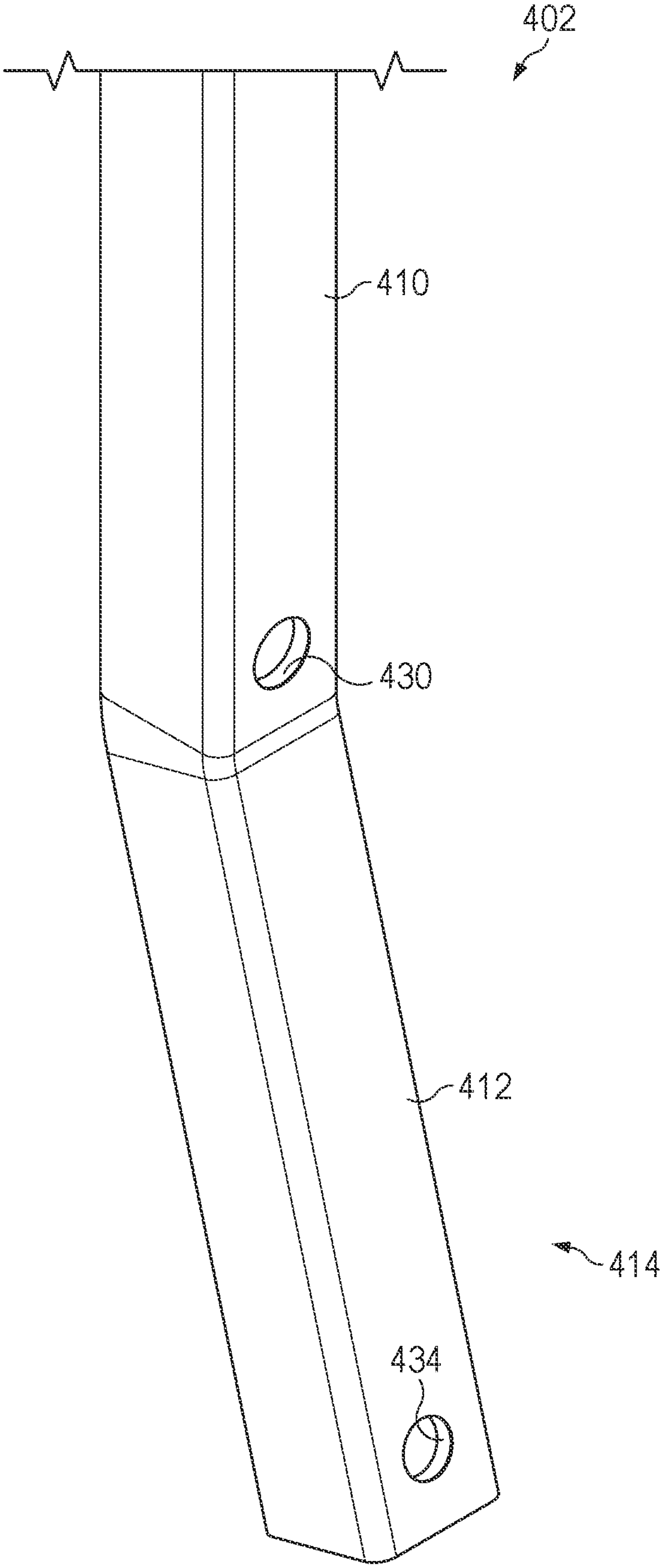
FIG. 33 is a perspective view of a bottom portion of a lift lever of a dock leveler in accordance with an example of the present disclosure.
Figure 34:
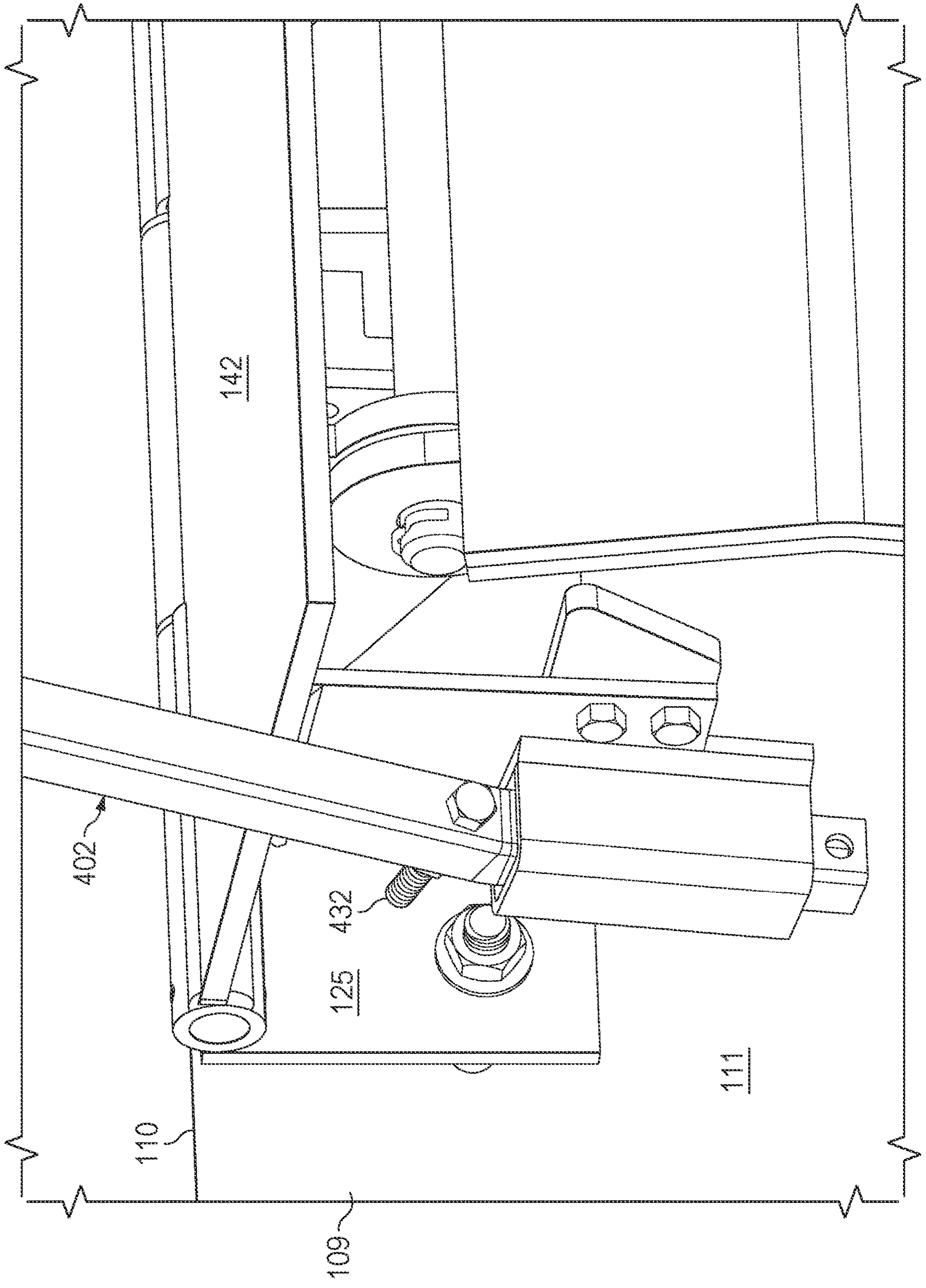
FIG. 34 is a perspective view of a lifting assembly of a dock leveler in accordance with an example of the present disclosure.
Figure 35:
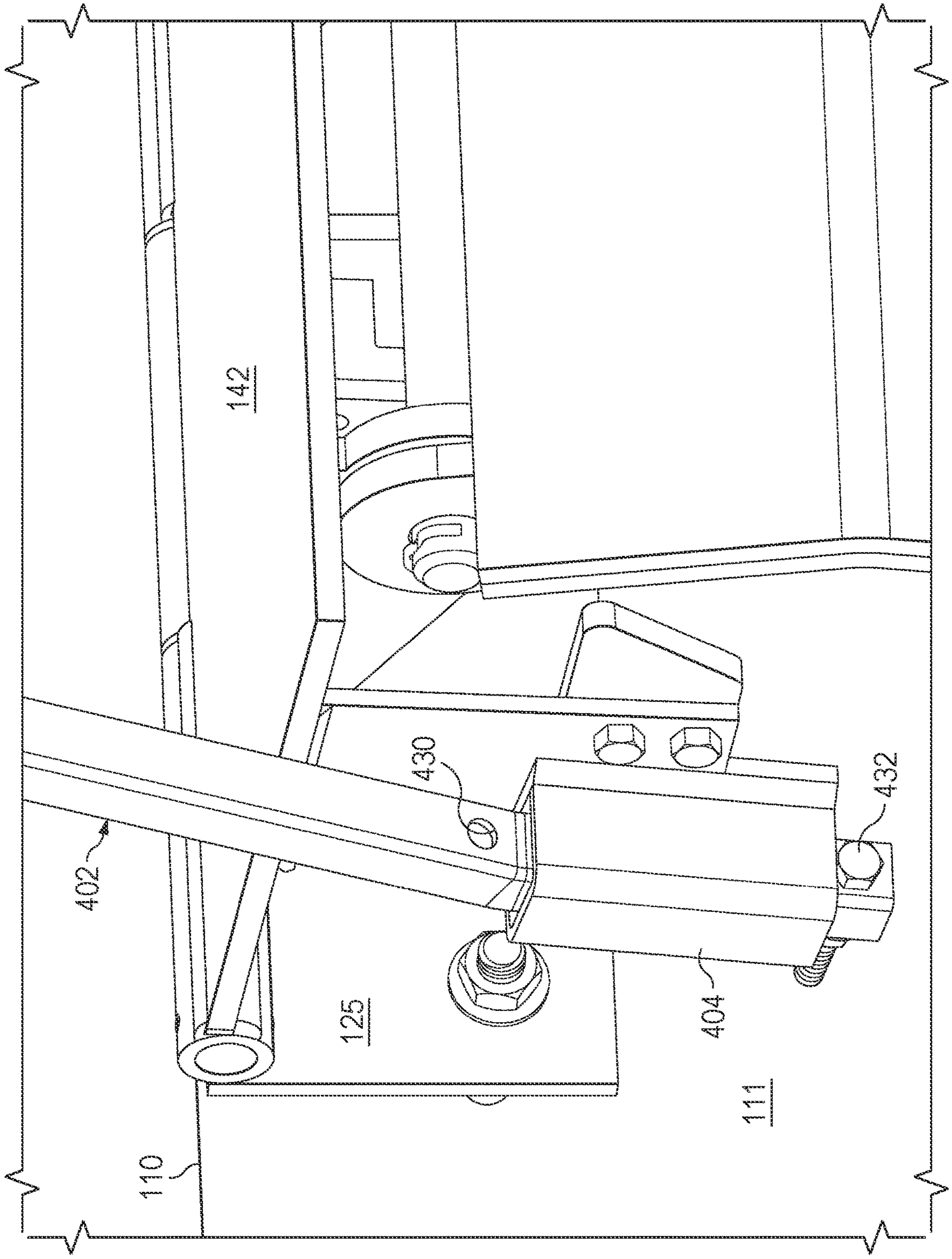
FIG. 35 is a perspective view of a lifting assembly of a dock leveler in accordance with an example of the present disclosure.

FIGS. 33-35 illustrate the bottom portion 412 and a lower end of the middle portion 410 of the lift lever 402. Aspects of examples of the lift lever 402 may reduce bending and squatting movements required by operators and reduce the number of the lift levers 402 that may become lost or misplaced. In some examples, the middle portion 410 may define a hole 430 configured to receive a blocking mechanism 432. The blocking mechanism 432 may be selectively inserted into the hole 430. The hole 430 may be defined in a bottom end of the middle portion 410. Once the blocking mechanism 432 is inserted into the hole 430, the portions of the lift lever 402 located above the hole 430 are prevented from sliding downwardly through the opening 403 in the lift lever retainer 404. In some examples, the blocking mechanism 432 is a bolt, a pin, or a screw. The blocking mechanism 432 can be of greater width than the width of the opening 403 defined by the lift lever retainer 404.

In some examples, as shown in FIG. 34, when the bottom portion 412 of the lift lever 402 has slidably engaged the opening 403 in the lift lever retainer 404 and the hole 430 has received the blocking mechanism 432, the lifting assembly 120 may be configured to be used to operate the dock leveler 114, stowed in a raised position, and/or removed from the lift lever retainer 404. That is, an operator can operate the dock leveler 114 with the blocking mechanism 432 inserted into the hole 430 at the bottom of the middle portion 410. Alternatively, the operator can remove the lift lever 402 from the lift lever retainer 404 and set the lift lever 402 aside until operation of the dock leveler 114 is desired. Additionally, the operator can leave the lifting assembly 120 stowed in a raised position.

The blocking mechanism 432 and the lift lever 402 may be configured in such a way that the middle portion 410 of the lift lever 402 is oriented perpendicularly with respect to the horizontal dock surface 110 of the dock 109. In some examples, the lift lever 402 is tilted away from or towards the dock 109 when the lift lever 402 is stowed in a raised position. In some examples (not shown), the hole 430 can be located further up the lift lever 402. When the hole 430 is located further up the lift lever 402, for example, in the middle or top of the middle portion 410, the lift lever 402 can be stowed in a suspended position, where a substantial portion of the lift lever 402 is below the lift lever retainer 404 and a substantial portion of the lift lever 402 is above the lift lever retainer 404.

In some examples, the bottom portion 412 of the lift lever 402 may define a hole 434 configured to receive the blocking mechanism 432. The hole 434 can be defined in a bottom end of the bottom portion 412, to allow the majority of the bottom portion 412 to be engageable with the lift lever retainer 404. The blocking mechanism 432 may be selectively inserted into the hole 434. The hole 434 may be defined in the bottom of the bottom portion 412 such that the blocking mechanism 432 does not interfere or prohibit operation of the dock leveler 114. When the blocking mechanism 432 is inserted into the hole 434, the portions of the lift lever 402 above the hole 434 are prevented from sliding upwardly though the opening 403 defined by the lift lever retainer 404.

In some examples, as shown in FIG. 35, when the bottom portion 412 of the lift lever 402 has slidably engaged the opening 403 in the lift lever retainer 404 and the hole 434 has received the blocking mechanism 432, the lifting assembly 120 may be configured to be used to operate the dock leveler 114, stowed in a lowered position, and/or irremovable from the lift lever retainer 404. That is, an operator can operate the dock leveler 114 with the blocking mechanism 432 inserted into the hole 434 in the bottom portion 412. Alternatively, the operator can drop or lower the lift lever 402 through the lift lever retainer 404 to stow the lift lever 402 in a lowered position. Additionally, when the blocking mechanism 432 is inserted through the hole 434, an operator cannot slide the lift lever 402 out of the lift lever retainer 404 until the blocking mechanism 432 is removed.

In some examples, a plurality of blocking mechanisms 432 may be used. The blocking mechanism 432 may be inserted into the hole 430 while another of the blocking mechanism 432 is inserted into the hole 434. When the bottom portion 412 of the lift lever 402 has slidably engaged the opening 403, the hole 430 has received one of the blocking mechanisms 432, and the hole 434 has received one of the blocking mechanisms 432, the lift lever 402 may be configured to be used to operate the dock leveler 114, stowed in a raised position, and/or irremovable from the lift lever retainer. That is, when the blocking mechanism 432 is present in each of the holes 430 and 434. an operator can use the lift lever 402 to operate the dock leveler. Alternatively, the operator can leave the lift lever 402 stowed in a raised position. Additionally, the lift lever 402 is irremovable from the lift lever retainer 404. Any and all of these three actions can be completed without having to slide or manipulate the position of the lift lever 402 with respect to the lift lever retainer 404.

In some examples, the one or more of the blocking mechanisms 432 may be movably coupled to the dock leveler 114. This may prevent the locking mechanisms from getting lost or misplaced and may make operation of the dock leveler 114 more efficient. For example, the blocking mechanism 432 can be attached to the face plate 125, the deck plate 142, or the dock 109 by a chain, sting, or other freely movable device. The freely movably device would allow the blocking mechanism 432 to be selectively inserted into the holes 430 and 434. When the blocking mechanism 432 is not selectively inserted, the chain, string, or movable attachment method can retain the blocking mechanism 432 in close proximity.

Figure 36:
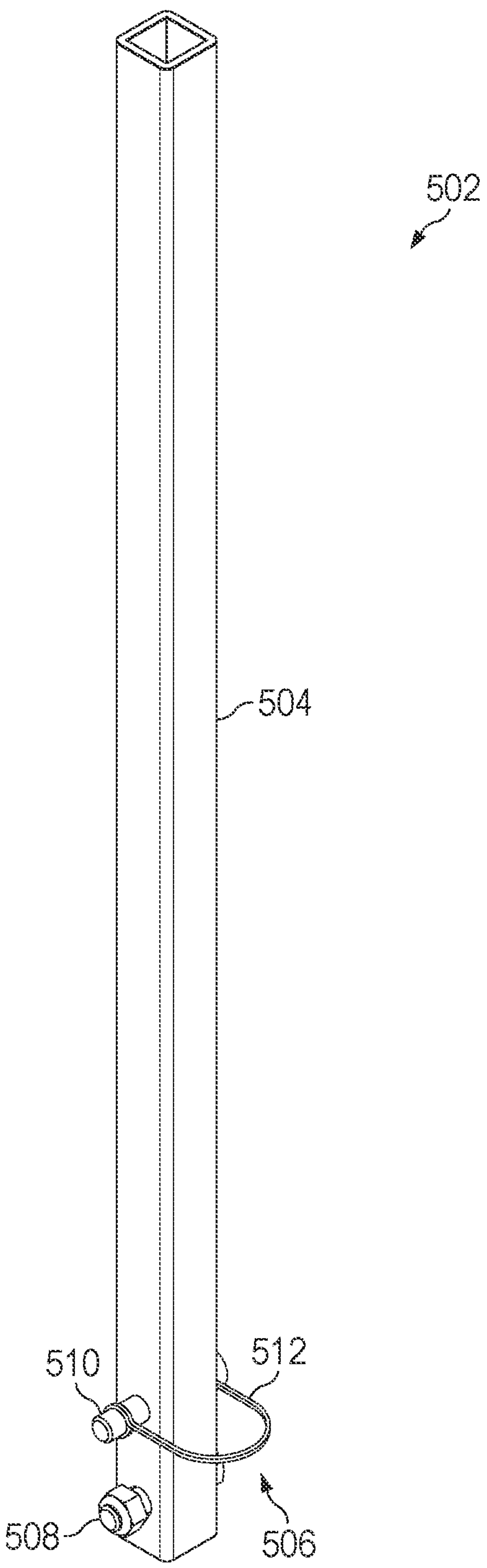
FIG. 36 is a perspective view of a maintenance strut assembly of a dock leveler in accordance with an example of the present disclosure.
Figure 37:
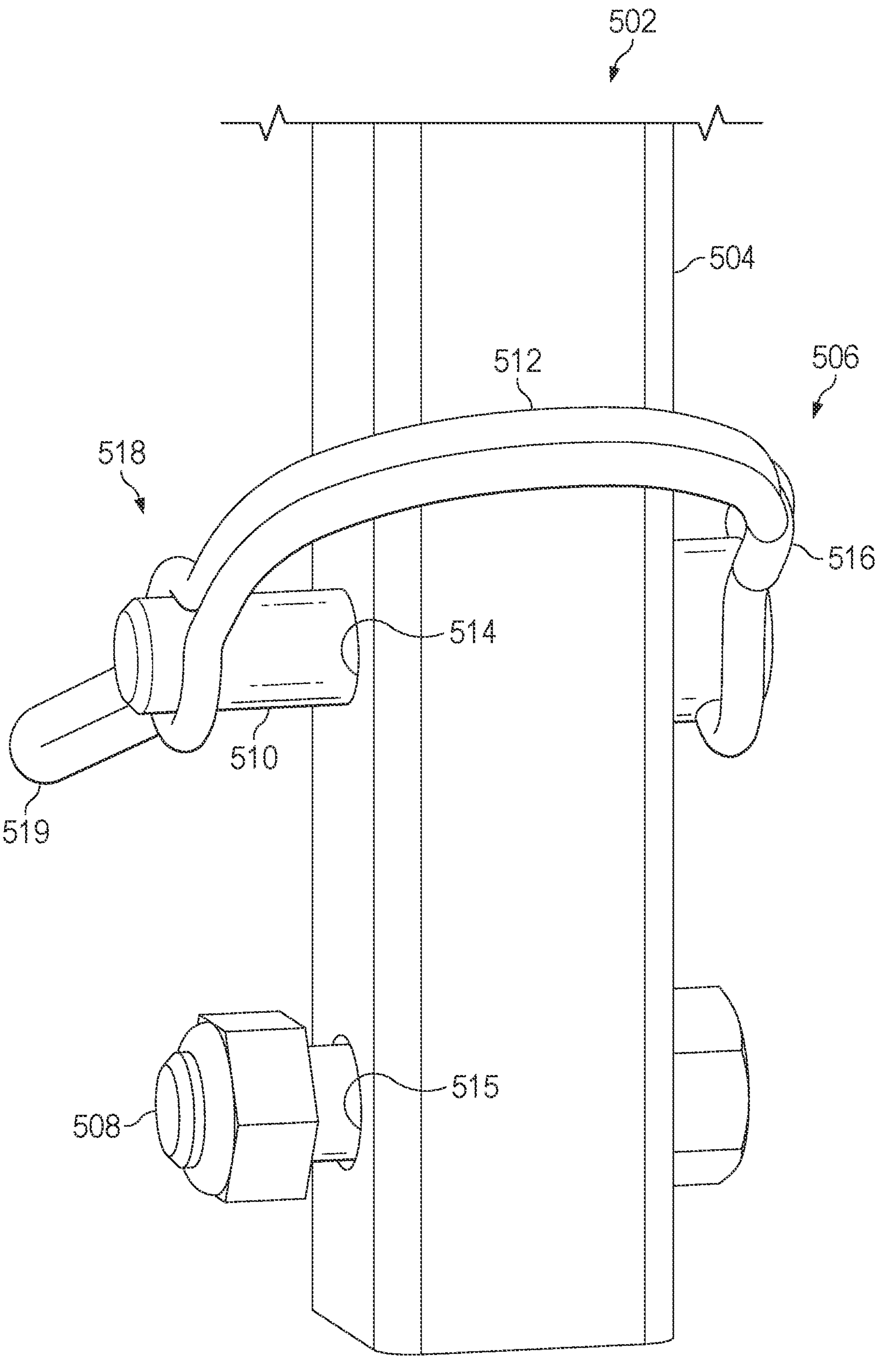
FIG. 37 is a perspective view of a maintenance strut assembly of a dock leveler in accordance with an example of the present disclosure.

FIGS. 36-41 illustrate a maintenance strut assembly 502 of the dock leveler 114. Among other things, the maintenance strut assembly 502 selectively and securely maintains the dock leveler 114 in desired positions. The maintenance strut is configured to secure the dock leveler in an accessible position and a maintenance position. In some examples, as shown in FIGS. 36 and 37, the maintenance strut assembly 502 may include a maintenance strut 504, a latch 506, and a pivot shaft 508. The maintenance strut 504 has a latch hole 514 and a pivot hole 515 formed therein. The latch 506 may comprise a pin 510 and a retainer 512. The pin 510 can extend through the latch hole 514 defined by the maintenance strut 504. The pin 510 can also and simultaneously extend through a latch hole in the gusset plate. The retainer 512 can have an end fixedly attached to the end of the pin 510.

In some examples, another end 518 of the retainer 512 can be selectively attached to the opposing end of the pin 510. The end 518 of the retainer 512 may define an opening in which the slides onto and is securely fixed to the pin 510.

Various other methods of attaching the retainer 512 to the pin 510 are contemplated. For example, the retainer 512 can selectively attach to the pin 510 using conventional locking methods such as pins, magnets, clamps, or other ways of attachment. The end 518 of the retainer 512 may include a tab 519 which can be grasped by an operator while selectively attaching the retainer to the pin 510. The operator may push and apply a force to the tab 519 to engage the retainer 512 over the pin. In some examples, the operator may pull on and apply a force to the tab 519 to disengage the retainer 512 from the pin 510. The retainer 512 may be made of a metal, may be semi-rigid, and may be semi-circular in shape. Other strong materials may be used for the retainer 512. Furthermore, the retainer 512 be of other shapes. The length of the retainer 512 is great enough to extend from one side of the pin 510 to the other side, allowing the latch 506 to ground the maintenance strut 504 on the dock leveler 114.

The maintenance strut 504 may be rotatably coupled to the dock leveler 114 by the pivot shaft 508. The pivot shaft 508 can selectively extend through the pivot hole 515 in the maintenance strut 504 as well as a pivot hole 517 in a gusset plate 511. The gusset plate 511 may be fixed to the face plate 125 and may project distally. The gusset plate 511 may be the same or different than the gusset 140 described previously. In some examples, the gusset plate 511 is fixed to the face plate 125 or the vertical wall 111 or other wall of the dock 109.

In some examples, the maintenance strut 504 can rotate about the pivot shaft 508 between a maintenance position and a stowed position but is restrained from translating with respect to the dock leveler 114. In some examples, when the end 518 of the retainer 512 is not selectively attached to the pin 510, the maintenance strut 504 freely rotates between the maintenance position and the stowed position. The maintenance position may be an upright position where the maintenance strut 504 is upright with respect to the horizontal dock surface 110. The stowed position may be a hanging position where the maintenance strut 504 is hanging downwardly with respect to the horizontal dock surface 110. In both the maintenance position and the stowed position, the maintenance strut 504 may run perpendicularly with respect to the horizontal dock surface 110. The maintenance strut 504 may be placed into other positions as well, depending on the desired use case of the maintenance strut assembly 502. For example, the maintenance strut 504 run in parallel with or at an angle to the horizontal dock surface 110.

Figure 38:
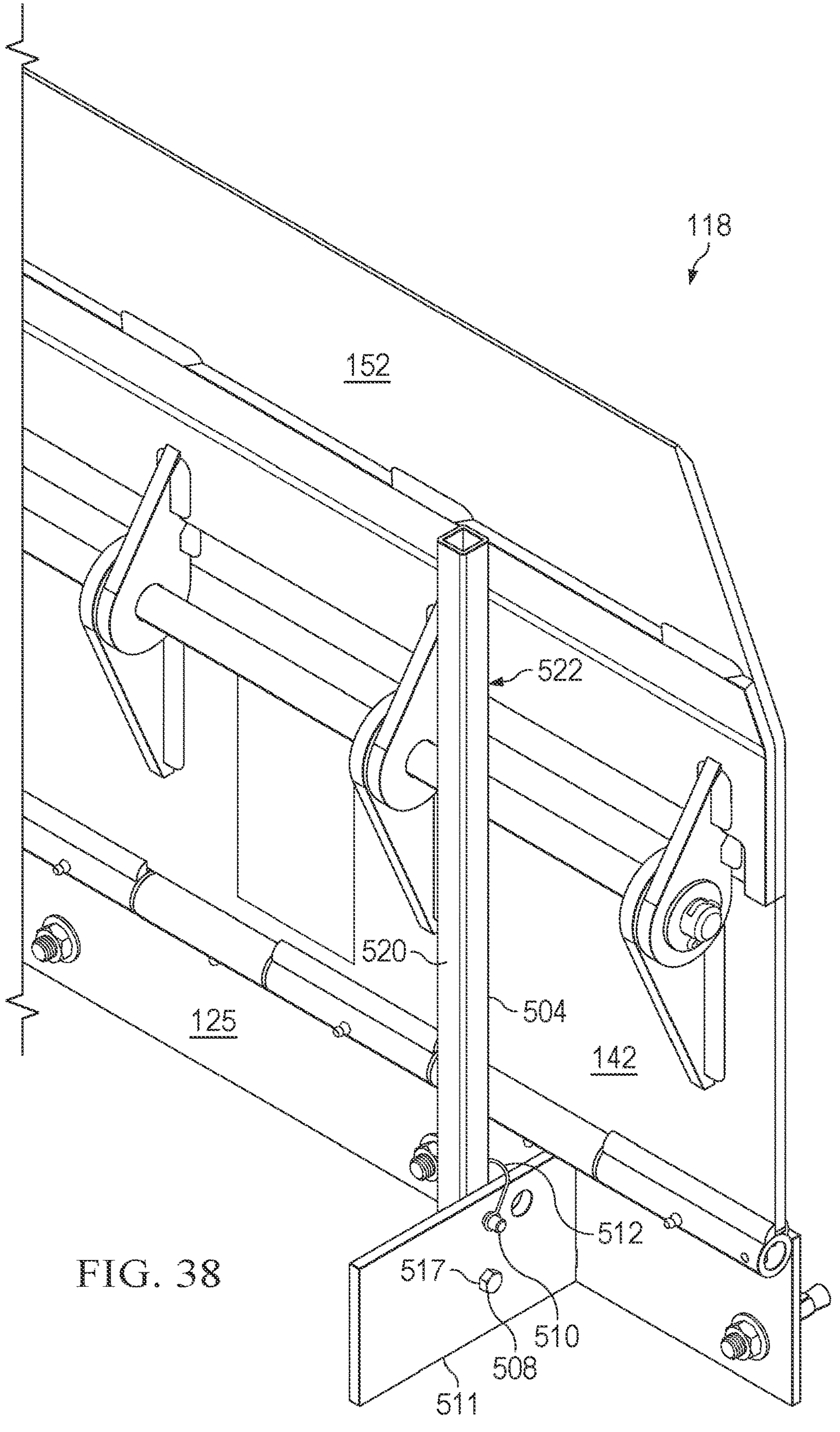
FIG. 38 is a perspective view of a maintenance strut assembly of a dock leveler in a maintenance position in accordance with an example of the present disclosure.
Figure 39:
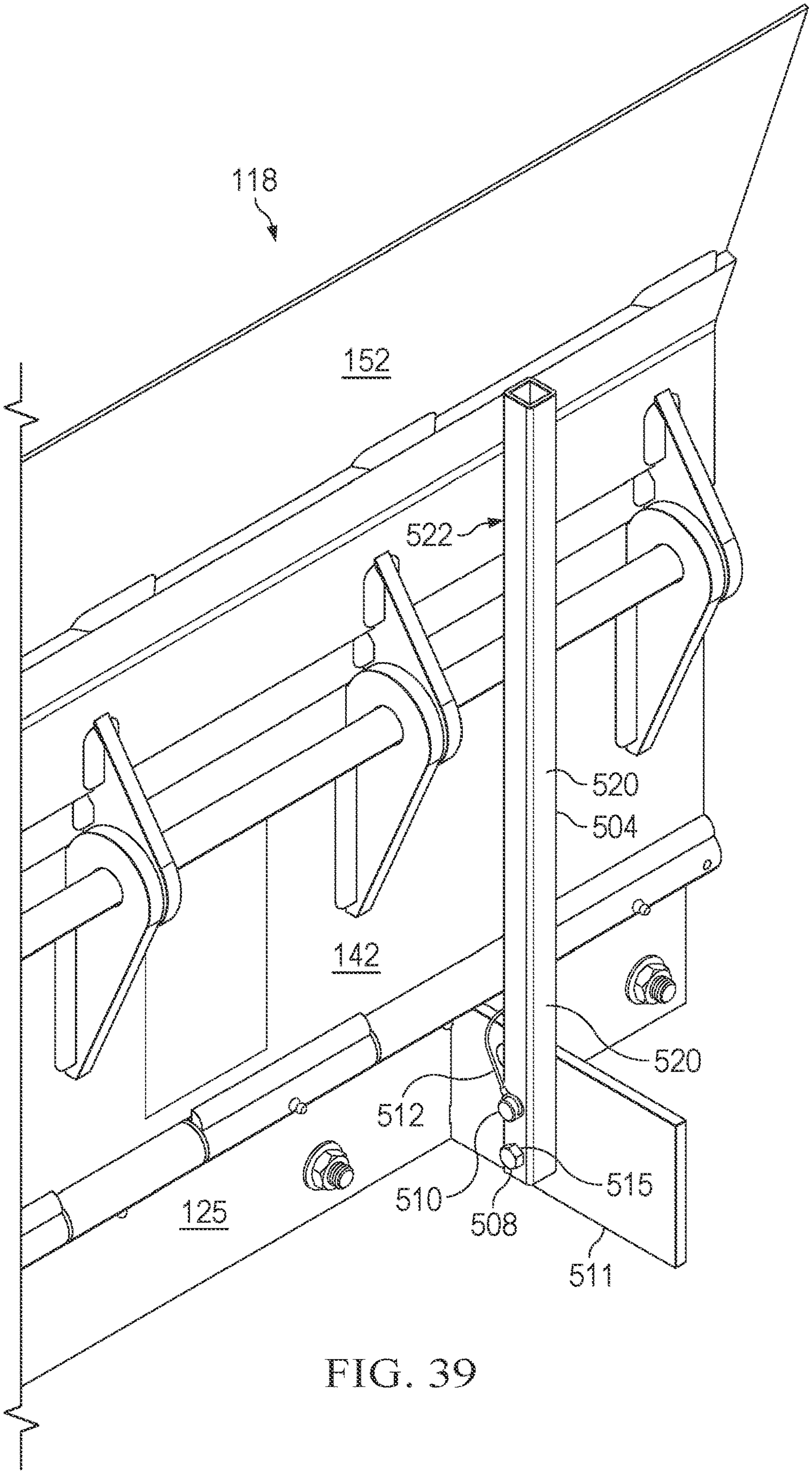
FIG. 39 is a perspective view of a maintenance strut assembly in a maintenance position in accordance with an example of the present disclosure.

FIGS. 38 and 39 illustrate the maintenance strut 504 in a maintenance position. The maintenance strut 504 is running substantially perpendicular to the horizontal dock surface 110 and in parallel or in substantial alignment with the deck plate 142. If the end 518 of the retainer 512 is selectively attached to the pin 510 when the maintenance strut 504 is in the maintenance position, the latch 506 can selectively maintain the maintenance strut 504 in the maintenance position and the maintenance strut 504 maintains the dock leveler 114 in the maintenance position. In some examples, the maintenance strut 504 extends higher than the deck plate 142 to provide sufficient leverage against the dock leveler 114. The maintenance strut 504 may have a length greater than a width of the deck plate. In some examples, when the lip plate 152 is attached to the deck plate 142, the maintenance strut 504 is shorter than the height of the lip plate 152 when the maintenance strut 504 is in the maintenance position.

In some examples, the retainer 512 is positioned between the maintenance strut 504 and the deck plate 142. In other examples (not shown), the retainer 512 is positioned on the opposing side of the maintenance strut 504 than the deck plate 142. If the dock leveler 114 is lowered, whether intentionally or unintentionally from the lifted position, the maintenance strut 504 can prevent the dock leveler 114 from lowering. When the dock leveler 114 is lowered, portions of the dock leveler 114 including but not limited to the lip plate 152 and the deck plate 142 come into contact with the maintenance strut 504. Because the retainer 512 is secured around both the maintenance strut 504 and the gusset plate 511, the maintenance strut 504 is held upright and the maintenance strut 504 resists the bridge assembly 118. In some examples, where the maintenance strut 504 is positioned between the deck plate 142 and the retainer 512, the retainer 512 interferes with and provides resistance on a side 520 of the maintenance strut 504 which faces away from the bridge assembly 118. In some examples, where the retainer 512 is positioned between the maintenance strut 504 and the deck plate 142, the retainer 512 interferes with and provides resistance on a side 522 of the maintenance strut 504 which faces towards the bridge assembly 118.

Figure 40:
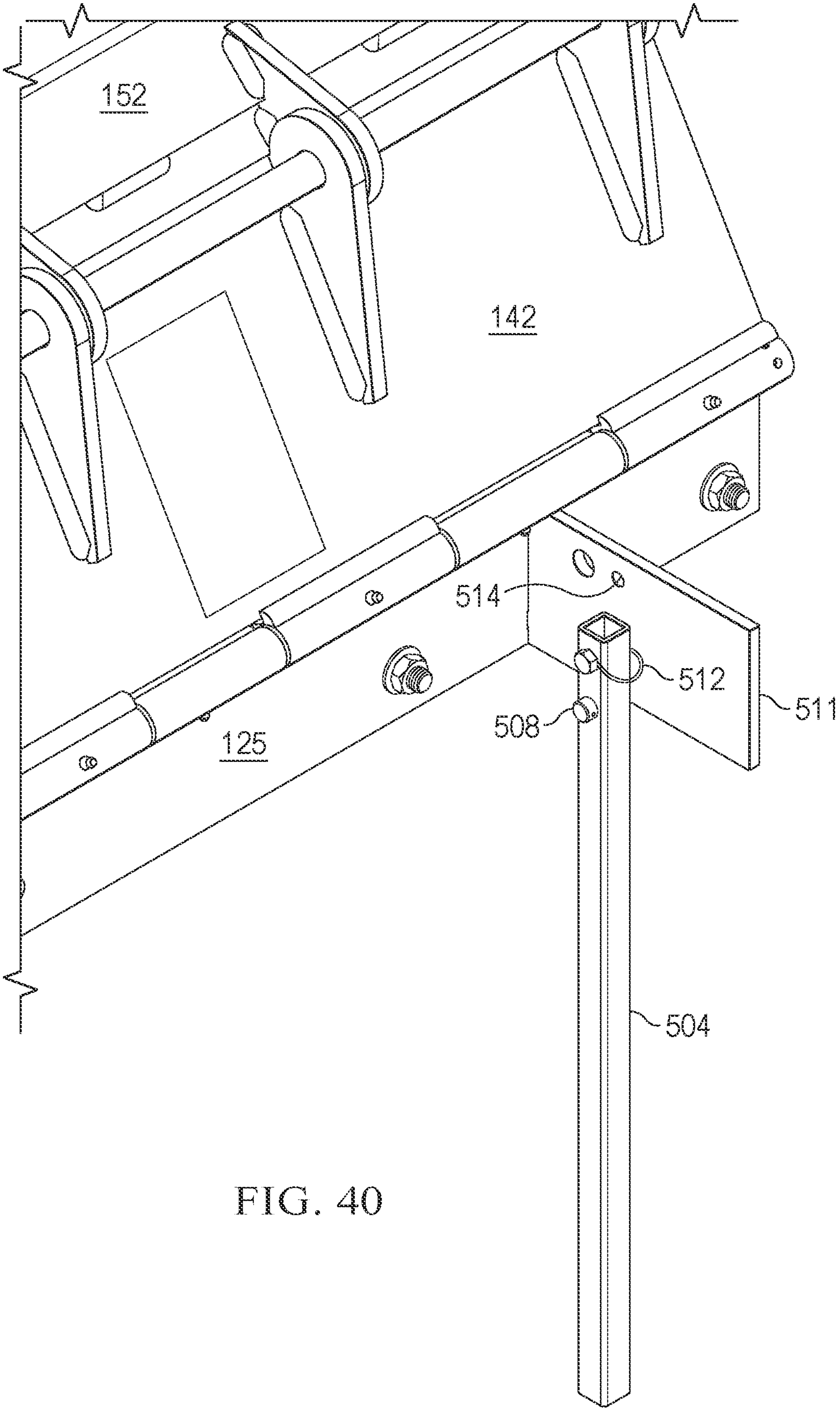
FIG. 40 is a perspective view of a maintenance strut assembly in a stowed position in accordance with an example of the present disclosure.
Figure 41:
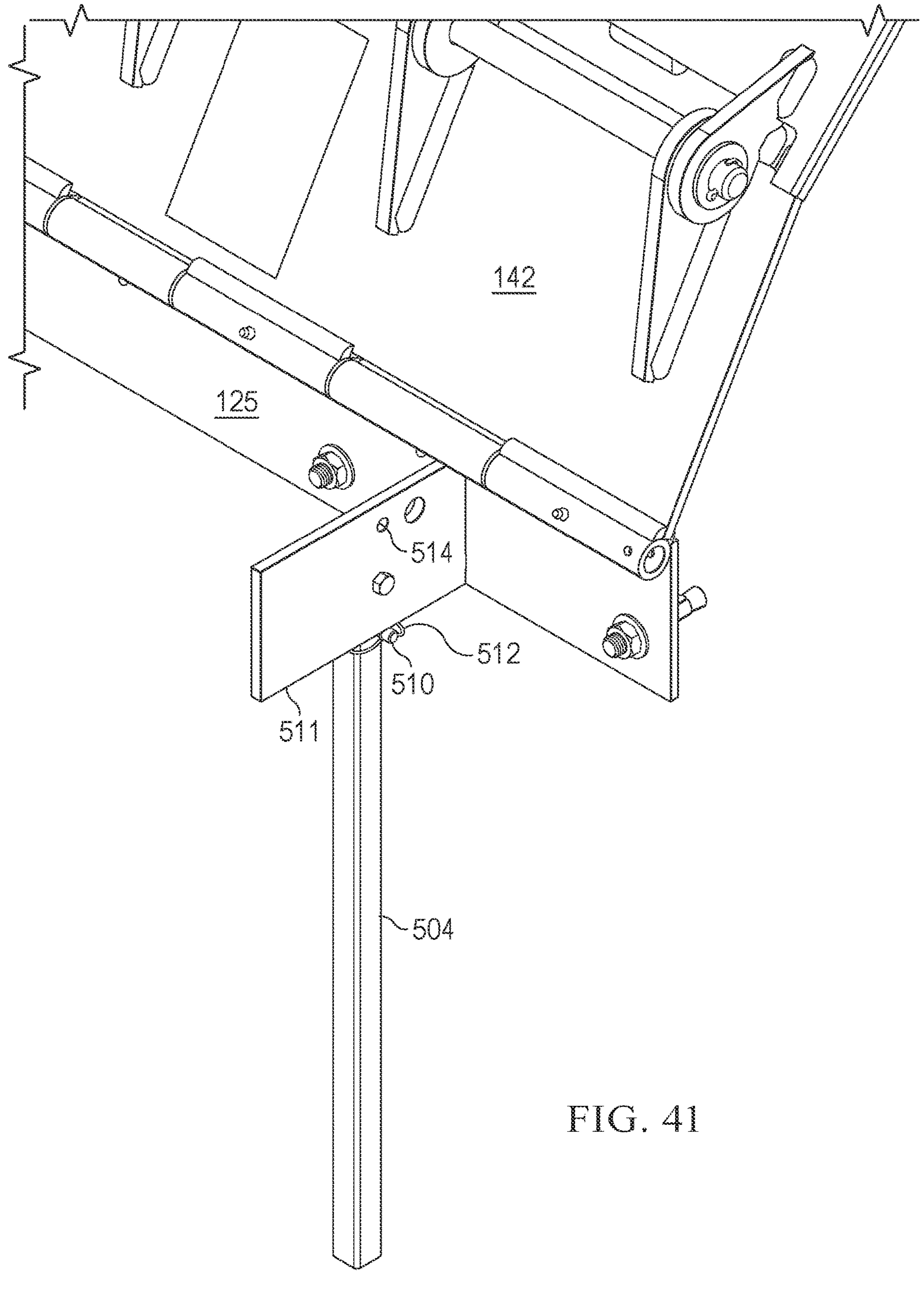
FIG. 41 is a perspective view of a maintenance strut assembly in a stowed position in accordance with an example of the present disclosure.

FIGS. 40 and 41 illustrate the maintenance strut 504 in the stowed position. The maintenance strut 504 is running substantially perpendicular to the horizontal dock surface 110. In some examples, if the end 518 of the retainer 512 is selectively attached to the second end of the pin 510 when the maintenance strut is in the stowed position, the latch 506 can maintain the maintenance strut 504 in the stowed position. When the maintenance strut 504 is maintained in the stowed position, the dock leveler 114 can be lowered, extended, and/or lifted. In some examples when the maintenance strut 504 is in the stowed position, the pin 510 does not extend through the gusset plate 511. Rather, the pin 510, in addition to the retainer 512, act as barriers preventing the maintenance strut 504 from rotating upwardly to the maintenance position.

In some examples, the retainer 512 is between the dock 109 and the maintenance strut 504. In other examples, the retainer is on the side of the maintenance strut 504 furthest from the dock 109. When the retainer 512 is located between the dock 109 and the maintenance strut 504, the retainer 512 can interfere with the gusset plate 511 when the maintenance strut 504 is rotated upwards, preventing the maintenance strut 504 from moving to the maintenance position. In some examples, when the retainer 512 is selectively attached to the pin 510 such that the retainer 512 is on the side of the maintenance strut 504 which is facing away from the dock 109, the retainer 512 interferes with the gusset plate 511 and the maintenance strut 504 itself when the maintenance strut 504 is rotated upwardly, preventing the maintenance strut 504 from moving to the maintenance position. The retainer's ability to maintain the maintenance strut 504 in the stowed position allows the dock leveler 114 to function and operate as if the maintenance strut 504 was not attached to the dock leveler 114.

Figure 42:
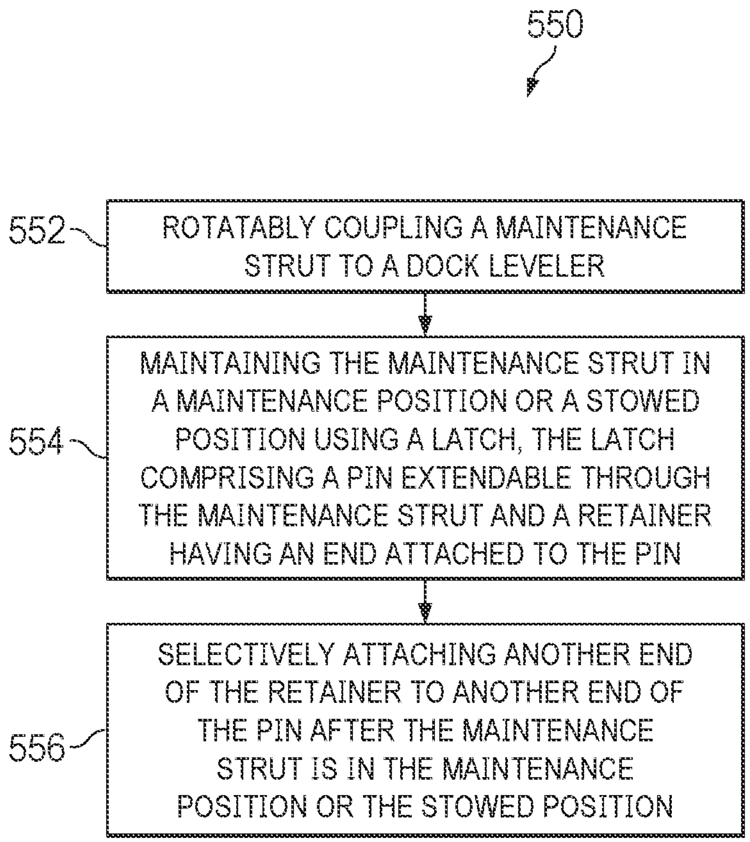
FIG. 42 is an illustrative method relating to a maintenance strut of the dock leveler in accordance with an example of the present disclosure.

FIG. 42 illustrates an example of a maintenance strut operation method 550 (method 550). While FIG. 42 illustrates illustrative operations according to one example, other examples may omit, add to, reorder, and/or modify any of the operations shown in FIG. 42.

Operation 552, in some examples, includes rotatably coupling the maintenance strut 504 to the dock leveler 114. The maintenance strut 504 may be rotatably coupled to the dock leveler through the pivot hole 515 in the gusset plate 511 using the pivot shaft 508. Other methods of coupling the maintenance strut 504 to the gusset plate 511 are contemplated, as described above in the preceding paragraphs.

Operation 554, in some examples, includes maintaining the maintenance strut 504 in the maintenance position or the stowed position. The latch 506 may comprise the pin 510 extendable through the latch hole 514 defined by the maintenance strut 504. The latch may also comprise the retainer 512. An end 516 of the retainer 512 may be fixed to an end of the pin 510.

Operation 556, in some examples, includes selectively attaching the end 518 of the retainer 512 to another end of the pin 510 after the maintenance strut 504 is in the maintenance position or the stowed position. When the maintenance strut 504 is maintained in the maintenance position, the dock leveler 114 may not be capable of extending or lowering. When the maintenance strut 504 is maintained in the stowed position, the dock leveler 114 may be freely capably of lowering, extending, or lifting. In some examples, selectively attaching the end 518 of the retainer to the other end of the pin 510 includes pushing the opening defined in the retainer 512 over the pin 510. The end 518 of the retainer 512 may include the tab 519 used to push the retainer 512 over the pin 510. The tab 519 may also be used to pull the retainer 512 from the pin 510 or manipulate the retainer 512 around the maintenance strut 504 to control which side of the maintenance strut 504 the retainer 512 is located on.

Figure 43:
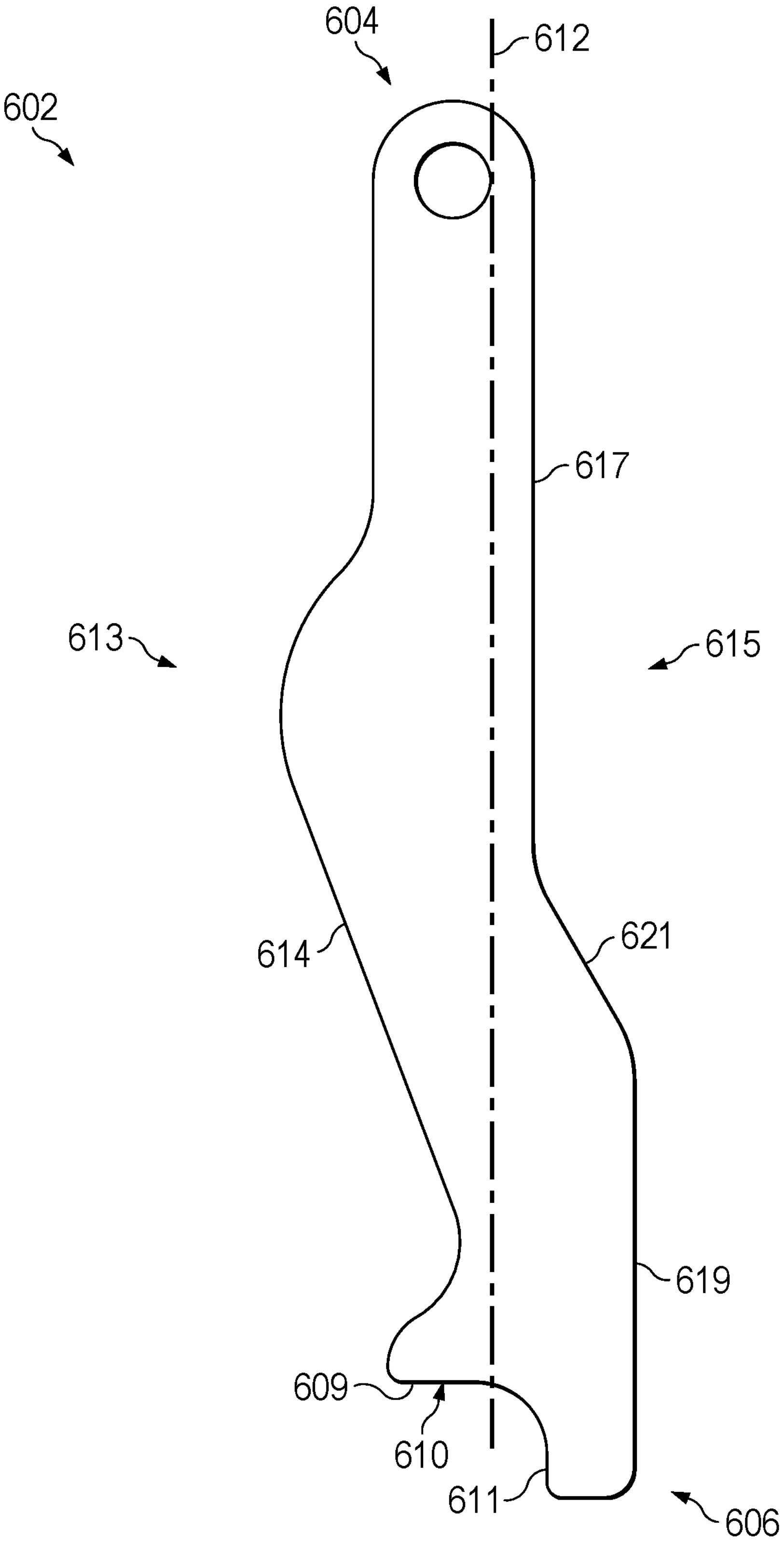
FIG. 43 is a side view of a lip extender of a dock leveler in accordance with an example of the present disclosure.
Figure 44:
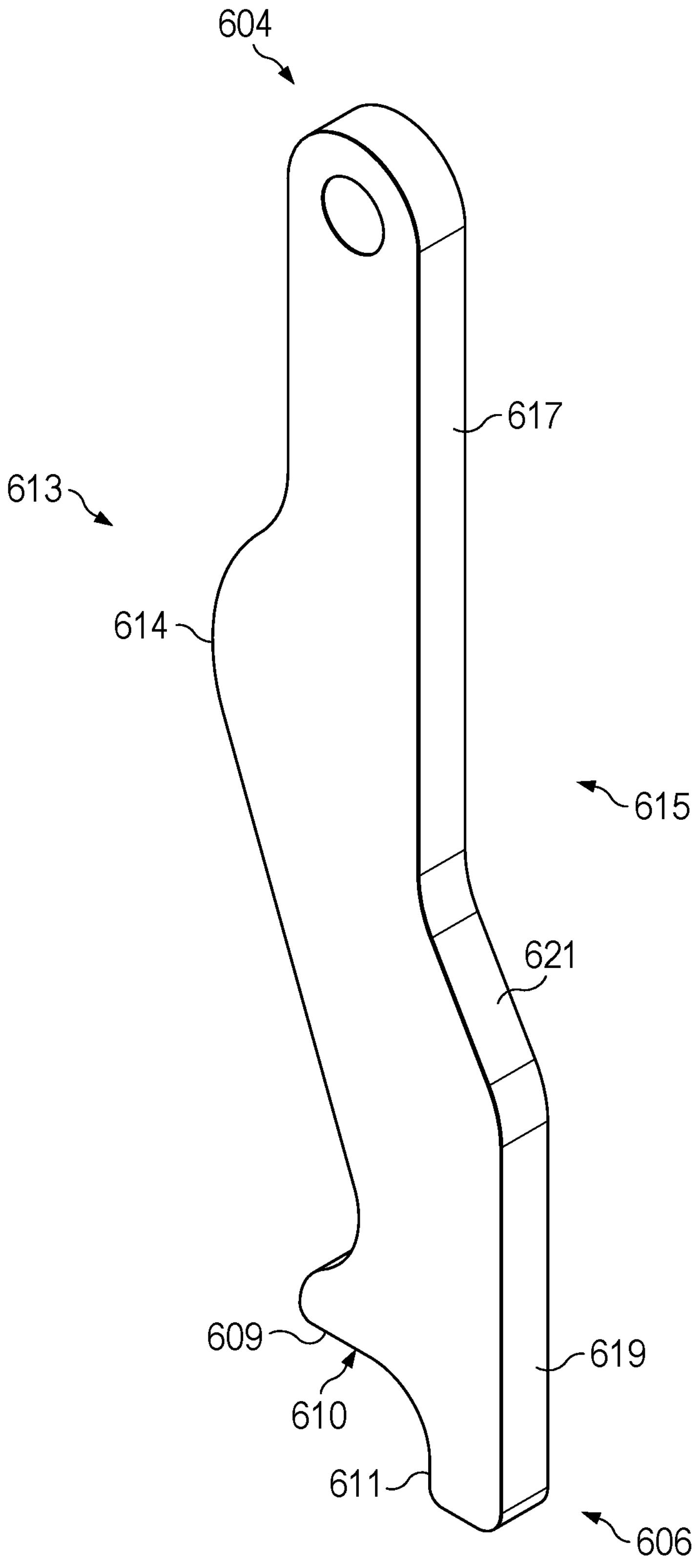
FIG. 44 is a perspective view of a lip extender of a dock leveler in accordance with an example of the present disclosure.

FIGS. 43-57 illustrate the lip extending assembly 123 of the dock leveler 114. Among other things, the lip extending assembly 123 reduces malfunctions and increases the flexibility of the dock leveler 114 to function properly in a wide range of circumstances. In some examples, as shown in FIGS. 43 and 44, the lip extending assembly 123 includes a lip extender 602. In some examples, the lip extender is a flat plate having a particular shape that performs particular functions. In the example shown, the lip extender 602 has a pivot end 604 rotatably couplable to the lip assembly 128. The pivot end 604 includes a hole therethrough which may receive a pivot bar. Thus, lip extender 602 may be suspended from the pivot bar as will be apparent from the drawings and disclosure herein. At an opposite end of the pivot plate 206, a support end 606 (also referred to as a capture end 606) may be engageable with a lip extender support 608, which will be described in more detail below. During operation of the dock leveler 114, when the support end 606 engages with the lip extender support 608, the lip assembly 128 extends with respect to the deck plate 142.

In some examples, the end 606 of the lip extender 602 may have a hook surface or curved surface 610 which is sized and shaped to engage with the lip extender support 608. The hook surface or curved surface 610 may have surfaces in two directions as shown, with a bearing face 609 transverse to the longitudinal axis and a capture face 611. Here, the capture face 611 is formed as an arc that merges into a tangent line that forms the bearing face 609. The bearing face 609 is substantially flat to enable the lip extender 602 to fall laterally from the lip engager support without requiring longitudinal movement of the lip extender 602 relative to the lip engager support, as will be shown in the drawing the discussion below. In some implementations, the bearing face 609 may be substantially perpendicular to the longitudinal axis. The lip extender 602 also has a proximal side 613 and a distal side 615 on opposing sides of a longitudinal axis 612. The proximal side may form a belly 614 which projects proximally and towards the dock 109. The distal side may include offset side surfaces 617, 619 that may be parallel to each other and separated by an angled or connecting side surface 621.

Figure 45:
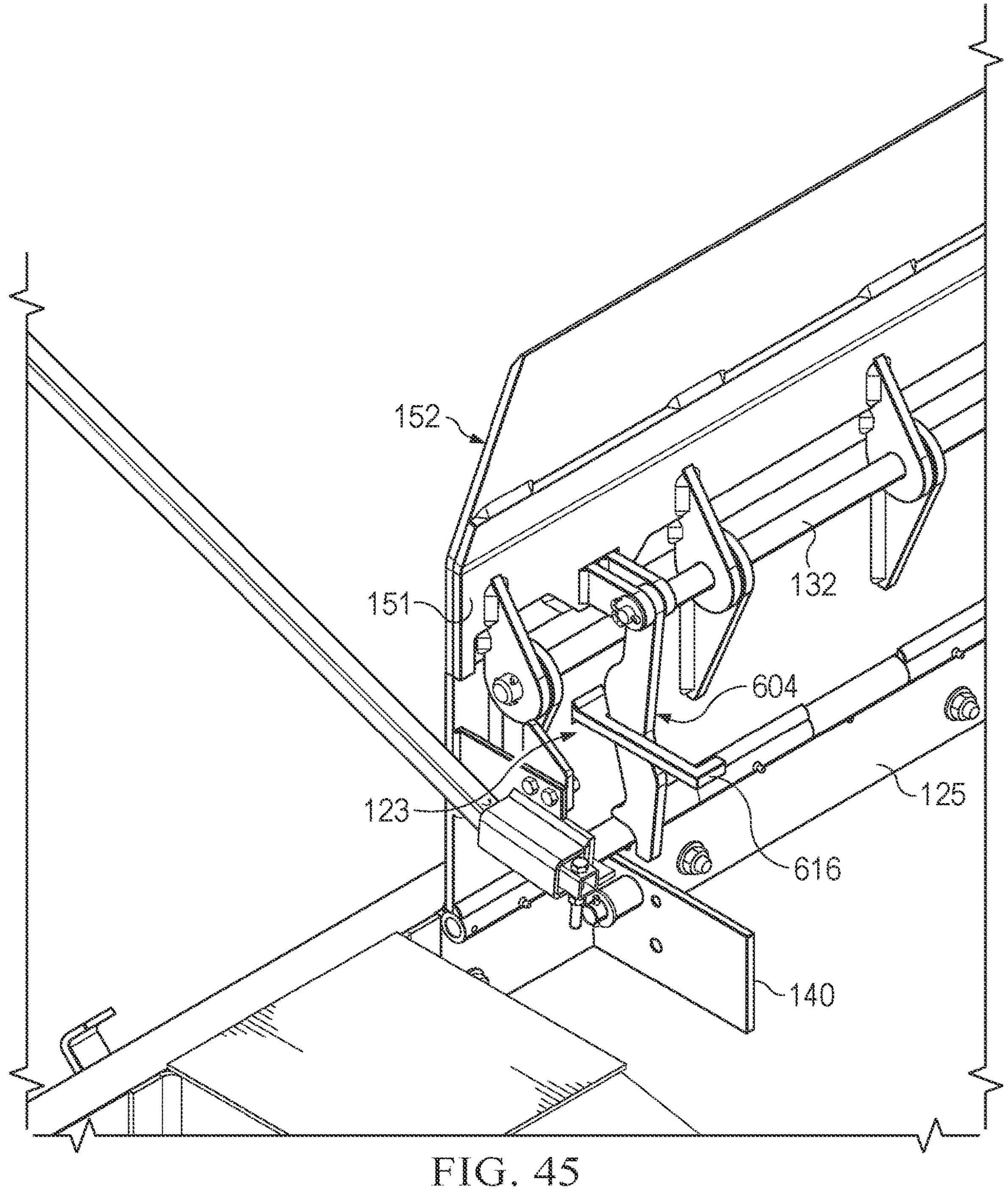
FIG. 45 is a perspective view of a lip extending assembly of a dock leveler in accordance with an example of the present disclosure.

FIG. 45 illustrates the lip assembly 128 included in the dock leveler 114. In some examples, the lip extender 602 is coupled to the lip hinge shaft(s) 132. In some examples, the lip extender 602 may also be coupled to the lip subplate 151 or the lip plate 152. The lip assembly 128 may further include a relief mechanism 616. The relief mechanism 616 may be a bar or hook or C-shaped structure spaced about the lip lifter to may limit over-rotation of the lip lifter. The relief mechanism may be fixed to the deck plate 142. The relief mechanism 616 provides various advantages. At certain moments throughout the lifting, lowering, and extending cycle of the dock leveler 114, the relief mechanism maintains the lip extender 602 within a predefined range of motion with respect to the deck plate 142 so that the lip extender 602 can perform it's intended function. Further detail regarding the relief mechanism 616 will be provided in paragraphs below, when explaining the role of the lip extending assembly 123 in lifting, lowering, and extending the dock leveler.

Figure 46:
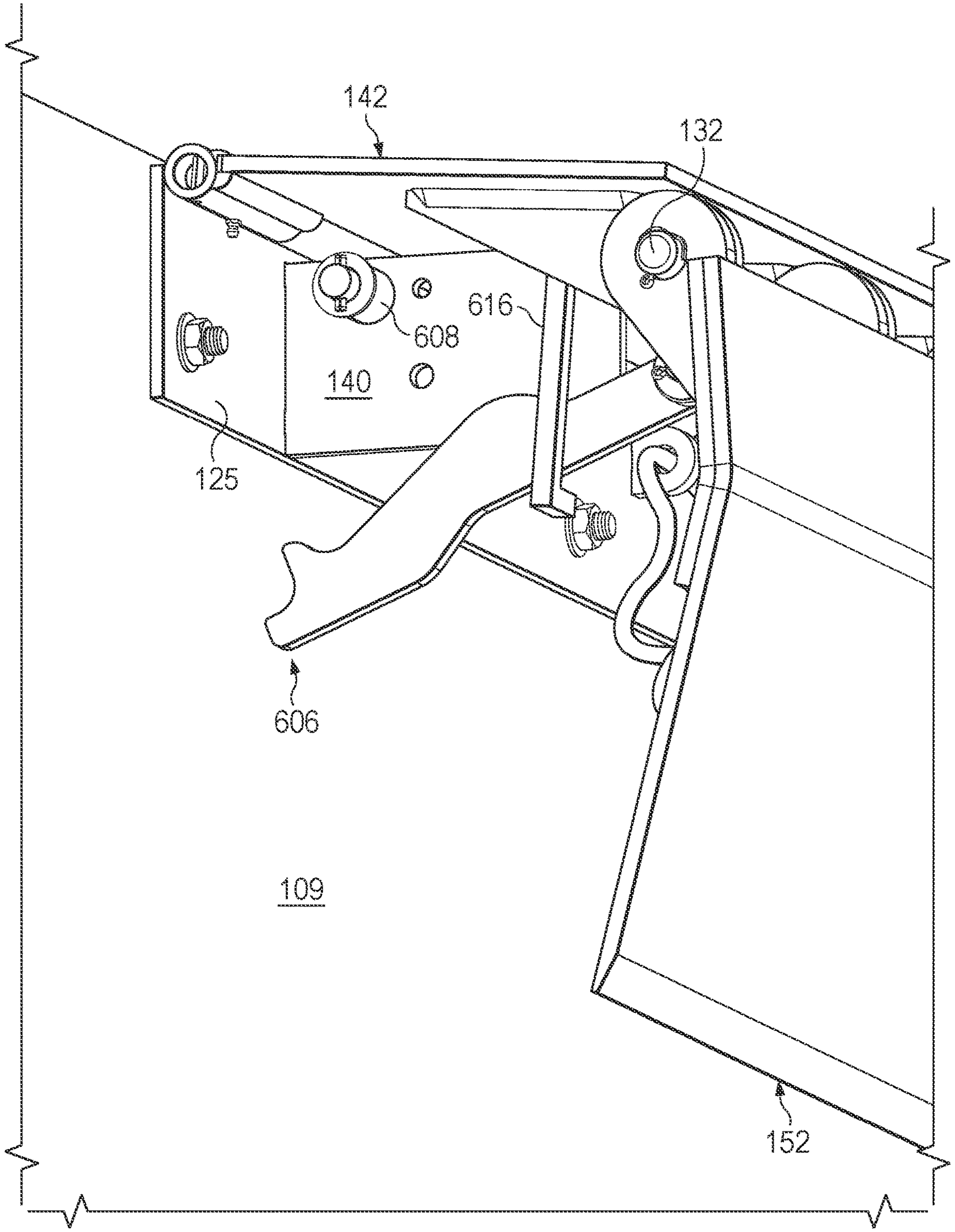
FIG. 46 is a perspective section view of a dock leveler in a lowered position in accordance with an example of the present disclosure.
Figure 47:
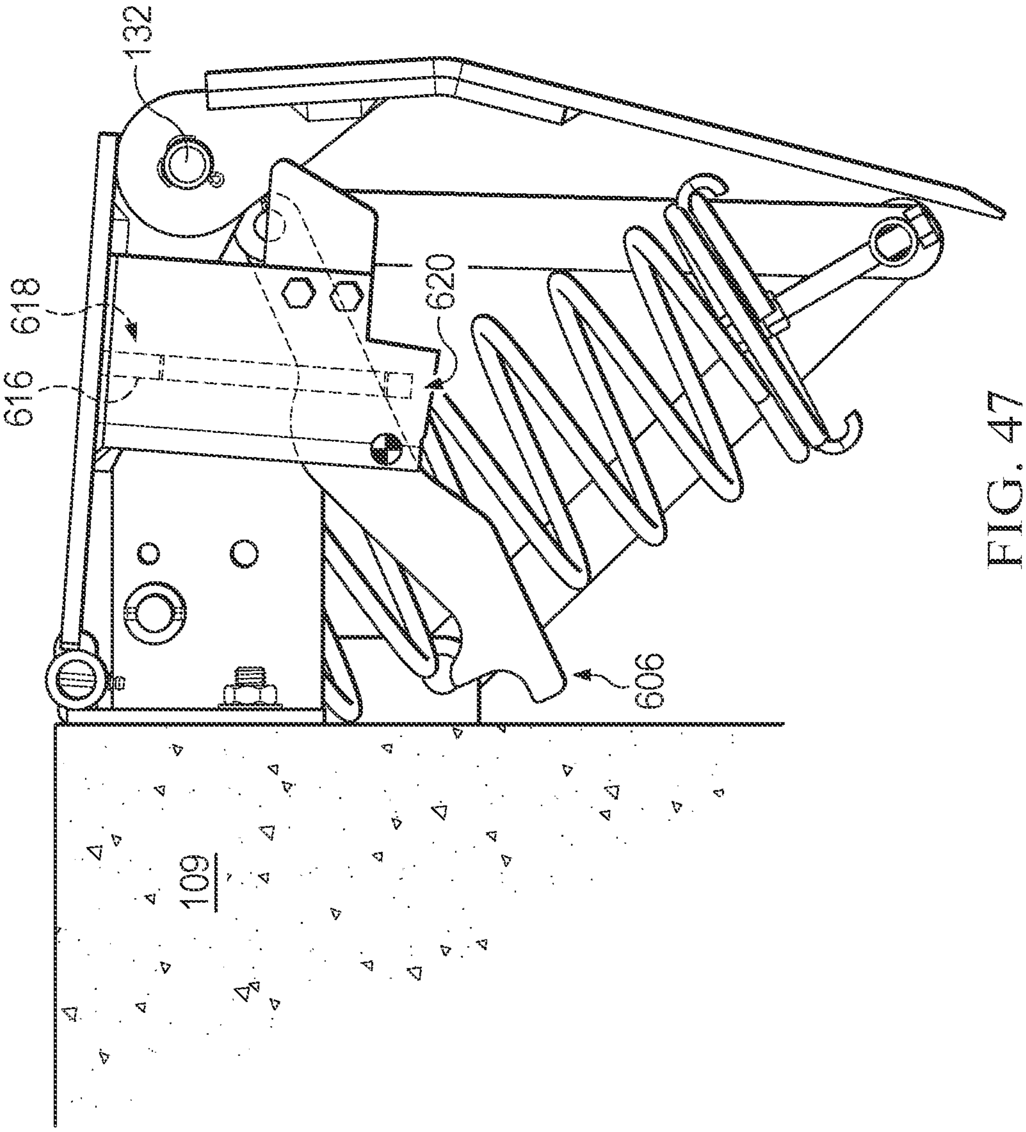
FIG. 47 is a section view of a dock leveler in a lowered position in accordance with an example of the present disclosure.

FIGS. 46 and 47 illustrate the dock leveler 114 in a lowered position. In the lowered position, the lip extender 602 may rest upon the relief mechanism 616. The relief mechanism 616 may have a portion 618 fixed to the deck plate 142. Another portion 620 of the relief mechanism 616 may extend away from the deck plate 142, to relieve the lip extender 602 from gravitational forces that may pull the lip extender 602 away from the deck plate 142. In some examples, the relief mechanism 616 is configured to prevent the lip extender 602 from rotating to an angle greater than 90 degrees with respect to the deck plate 142. This may help to ensure that the lip extender 602 does not unintentionally engage with certain components such as the lip plate 152 or the truck/trailer 162. The relief mechanism 616 is customizable depending on application and can be configured to prevent the lip extender 602 from rotating to beyond other angles besides 90 degrees, for example, 30 degrees, 45 degrees, 60 degrees, 75 degrees, 90 degrees, 115 degrees, 130 degrees, etc. In some examples, the lip extender support 608 may be a roller and the roller may be rotatably coupled to the gusset 140 extending from the face plate 125. The roller may be run in parallel with the lip hinge shaft 132.

Figure 48:
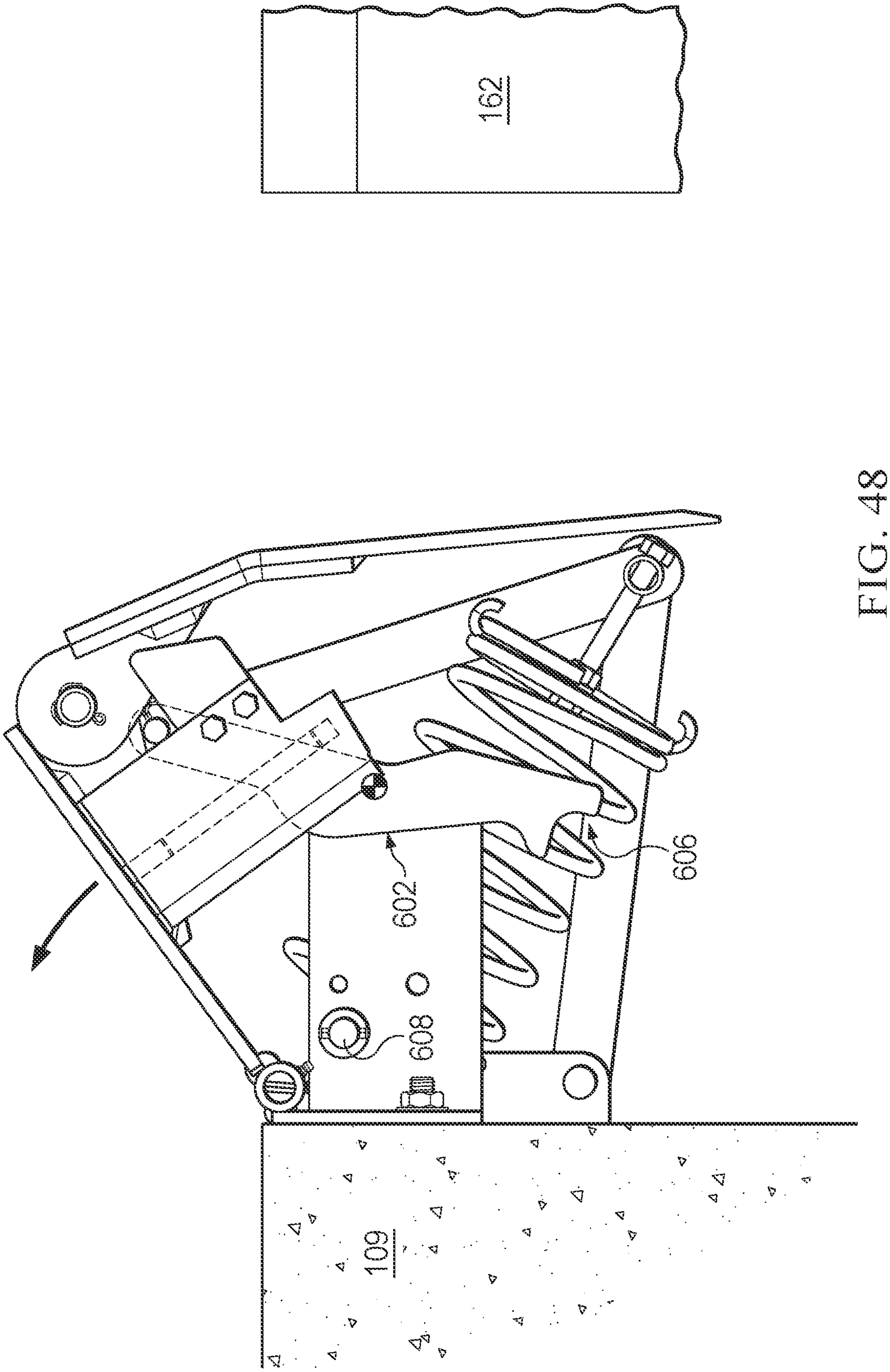
FIG. 48 is a section view of a dock leveler being lifted in accordance with an example of the present disclosure.
Figure 49:
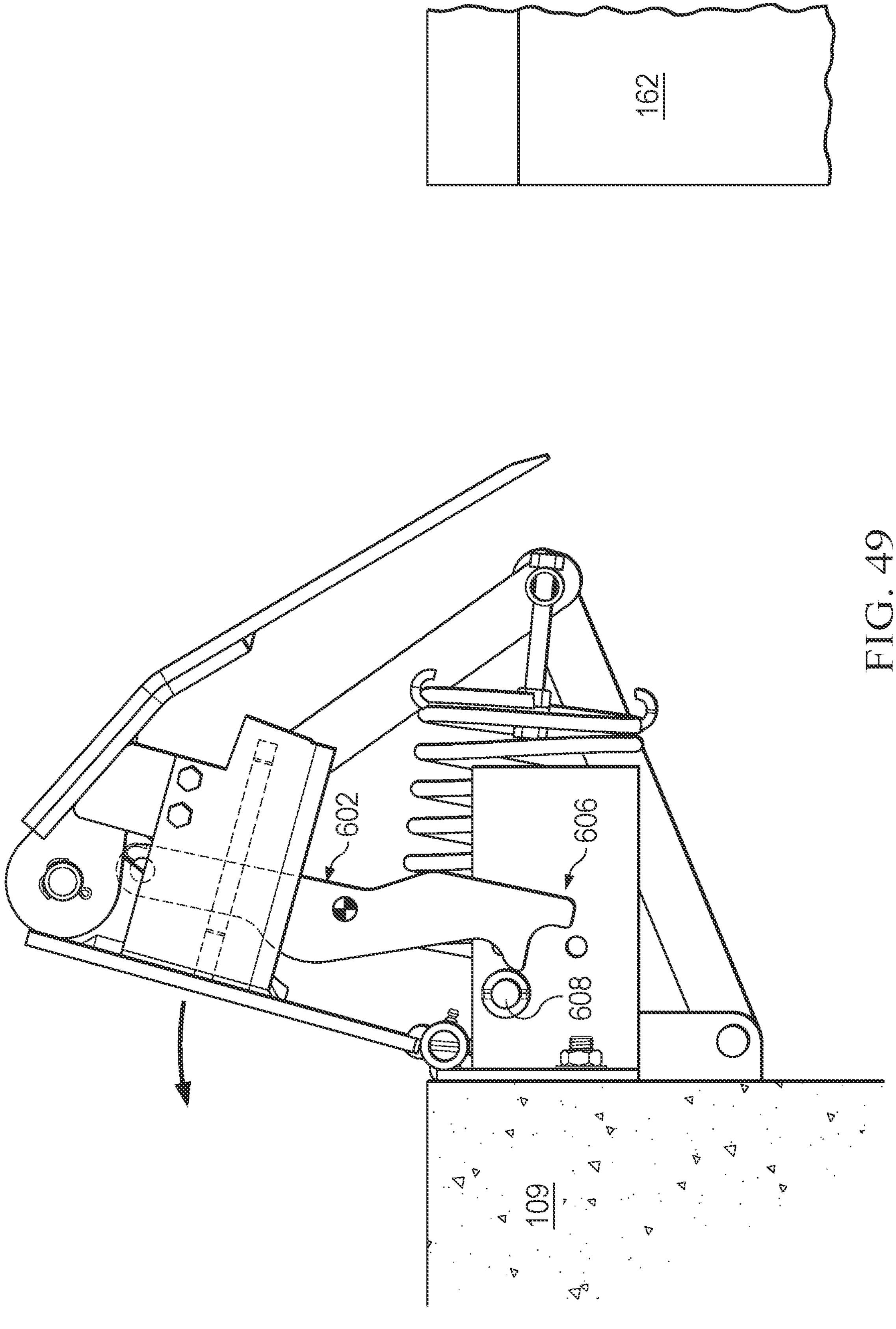
FIG. 49 is a section view of a dock leveler being lifted in accordance with an example of the present disclosure.

FIGS. 48 and 49 illustrate the dock leveler 114 being lifted. As the dock leveler 114 is pulled back by an operator, the lip extender 602 freely rotates and swings away from the relief mechanism 616, due to gravity. In some examples, the center of gravity of the lip extender 602 is located on the proximal side of the longitudinal axis 612, due to the presence of the belly 614. The location of the center of gravity may dictate how quickly and easily the lip extender 602 rotates while lifting the dock leveler 114. As shown in FIG. 49, the end 606 begins to draw near the lip extender support 608.

Figure 50:
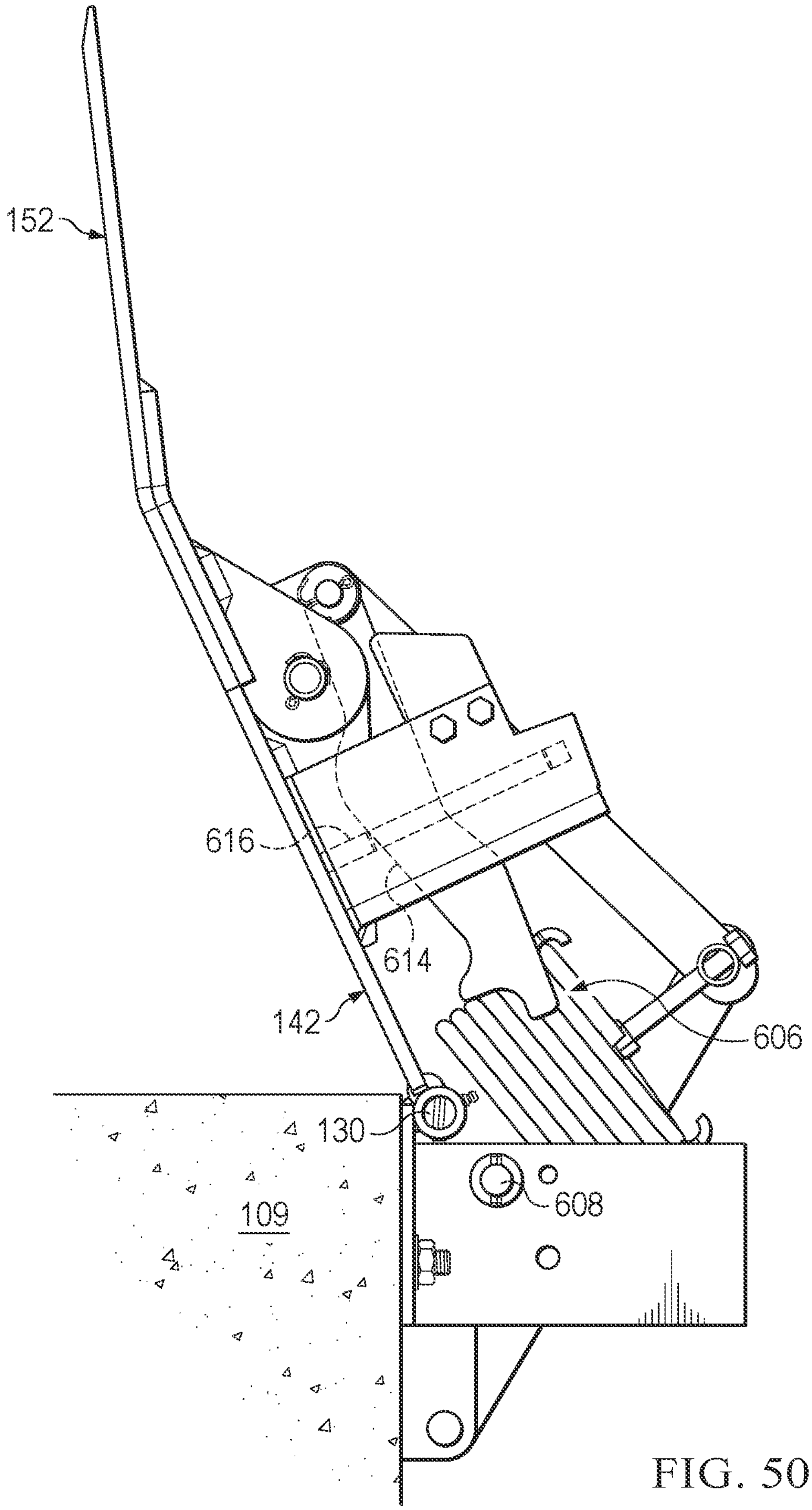
FIG. 50 is a section view of a dock leveler in a lifted position in accordance with an example of the present disclosure.

FIG. 50 illustrates the dock leveler 114 in a lifted position. In some examples, the lifted position is one in which the dock leveler 114 can be accessed for maintenance purposes. In some examples, the lifted position is one in which the deck plate 142 extends with respect to the horizontal dock surface 110 at an acute angle. In other examples, the deck plate 142 extends perpendicularly or at an obtuse angle with respect to the deck plate 142 in the lifted position. In some examples, while reaching a lifted position, while in a lifted position, or while exiting a lifted position, the belly 614 of the lip extender 602 is configured to contact the deck plate 142 or the relief mechanism to prevent the lip extender 602 from engaging certain components of the dock leveler 114. For example, the lip extender 602 may malfunction if the lip extender 602 unintentionally engages the face hinge shaft 130, rather than the lip extender support 608. The shape of the belly ensures that an appropriate amount of space is maintained between the lip extender 602 and the deck plate 142.

Figure 51:
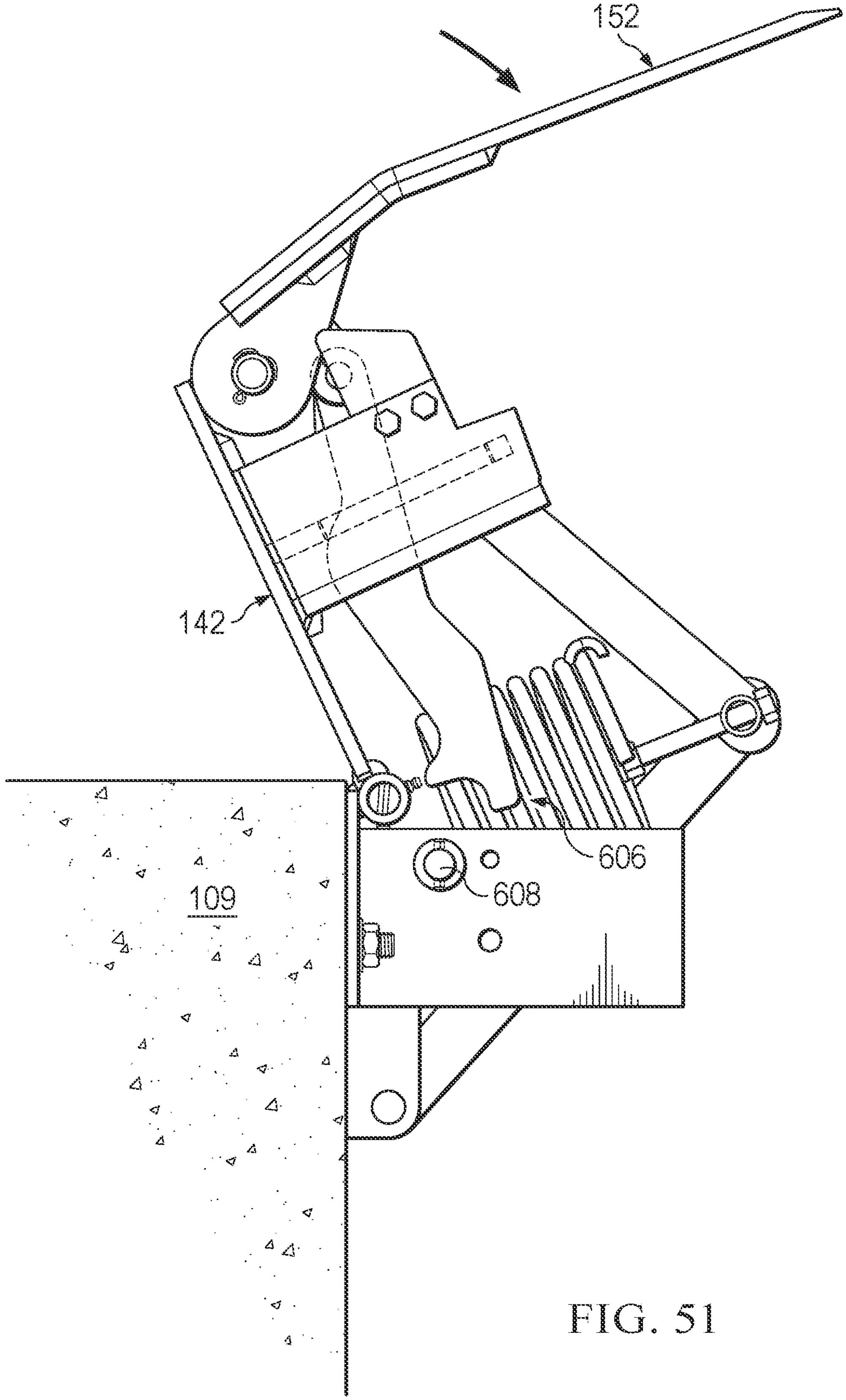
FIG. 51 is a section view of a dock leveler being extended in accordance with an example of the present disclosure.
Figure 52:
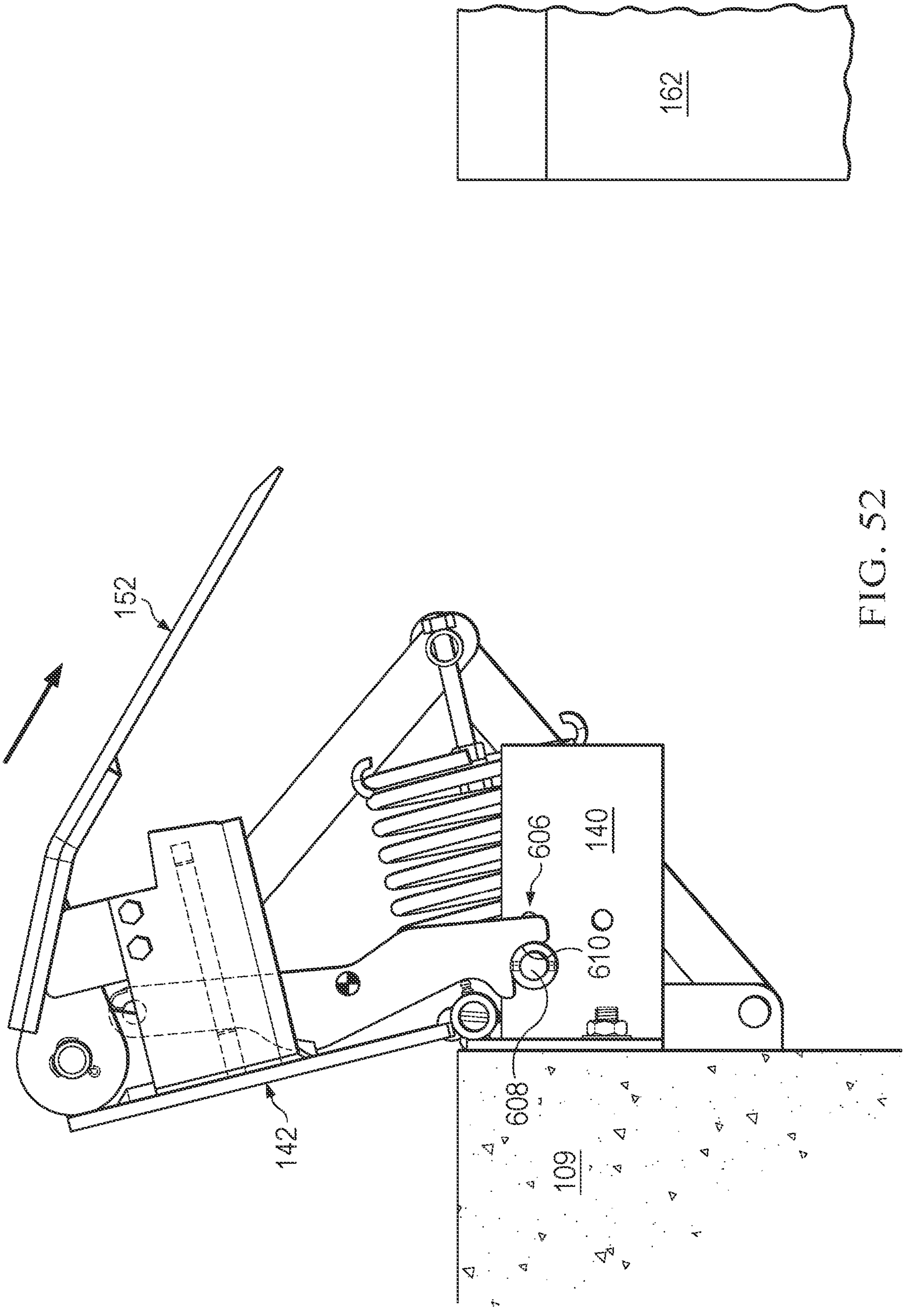
FIG. 52 is a section view of a dock leveler being extended in accordance with an example of the present disclosure.
Figure 53:
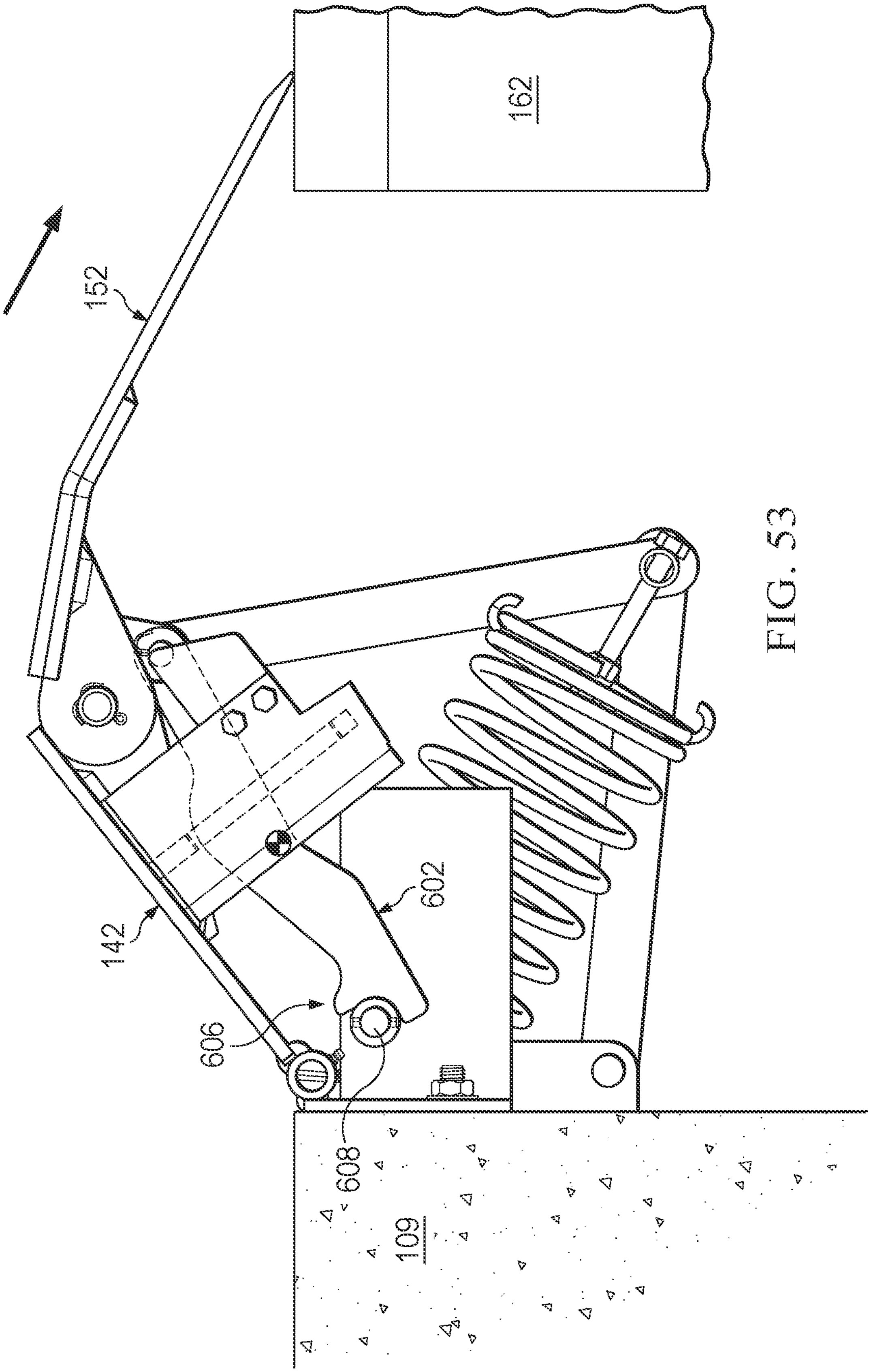
FIG. 53 is a section view of a dock leveler being extended in accordance with an example of the present disclosure.

FIGS. 51-53 illustrate the dock leveler 114 being extended. As the dock leveler 114 is pushed forward and extended, the end 606 of the lip extender 602 lowers and draws nearer to the lip extender support 608. In some examples, when the deck plate 142 rotates forward, the lip plate 152 rotates downward, until the lip extender 602 engages the lip extender support 608.

FIG. 52 illustrates the end 606 of the lip extender 602 engaging the lip extender support 608. In some examples, the hook surface or curved surface 610 engages with a curved surface of the lip extender support 608. Here, both the bearing face 609 and the capture face 611 of the hook surface 610 are both engaged with the lip extender support 608. The capture face 611 engages the lip extender support 608 and ensures that the lip extender 602 does not travel past the lip extender support 608. The bearing face 609 will carry the gravitational load of the lip. In some examples, where the lip plate 152 freely rotates with respect to the deck plate 142 until the lip extender 602 has engaged the lip extender support 608, the lip plate 152 is oriented at a small angle, for example, 45 degrees, with respect to the deck plate 142, when engagement of the lip extender support 608 occurs. After engagement, and while the dock leveler 114 is pushed further forward, the lip plate 152 is extended, with respect the deck plate 142. As the lip plate 152 extends, the angle of the lip plate 152 with respect to the deck plate widens. Eventually, the angle between the lip plate 152 and the deck plate 142 reaches 180 degrees, forming a smooth surface to be traversed.

In some examples, as illustrated in FIG. 53, the end 606 of the lip extender 602 remains engaged with the lip extender support 608 until the lip plate 152 contacts the truck/trailer 162. After the lip plate 152 contacts the truck/trailer 162, the forces of upon the lip extender 602 may cease and the lip extender 602 may disengage from the lip extender support 608. Since the bearing face 609 is a flat surface, the gravitational force of the lip extender 602 may cause the lip extender to disengage by falling off the lip extender support 608 as the loading is removed. This prevents the lip from remaining extended, even when no truck/trailer 162 is present.

Figure 54:
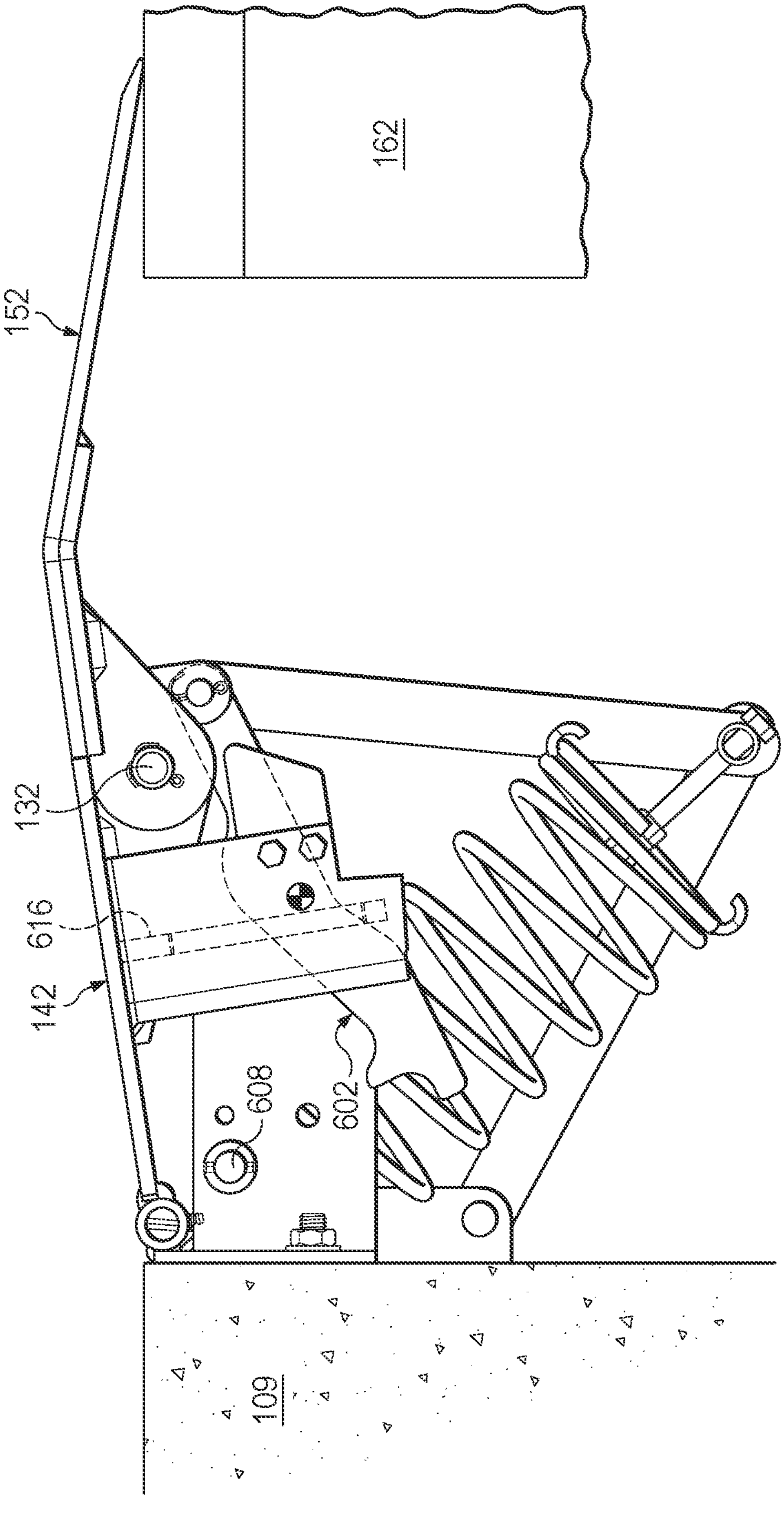
FIG. 54 is a section view of a dock leveler in an extended position in accordance with an example of the present disclosure.

FIG. 54 illustrates the dock leveler 114 in an extended position. In some examples, after the lip plate 152 has contacted the truck/trailer 162, and the lip extender 602 disengages the lip extender support 608, the end 606 of the lip extender 602 freely swings downward, due to gravity. In some examples, when the dock leveler 114 comprises the relief mechanism 616, the relief mechanism 616 may stop the lip extender 602 from swinging to a position where the lip extender 602 hangs perpendicularly with respect to the ground. The relief mechanism 616 acts to prevent the lip extender 602 from swinging and hitting the truck/trailer 162 or anyone/anything nearby. The relief mechanism 616 may be configured to prevent the lip extender 602 from rotating to an angle greater than 90 degrees or 45 degrees, or any other acute angle, with respect to the deck plate 142. The relief mechanism 616 may be c-shaped, wherein the top portion of the c-shape is fixed to the deck plate 142 and the bottom portion of the c-shape acts to catch the lip extender 602. Other shapes of the relief mechanism 616 are contemplated. For example, the relief mechanism 616 could be rectangular, circular, or any other shape. In some examples, the width of the relief mechanism 616 is at least the width of the lip extender 602.

In some examples, the dock leveler 114 may be lowered after reaching an extended position. The dock leveler 114 may be retracted and pulled backwards such that the lip plate 152 slides off of the truck/trailer 162. If the operator does not continue to pull the dock leveler 114 all the way backwards to a lifted position, before lowering, then the lip extender 602 will not engage the lip extender support 608. If the lip extender 602 does not engage the lip extender support 608, then the dock leveler 114 can be freely lowered to a lowered position.

Figure 55:
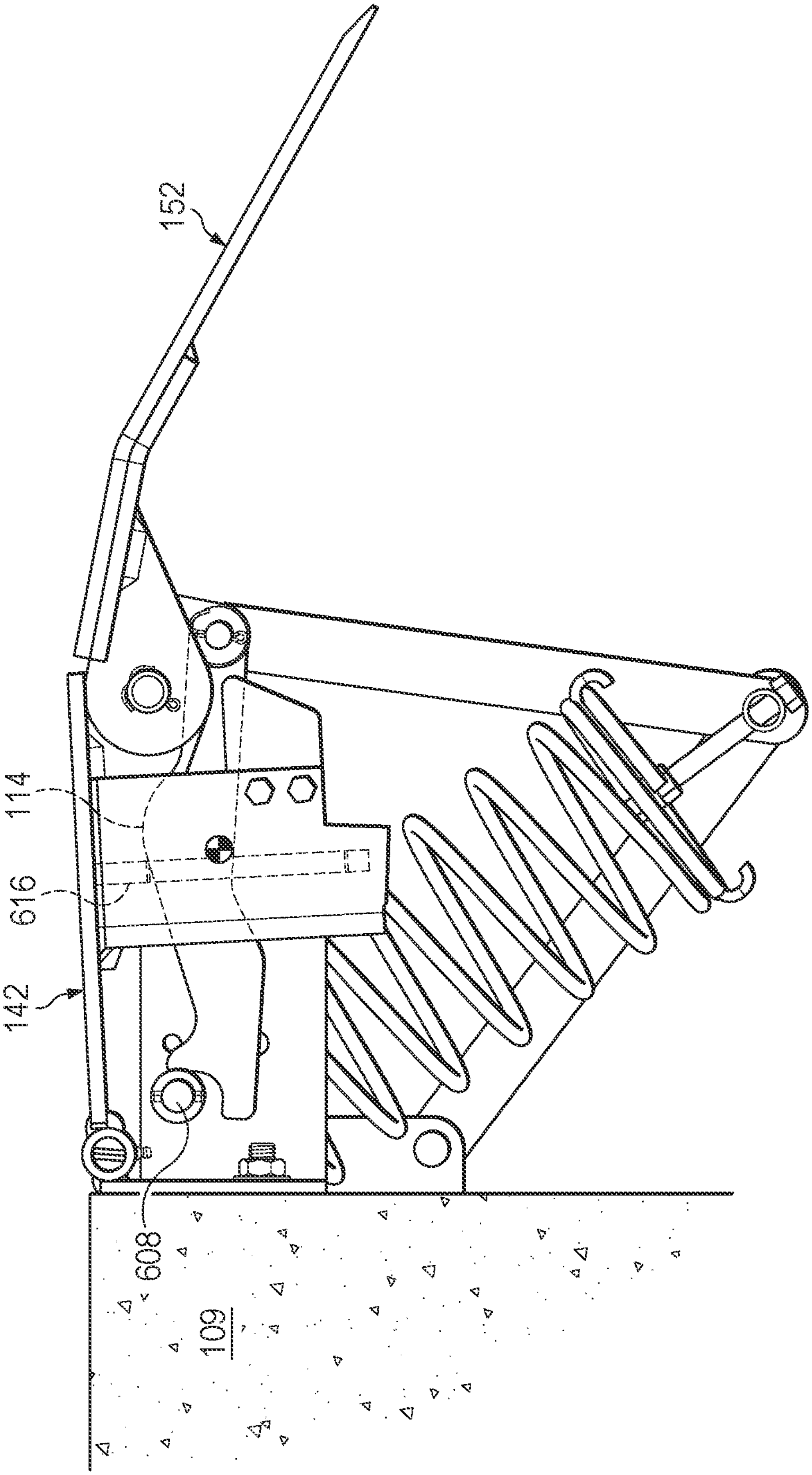
FIG. 55 is a section view of a dock leveler being extended in accordance with an example of the present disclosure.
Figure 56:
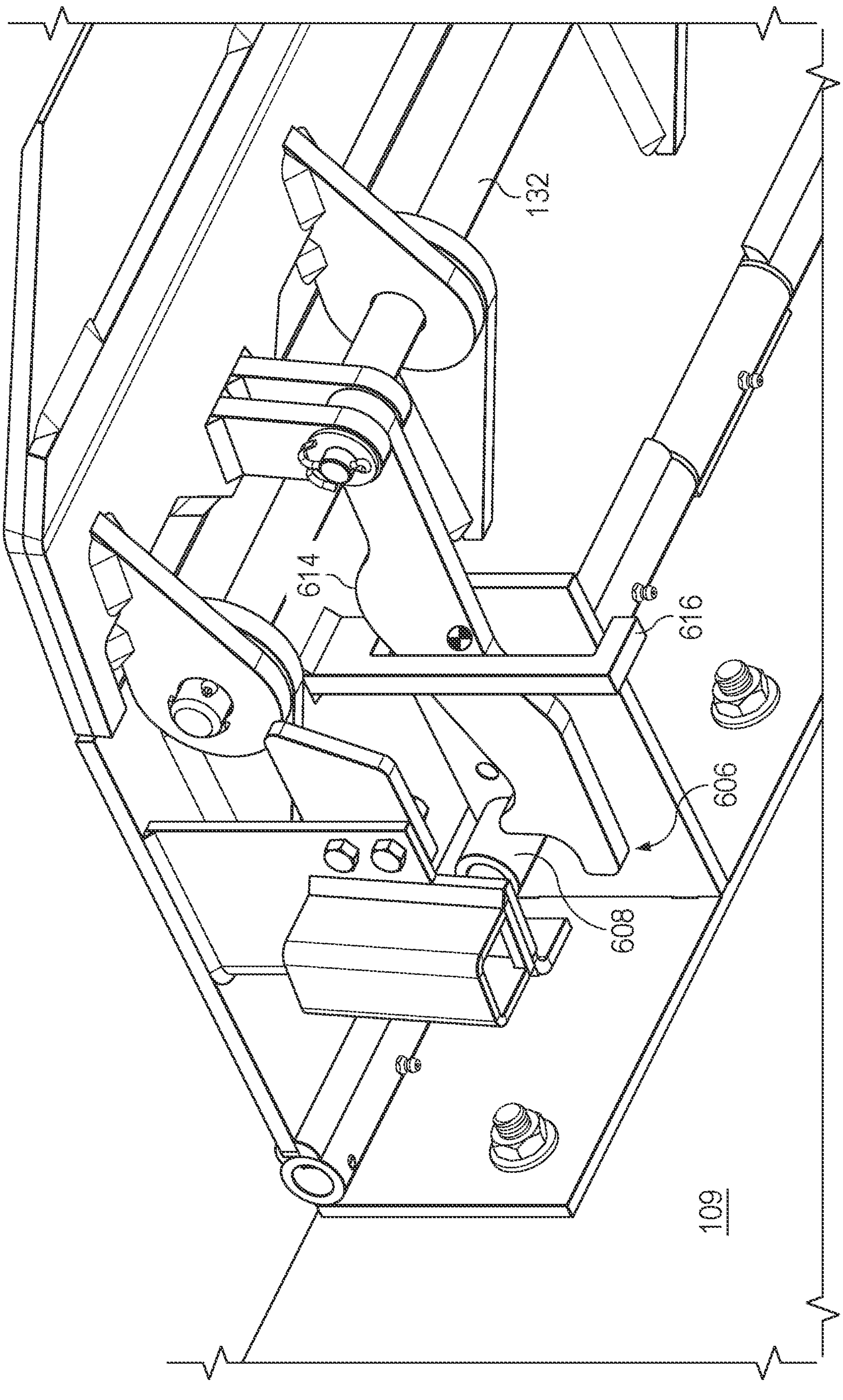
FIG. 56 is a perspective section view of a dock leveler being extended in accordance with an example of the present disclosure.

FIGS. 55 and 56 illustrate the dock leveler 114 being extended when no truck/trailer 162 is present. The lip extending assembly 123 described herein provides advantages in this situation. For example, due to the shape of the lip extender 602, for example, the belly 614, the deck plate 142 or the relief mechanism 616 may be configured to contact the belly 614 to disengage the lip extender 602 from the lip extender support 608. If the lip extender 602 did not possess unique feature, such as the belly 614, the lip extender 602 may not ever disengage from the lip extender support 608 if the dock leveler 114 was extended and there was no truck/trailer 162 to rest upon. In some examples, after the lip extender 602 disengages from the lip extender support 608 and there is no truck/trailer 162 present, then the lip plate 152 and the deck plate 142 freely fall to the lowered position.

Figure 57:
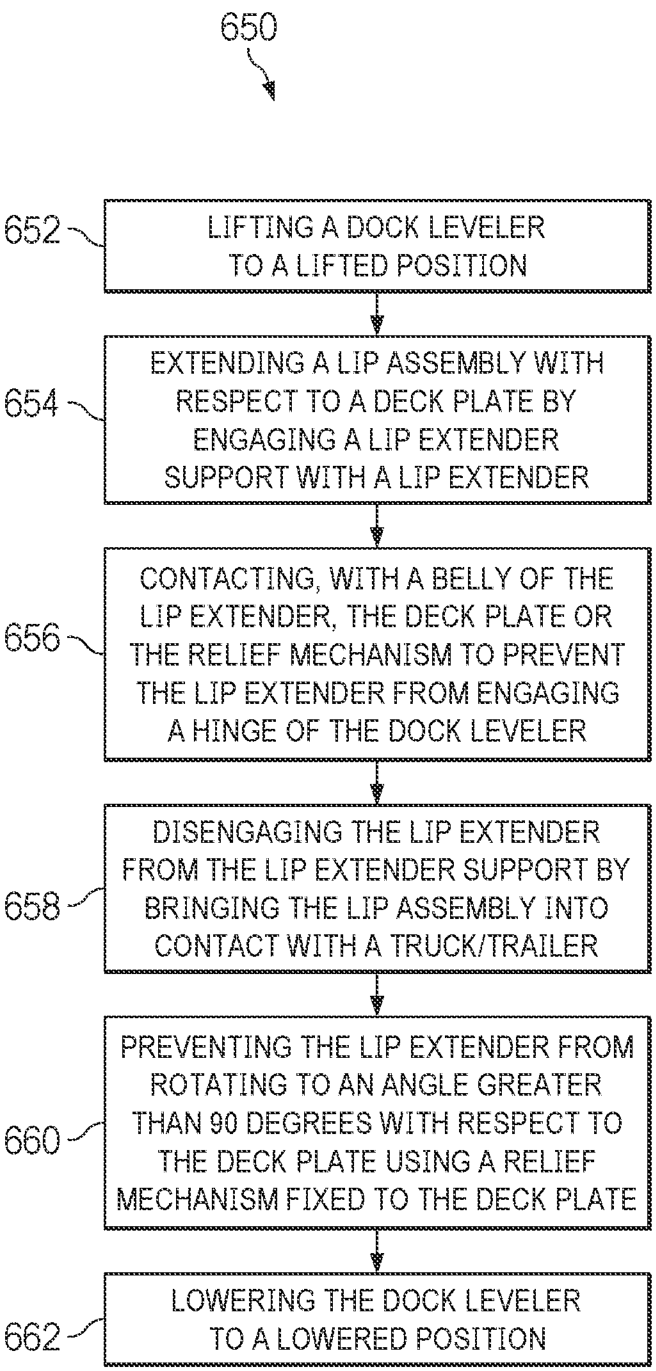
FIG. 57 is an illustrative method relating to operation of a dock leveler using a lip extending assembly in accordance with an example of the present disclosure.

FIG. 57 illustrates an example of a dock leveler operation method 650 (method 650). While FIG. 57 illustrates illustrative operations according to one example, other examples may omit, add to, reorder, and/or modify any of the operations shown in FIG. 57.

Operation 652, in some examples, includes lifting the dock leveler 114 to a lifted position. The dock leveler 114 need not fully achieve a lifted position to be extended, however. Lifting the dock leveler 114 can be accomplished using the systems and methods described herein.

Operation 654, in some examples, includes extending the lip assembly 128 with respect to the deck plate 142 by engaging the lip extender support 608 with the lip extender 602. As the lip assembly 128 is extended, the lip extender 602 engages the lip extender support 608 to generate a force with which the lip plate 152 can be pushed outwards and onto the truck/trailer. As described above, the hook surface or curved surface 610 of the lip extender 602 can be sized and shaped to engage the lip extender support 608.

Operation 656, in some examples, includes contacting, with the belly of the lip extender 602, the deck plate 142 or the relief mechanism 616 fixed to the deck plate 142, to prevent the lip extender 602 from engaging or getting stuck on unintended components of the dock leveler. For examples, the belly 614 can prevent the lip extender from engaging the face hinge shaft 130, among other components. This preventative step can occur before or after the dock leveler 114 is extended, or both.

Operation 658, in some examples, includes disengaging the lip extender 602 from the lip extender support 608 by bringing the lip assembly 128 into contact with the truck/trailer 162. When the lip assembly 128 rests upon the truck/trailer 162, the forces maintaining the lip extender 602 in engagement with the lip extender support 608 are released, allowing the lip extender to drop and rotatably swing downwards, away from the lip extender support 608.

Operation 660, in come examples, includes preventing the lip extender 602 from rotation to an angle greater than 90 degrees (or greater than 45 degrees or any other acute angle) with respect to the deck plate using the relief mechanism 616 fixed to the deck plate 142. After the lip extender 602 drops downwards after disengaging the lip extender support 608, the relief mechanism 616 can catch the lip extender 602, confining its movement and halting any swinging back and forth.

In some examples, where no truck/trailer 162 is present, and the lip assembly is not brought into contact with the truck/trailer 162, the method may include disengaging the lip extender 602 from the lip extender support 608 by contacting the belly 614 of the lip extender 602 with the deck plate 142 or the relief mechanism 616. The extent to which the belly 614 projects proximally (or the extend the deck plate 142 or the relief mechanism 616 project distally) will determine the point during the extending of the dock leveler 114 that the lip extender 602 will disengage from the lip extender support 608. For example, if the belly 614 projects substantially in the proximal direction, then the lip extender 602 may disengage the lip extender support 608 substantially before the lip plate 152 and the deck plate 142 are near parallel with one another. In some examples, the belly 614 of the lip extender 602 is configured to disengage the lip extender 602 after the lip plate 152 would typically come into contact with the truck/trailer 162.

Operation 662, in some examples, includes lowering the dock leveler 114 to a lowered position. The dock leveler 114 may be lowered after reaching an extended position. The dock leveler 114 may be retracted and pulled backwards such that the lip plate 152 slides off of the truck/trailer 162. If the operator does not continue to pull the dock leveler 114 all the way backwards to a lifted position, before lowering, then the lip extender 602 will not engage the lip extender support 608. If the lip extender 602 does not engage the lip extender support 608, then the dock leveler 114 can be freely lowered to a lowered position.

Applying a powder coating, as described herein, to surfaces of the dock leveler 114 increases friction on one or more traction surfaces 702 of the deck plate 142 or the lip plate 152 of the dock leveler 114. The traction surfaces 702 may be the same as or different than the traction surfaces 144 and 146 described above. The powder coating can be applied to any and all surfaces of the dock leveler 114 to increase friction thereon. For example, the traction surfaces 702 can be any surfaces of the dock leveler 114. In some examples the traction surfaces 702 include the upward facing surfaces of the deck plate 142 and the lip plate 152. In some examples, the traction surfaces 702 include the bumpers 122. The powder coating is applied to the traction surfaces 702 to increase friction and increase the amount of traction between the dock leveler 114 and the vehicles, equipment, cargo, humans, robots, etc. traversing the gap between the dock 109 and the truck/trailer 162.

Figure 58:
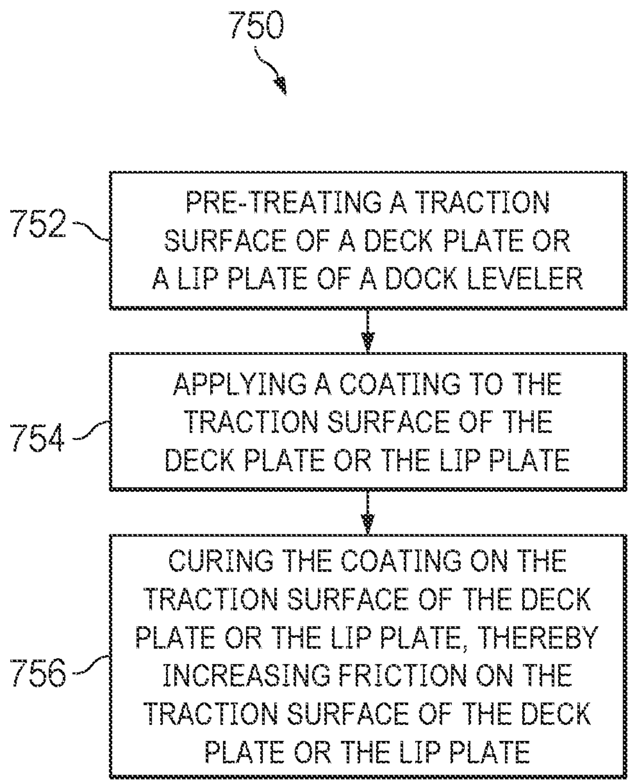
FIG. 58 is an illustrative method for increasing friction on a traction surface of a deck plate or a lip plate of a dock leveler in accordance with an example of the present disclosure.

FIG. 58 shows an example of a method for increasing friction on a traction surface of a deck plate or a lip plate of a dock leveler. While FIG. 58 illustrates illustrative operations according to one example, other examples may omit, add to, reorder, and/or modify any of the operations shown in FIG. 58. The method can be applied to any surface or any component of the dock leveler 114.

Operation 752, in some examples, includes pre-treating a traction surface 702 of the deck plate 142 or the lip plate 152 of the dock leveler. Pre-treating the traction surface 702 can include cleaning the traction surface 702 of the deck plate 142 or the lip plate 152 with a cleaning solution. In some examples, cleaning the traction surface 702 includes spraying the cleaning solution on the traction surface 702 or dipping the traction surface 702 into the cleaning solution. In some examples, pre-treating the traction surface 702 of the deck plate 142 or the lip plate 152 may include blasting the traction surface 702 with a shot-blasting material. The shot-blasting material can include, metal, glass, or walnut shells, among other materials. Furthermore, the shot-blasting material can further include a primer.

Pre-treating the traction surface 702 can also include conditioning the traction surface 702 of the deck plate 142 or the lip plate 152 with a conditioner. Furthermore, pre-treating the traction surface 702 can also include laying a chemical conversion coating on the traction surface 702 of the deck plate 142 or the lip plate 152. The chemical conversion coating may be a zinc phosphate, an iron phosphate, zirconium, or any combination thereof, among other materials. In some examples, the steps of conditioning the traction surface 702 and laying a chemical conversion coating on the traction surface 702 can performed simultaneously. In such instances, a phosphate conditioner can be used as both the conditioner and the chemical conversion coating.

Pre-treating the traction surface 702 may further include sealing the traction surface 702 of the deck plate 142 or the lip plate 152 with a sealer. The sealer may be a chrome sealer, a non-chrome sealer, or a dry-in-place sealer. Pre-treating the traction surface 702 may further include rinsing the traction surface 702. In some examples, tap water is used to rinse the traction surface 702. In other examples, the water may be treated using a reverse osmosis process and/or a deionization process prior to the rinsing. Pre-treating the traction surface 702 may further include drying the traction surface 702 of the deck plate 142 or the lip plate 152.

Operation 750, in some examples, includes applying a coating to the traction surface 702 of the deck plate 142 or the lip plate 152. In some examples, the coating is a thermosetting super durable polyester powder coating comprising friction-increasing particles. The durable polyester powder coating increases the coefficient of friction on the traction surface, while being extremely durable. Increasing the coefficient of friction provides greater traction across the dock leveler 114. In some examples, the coating is applied to the traction surface 702 using an electrostatic powder spray gun. It may be advantageous for the electrostatic powder spray gun to operate in a range of 60 kV to 100 kV to apply the coating to the traction surface 702 of the deck plate 142 or the lip plate 152.

Operation 752, in some examples, includes curing the coating on the traction surface 702 of the deck plate 142 or the lip plate 152, thereby increasing friction on the traction surface 702. After curing, at least some of the friction-increasing particles of the coating can engage the traction surface 702. Further, at least some of the friction-increasing particles may disrupt an upper surface of the cured coating to affect a coefficient of friction of the cured coating. The above-mentioned aspect of the cured coating may lead to a scenario where a coefficient of friction of the cured coating is higher than a coefficient of friction of an uncoated traction surface. Sometime, the difference between the coefficient of friction of the cured coating and the uncoated traction surface may be within a range of 0.1-0.5.

Curing the coating may be performed using one or more ovens, and the one or more ovens can include a direct gas convection oven, an indirect gas convection oven, an electric oven, an infrared oven, or any combination thereof. In some examples, the one or more ovens cure the coating in a range of 9 minutes to 11 minutes at a peak temperature of the deck plate 142 or the lip plate 152 in a range of 320 to 360 degrees Fahrenheit.

The methods and operations described above can be applied to the dock leveler 114 as described herein. If applied to the dock leveler 114, a coefficient of friction of the coated traction surface of the deck plate, the lip plate, or any other component of the dock leveler 114 can be higher than a coefficient of friction of the traction surface before coating. Furthermore, the dock leveler 114 may comprise at least one of the bumpers 122 attached to the vertical wall 111 of the dock 109 and the at least one of the bumpers 122 may be coated with the thermosetting durable polyester powder coating as described.

The example described herein is an edge of dock leveler. However, in other embodiments, the dock leveler 114 may be used in any dock-leveling application, including pit levelers, vertical loading, or other type of levelers and applications. Moreover, the illustrated embodiments may show a mechanical dock leveler; however, the disclosure is not intended to be so limited. Instead, the disclosure includes dock leveler actuated according to any suitable method, including hydraulicly-powered, air-powered, or otherwise powered dock levelers.

In the description, specific details have been set forth describing some examples. Numerous specific details are set forth in order to provide a thorough understanding of the examples. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure.

Elements described in detail with reference to one example, example, implementation, or application optionally may be included, whenever practical, in other examples, implementations, or applications in which they are not specifically shown or described. For example, if an element is described in detail with reference to one example and is not described with reference to a second example, the element may nevertheless be claimed as included in the second example. Thus, to avoid unnecessary repetition in the foregoing description, one or more elements shown and described in association with one example, implementation, or application may be incorporated into other examples, implementations, or application unless specifically described otherwise, unless the one or more elements would make an example or implementation non-functional, or unless two or more of the elements provide conflicting functions. Similarly, it should be understood that any particular element, including a system component or a method process, is optional and is not considered to be an essential feature of the present disclosure unless expressly stated otherwise.

Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure. In addition, dimensions and temporal relationships provided herein are for providing specific examples and it is contemplated that different sizes, dimensions, relationships and/or ratios may be utilized to implement the concepts of the present disclosure. To avoid needless descriptive repetition, one or more components or actions described in accordance with one illustrative example can be used or omitted as applicable from other illustrative examples. For the sake of brevity, the numerous iterations of these combinations will not be described separately. For simplicity, in some instances the same reference numbers are used throughout the drawings to refer to the same or like parts.

The methods described herein are illustrated as a set of operations or processes. Not all of the illustrated processes may be performed in all examples of the methods. Additionally, one or more processes that are not expressly illustrated or described may be included before, after, in between, or as part of the example processes. In some examples, one or more of the processes may be performed by a controller and/or may be implemented, at least in part, in the form of executable code stored on non-transitory, tangible, computer or machine-readable media that when run by one or more processors may cause the one or more processors to perform one, some, or all of the processes described in relation to the methods herein. Elements illustrated in block diagrams herein may be implemented with hardware, software, firmware, or any combination thereof. One block element being illustrated separate from another block element does not necessarily require that the functions performed by each separate element requires distinct hardware or software but rather they are illustrated separately for the sake of description.

One or more elements in examples of this disclosure may be implemented in software to execute on one or more processors of a computer system such as a controller. When implemented in software, the elements of the examples of the present disclosure are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one example, the control system supports wireless communication protocols such as Bluetooth, IrDA, HomeRF, IEEE 802.11, DECT, and Wireless Telemetry.

In some instances, well-known methods, procedures, components, and circuits have not been described in detail so as not to unnecessarily obscure aspects of the examples. While certain exemplary examples of the present disclosure have been described and shown in the accompanying drawings, it is to be understood that such examples are merely illustrative of and not restrictive on the broad disclosure herein, and that the examples of the present disclosure should not be limited to the specific constructions and arrangements shown and described, since various other modifications may occur to those ordinarily skilled in the art.

In view of all the teachings herein, the present disclosure contemplates a variety of different aspects including but not limited to the following:

Consistent with some examples, a dock leveler comprises a deck plate and a lip assembly hingedly connected to the deck plate. The lip assembly comprises a lip plate and a lip subplate. The lip plate includes a traction side and a bottom side and has a lip plate crown. The lip subplate includes a top side and a bottom side and has a lip subplate crown. The lip subplate is coupled to a bottom side of the lip plate in a manner that provides structural rigidity to the lip plate. The lip subplate crown is aligned and nested with the lip plate crown.

In some examples, the lip subplate may comprise cutouts configured to receive attachment lug hinges on the lip plate. The lip plate may comprise a proximal end and a distal end, the proximal end being disposed adjacent the deck plate. The lip subplate may also comprises a proximal end and a distal end, a portion of the proximal end of the lip plate and the proximal end of the lip subplate being aligned. A second portion of the proximal end of the lip plate and the proximal end of the lip subplate may be offset. The deck plate may comprise a distal end and a proximal end and when the dock leveler is in an extended position the distal end of the deck plate may abut against the proximal end of the lip plate and may not abut against the lip subplate.

In some examples, the lip plate has a lip plate width and the lip subplate has a subplate width, the subplate width may be in a range of about 20-70% of the lip plate width. The lip subplate may have a thickness of about 50-150% of a thickness of the lip plate. The lip subplate crown and the lip plate crown may be substantially flush against one another. A portion of the lip subplate may cover more than half a width of the lip plate, and another portion of the lip subplate may cover less than half a width of the lip plate.

In some examples, the lip subplate crown may separate the lip subplate into a distal portion and a proximal portion, and the lip plate crown may separate the lip plate into a distal portion and a proximal portion. The distal portion of the lip subplate may have an average width less than half of an average width of the distal portion of the lip plate. The lip subplate crown may separate the lip subplate into a distal portion and a proximal portion. The distal portion of the lip subplate may have an average width shorter than an average width of the proximal portion of the lip subplate. The lip subplate may be coupled to the bottom side of the lip plate by at least one weld.

Consistent with some examples, a lip assembly on a dock leveler may comprise a lip plate and a lip subplate. The lip plate may include a traction side and a bottom side and may have a lip plate crown. The lip subplate may include a top side and a bottom side and may have a lip subplate crown. The lip subplate may be coupled to a bottom side of the lip plate in a manner that provides structural rigidity to the lip plate. The lip subplate crown may be aligned and nested with the lip plate crown.

In some examples, the lip subplate may comprise cutouts configured to receive attachment lugs hinges on the lip plate. The lip plate may comprise a proximal end and a distal end, and the proximal end may be disposed adjacent a deck plate. The lip subplate may also comprises a proximal end and a distal end, and a portion of the proximal end of the lip plate and the proximal end of the lip subplate may be aligned. In some examples, the lip plate may also comprise a proximal end and a distal end, the proximal end may be disposed adjacent a deck plate. The lip subplate may also comprises a proximal end and a distal end, and a portion of the proximal end of the lip plate and the proximal end of the lip subplate may be offset.

In some examples, a deck plate may comprise a distal end and a proximal end, and when the dock leveler is in an extended position the distal end of the deck plate may abut against the proximal end of the lip plate and may not abut against the lip subplate. When the dock leveler is in an extended position, the lip subplate may overlap the deck plate. When the dock leveler is in an extended position, a distal end of the deck plate may mate with both the proximal end of the lip plate and the proximal end of the lip subplate. The lip subplate crown and the lip plate crown may be substantially flush against one another.

Consistent with some examples, a dock leveler comprises a face plate and a pivot anchor. The face plate is disposed to abut against a wall of a dock. The pivot anchor projects laterally away from the face plate, The pivot anchor has a pivot hole configured to receive a pivot pin of the dock leveler. The pivot anchor comprises a top portion and a bottom portion. The top portion is configured to abut against the face plate and having at least one protrusion configured to couple with at least one hole in the face plate of the dock leveler. The bottom portion is disposed below the face plate and has a support surface configured to contact a wall of a dock.

In some examples, the pivot hole may be positioned in the bottom portion. The at least one protrusion may be oriented in substantially a same direction as the support surface. A height of the at least one protrusion may be less than half a height of the top portion. A height of the bottom portion may be greater than a height of the top portion. A first protrusion of the at least one protrusion may extend from an uppermost wall of the pivot anchor. A second protrusion of the at least one protrusion may extend from a recess in the top portion of pivot anchor.

In some examples, a bottom edge of the bottom portion may be positioned lower on the wall of the dock than a bottom edge of the face plate. The pivot anchor may be centered about a length of the face plate when the top portion is coupled to the face plate. A length of pivot anchor may less than a height of the pivot anchor.

Consistent with some examples, a dock leveler comprises a face plate disposed to abut against a wall of a dock and a pivot anchor. The pivot anchor comprises a first body projecting laterally away from the face plate, the first body having a first hole configured to receive a pivotable member of the dock leveler. The first body comprises a first top portion extending from the face plate. The first body further comprises a first bottom portion disposed below the face plate and having a first support surface configured to contact the wall of a dock. A first bottom edge of the first bottom portion is positionable lower on the wall of the dock than a bottom edge of the face plate.

The at least one protrusion of the first top portion may be oriented in substantially a same direction as the first support surface, respectively. A height of the at least one protrusion of the first top portion may be less than half a height of the first top portion.

In some examples, a first protrusion of the at least one protrusion of the first top portion may extend from an uppermost wall of the first body. A second protrusion of the at least one protrusion of the first top portion may extend from a first recess in the first top portion of the first body. A height of the first and second bottom portions may be greater than a height of the first and second top portions, respectively.

In some examples, the pivot anchor may further comprise a second body projecting laterally away from the face plate, the second body having a second hole configured to receive the pivotable member of the dock leveler. The second body may comprise a second top portion extending from the face plate. The second body may further comprise a second bottom portion disposed below the face plate and having a second support surface configured to contact the wall of the dock. A second bottom edge of the second bottom portion may be positionable lower on the wall of the dock than the bottom edge of the face plate.

In some examples, the first and second body, collectively, may be centered about a length of the face plate when the first and second top portions are coupled to the face plate.

Consistent with some examples, a pivot anchor comprises at least one body configured to project laterally away from a face plate of a dock leveler and having a hole configured to receive a pivot pin of the dock leveler. The at least one body comprises a top portion configured to abut against the face plate, the top portion having at least one protrusion configured to couple with at least one hole in a face plate of the dock leveler. The at least one body further comprises a bottom portion disposed below the face plate and having a support surface configured to contact a wall of a dock.

Consistent with some examples, a dock leveler comprises a counterbalancing assembly comprising a spring and an anchor plate. The anchor plate spans a width of the spring to permit coupling of the counterbalancing assembly and a linkage system. The anchor plate comprises a first end portion wrapped around a first outer surface of a spring of the dock leveler to secure the anchor plate to the spring, a middle portion adjacent the first end portion, and a second end portion adjacent the middle portion, the second end portion wrapped around a second outer surface of the spring to secure the anchor plate to the spring.

In some examples, the anchor plate and the spring may forcibly secure themselves to one another. The first end portion may have a first curved inner surface that extends greater than 90 degrees, but less than 180 degrees about a longitudinal axis of the first end portion. The first end portion may have a first curved inner surface that extends equal to or greater than 180 degrees about a longitudinal axis of the first end portion. The second end portion may a second curved inner surface that extends greater than 90 degrees, but less than 180 degrees about a longitudinal axis of the second end portion.

In some examples, the second end portion may have a second curved inner surface that extends equal to or greater than 180 degrees about a longitudinal axis of the second end portion. The anchor plate may be configured to couple to the linkage system through a hole defined in the middle portion. The hole may be threaded and may be configured to receive a threaded connection member of the linkage system. A tension of the spring may be manipulated by rotating the threaded connection member in and out of the hole.

Consistent with some examples, a dock leveler comprises at least one spring having a first end and a second end, the first end coupled to a face plate of the dock leveler. The dock leveler further comprises at least one anchor plate spanning a width of the second end of the at least one spring to permit coupling of the at least one spring and a linkage system of the dock leveler. The at least one anchor plate comprises a first end portion wrapped around a first outer surface of the second end of the at least one spring to secure the at least one anchor plate to the at least one spring, a middle portion adjacent the first end portion, and a second end portion adjacent the middle portion, the second end portion wrapped around a second outer surface of the second end of the at least one spring to secure the at least one anchor plate to the at least one spring.

In some examples, the at least one anchor plate and the at least one spring may forcibly secure themselves to one another, respectively. The first end portion may a first curved inner surface that extends greater than 90 degrees, but less than 180 degrees about a longitudinal axis of the first end portion. The first end portion may have a first curved inner surface that extends equal to or greater than 180 degrees about a longitudinal axis of the first end portion. The second end portion may have a second curved inner surface that extends greater than 90 degrees, but less than 180 degrees about a longitudinal axis of the second end portion.

In some examples, the second end portion may have a second curved inner surface that extends equal to or greater than 180 degrees about a longitudinal axis of the second end portion. The at least one anchor plate may be configured to couple to the linkage system through a hole defined in the middle portion. The hole may be threaded and may be configured to receive a threaded connection member of the linkage system. A tension of the at least one spring may be manipulated by rotating the threaded connection member in and out of the hole.

Consistent with some examples, a spring anchor comprises an anchor plate configured to span a width of a spring of a dock leveler to permit coupling of a counterbalancing assembly and a linkage system of the dock leveler. The anchor plate comprises a first end portion configured to wrap around a first outer surface of a spring of the dock leveler to secure the anchor plate to the spring, a middle portion adjacent the first end portion, and a second end portion adjacent the middle portion, the second end portion configured to wrap around a second outer surface of the spring to secure the anchor plate to the spring.

In some examples, the anchor plate and the spring may be configured to forcibly secure themselves to one another.

Consistent with some examples, a dock leveler comprises a lift lever operably graspable by a user to lift, lower, and extend the dock leveler. The dock leveler further comprises a lift lever retainer having an opening shaped and sized to slidably receive the lift lever. The lift lever comprises a top portion including a handle graspable by a user, a middle portion adjacent the top portion, and a bottom portion adjacent the middle portion, the bottom portion engageable with the lift lever retainer when lifting, lowering, or extending the dock leveler. The lift lever further comprises a stopper disposed on the middle portion or on the top portion. A combined width of the lift lever and the stopper is greater than a width of the opening of the lift lever retainer.

In some examples, the stopper may be sized larger than the opening of the lift lever retainer in a manner that prevents the portions of the lift lever above the stopper from sliding downwardly through the opening of the lift lever retainer. The stopper may be located on the lift lever at a position that prevents contact between the handle and the lift lever retainer when the lift lever is moved to a stowed position. The stopper may be configured to absorb an impact force generated when the lift lever is dropped through the lift lever retainer. The stopper may be formed of a material different than the material of the of the lift lever retainer. The stopper may be a polymer, and the lift lever retainer may be a metal.

In some examples, the handle may form a first angle between a first side of the handle and the lift lever and a second angle between a second side of the handle and the lift lever. The first angle may be smaller than the second angle. The stopper may be disposed on the first side of the handle and/or the first side of the lift lever. The stopper may be a metal or a metal alloy. An end cap may be disposed on a top end of the handle.

Consistent with some examples, a dock leveler comprises a selectively stowable lift lever operably graspable by a user to lift, lower, and extend the dock leveler. The dock leveler further comprises a lift lever retainer having an opening shaped and sized to slidably receive the lift lever. The lift lever comprises a top portion including a handle graspable by a user, a middle portion adjacent from the top portion having a first hole configured to receive a first blocking mechanism to prevent the portions of the lift lever above the first hole from sliding downwardly through the opening of the lift lever retainer, and a bottom portion adjacent the middle portion, the bottom portion engageable with the lift lever retainer when lifting, lowering, and extending the dock leveler.

In some examples, when the bottom portion of the lift lever has engaged the opening of the lift lever retainer and the first hole has received the first blocking mechanism, the lift lever may be configured to be used to operate the dock leveler, stowed in a raised position, and/or removed from the lift lever retainer.

In some examples, a width of the first blocking mechanism may be greater than a width of the opening of the lift lever retainer. The first hole may be in a bottom end of the middle portion of the lift lever. The bottom portion may have a second hole configured to receive a second blocking mechanism to prevent the portions of the lift lever above the second hole from sliding upwardly through the opening of the lift lever retainer.

In some examples, when the bottom portion of the lift lever has engaged the opening of the lift lever retainer and the second hole has received the second blocking mechanism, the lift lever may be configured to be used to operate the dock leveler, stowed in a lowered position, and/or irremovable from the lift lever retainer. In some examples, when the bottom portion of the lift lever has engaged the opening of the lift lever retainer, the first hole has received the first blocking mechanism, and the second hole has received the second blocking mechanism, the lift lever may be configured to be used to operate the dock leveler, stowed in a raised position, and/or irremovable from the lift lever retainer.

In some examples, a width of the second blocking mechanism may be greater than a width of the opening of the lift lever retainer. In some examples, the first blocking mechanism may be movably coupled to the dock leveler.

Consistent with some examples, a dock leveler comprises a lift lever operably graspable by a user to lift, lower, and extend the dock leveler. The dock leveler further comprises a lift lever retainer having an opening shaped and sized to slidably receive the lift lever. The lift lever comprises a top portion including a handle graspable by a user, a middle portion adjacent from the top portion, and a bottom portion engageable with the lift lever retainer when lifting, lowering, and extending the dock leveler. The lift lever may further comprise a stopper, and a combined width of the lift lever and the stopper is greater than a width of the opening of the lift lever retainer. The middle portion may have a hole configured to receive a blocking mechanism to prevent the portions of the lift lever above the hole from sliding downwardly through the opening of the lift lever retainer.

Consistent with some examples, a dock leveler comprises a maintenance strut rotatable between a maintenance position and a stowed position, the maintenance strut being configured to secure the dock leveler in an accessible position when in the maintenance position. The maintenance strut has a latch hole and a pivot hole formed therein. The dock leveler further comprises a latch configured to selectively maintain the maintenance strut in the maintenance position or the stowed position. The latch comprises a pin selectively extendable through the latch hole, the pin having a first end and a second end, and a retainer having a first end fixedly attached to the first end of the pin and a second end selectively attachable to the second end of the pin.

In some examples, the dock leveler may further comprise a distally projecting gusset plate and a pivot shaft, the maintenance strut being rotatably coupled to the distally projecting gusset plate by the pivot shaft. The dock leveler may further comprise a face plate abuttable against a dock, the distally projecting gusset plate being fixed to the face plate. The distally projecting gusset plate may comprise a latch hole, the pin further selectively extendable through the latch hole in the distally projecting gusset plate.

In some examples, the dock leveler may further comprise a pivot shaft extending through the pivot hole in the maintenance strut, the maintenance strut rotatable about the pivot shaft between the maintenance position and the stowed position. The stowed position may be a hanging position. The maintenance position may be an upright position. When the latch is configured to maintain the maintenance strut in the upright position, the maintenance strut may be configured to hold the dock leveler in a lifted position. When the maintenance strut is configured to hold the dock leveler in the lifted position, the maintenance strut may extend higher than a deck plate of the dock leveler.

In some examples, the second end of the retainer may be selectively attachable to the second end of the pin through an opening in the second end of the retainer. The second end of the retainer may include a tab to facilitate the selective attachment of the retainer to the second end of the pin. The retainer may be semi-circular in shape.

Consistent with some examples, a method comprises rotatably coupling a maintenance strut to a dock leveler between a maintenance position and a stowed position, the maintenance strut being configured to secure the dock leveler in an accessible position when in the maintenance position, the maintenance strut having a latch hole and a pivot hole formed therein. The method further comprises selectively maintaining the maintenance strut in the maintenance position or the stowed position using a latch. The latch comprises a pin extendable through the latch hole, the pin having a first end and a second end, and a retainer having a first end fixedly attached to the first end of the pin and a second end selectively attachable to the second end of the pin.

In some examples, when the maintenance strut is maintained in the maintenance position, the dock leveler cannot be extended or lowered. In some examples, when the maintenance strut is maintained in the stowed position, the dock leveler can be lowered, extended, or lifted. Selectively attaching the second end of the retainer to the second end of the pin may include pushing an opening defined by the second end of the retainer over the second end of the pin. The second end of the retainer may include a tab used to push the opening defined by the second end of the retainer over the second end of the pin.

Consistent with some examples, a dock leveler comprises, a face plate disposable adjacent a dock wall, a gusset plate extending from the face plate, the gusset plate comprising a pivot hole and a latch hole, and a maintenance strut rotatable between a maintenance position and a stowed position, the maintenance strut being in an upright position configured to secure the dock leveler in an accessible position, the maintenance strut having a pivot hole and a latch hole formed therein. The dock leveler further comprises a pivot shaft extending through the pivot hole in the gusset plate and the pivot hole in the maintenance strut, the maintenance strut being rotatable about the pivot shaft. The dock leveler further comprises a latch configured to selectively maintain the maintenance strut in the maintenance position, the latch comprising a pin extendable through the latch hole in the gusset plate and the latch hole in the maintenance strut.

In some examples the dock leveler may further comprise a deck plate, the maintenance strut having a length greater than a width of the deck plate. The dock leveler may further comprises a lip plate attached to the deck plate, the maintenance strut being shorter than a height of the lip plate when the maintenance strut is in the maintenance position.

Consistent with some examples, a dock leveler comprises a face plate disposable adjacent a dock wall, a deck plate hingedly connected to the face plate, a lip assembly hingedly connected to the deck plate. The dock leveler further comprises a lip extender support coupled to the face plate, and a lip extender. The lip extender has a first end rotatably coupled to the lip assembly, and a second end selectively engageable with the lip extender support to extend the lip assembly with respect to the deck plate.

In some examples, the second end may include a bearing surface and a transverse surface sized and shaped to engage with the lip extender support. The lip extender support may be a roller, the roller rotatably coupled to a gusset plate extending from the face plate.

In some examples, the lip extender may have a proximal side and a distal side on opposing sides of a longitudinal axis of the lip extender, the proximal side forming a belly projecting proximally. The belly may be configured to contact the deck plate or a relief mechanism fixed to the deck plate to prevent the lip extender from engaging a hinge which connects the deck plate to the face plate. The lip extender may be configured to disengage the lip extender when the lip assembly is brought into contact with a truck/trailer. The deck plate or a relief mechanism fixed to the deck plate may be configured to contact the belly to disengage the lip extender from the lip extender support when the dock leveler is extended but does not extend onto a truck/trailer.

In some examples, the dock leveler may further comprise a relief mechanism having a first portion and a second portion, the first portion fixed to the deck plate. The second portion may be configured to prevent the lip extender from rotating to an angle greater than 90 degrees with respect to the deck plate.

Consistent with some examples, a method for operating a dock leveler comprises lifting the dock leveler to a lifted position. The dock leveler comprises a face plate disposable adjacent a dock wall, a deck plate hingedly connected to the face plate, a lip assembly hingedly connected to the deck plate, a lip extender support coupled to the face plate, and a lip extender. The lip extender has a first end rotatably coupled to the lip assembly, and a second end engageable with the lip extender support. The method further comprises extending the lip assembly of the dock leveler with respect to a deck plate, the extending comprising engaging the second end of the lip extender support with the lip extender.

In some examples, the second end may include a curved surface sized and shaped to engage with the lip extender support. The lip extender support may be a roller, the roller rotatably coupled to a gusset plate extending from the face plate.

In some examples, the lip extender may have a proximal side and a distal side on opposing sides of a longitudinal axis of the lip extender, the proximal side forming a belly projecting proximally. The method may further comprise contacting, with the belly, the deck plate or a relief mechanism fixed to the deck plate to prevent the lip extender from engaging a hinge which connects the deck plate and the face plate. The extending may further comprise disengaging the lip extender from the lip extender support by bringing the lip assembly into contact with a truck/trailer. When the lip assembly is not brought into contact with a truck/trailer, the extending may further comprise disengaging the lip extender from the lip extender support by contacting the belly of the lip extender with the deck plate or a relief mechanism fixed to the deck plate.

In some examples, the dock leveler may further comprise a relief mechanism having a first portion and a second portion, the first portion fixed to the deck plate. The method may further comprise preventing, using the second portion of the relief mechanism, the lip extender from rotating to angle greater than 90 degrees with respect to the deck plate.

Consistent with some examples, a dock leveler to bridge a gap between a dock and a vehicle comprises a deck plate movable between a raised and stowed position relative to the dock, a lip assembly hingedly connected to the deck plate, a lip extender support in a fixed location relative to the dock. The dock leveler further comprises a lip extender having a longitudinal axis: a first end having a through hole therethrough rotatably coupled to the lip assembly, and a second end selectively engageable with the lip extender support to extend the lip assembly with respect to the deck plate. The second end comprises a hook end having a bearing surface aligned transverse to the longitudinal axis and disposed to engage a top of the lip extender support. The second end also has a capture face disposed to engage a side of the lip extender support.

In some examples, the dock leveler may comprise a pivot limit structure that limits the rotational range of the lip extender.

Consistent with some examples, a method for increasing friction on a traction surface of a deck plate or a lip plate of a dock leveler comprises pre-treating the traction surface of the deck plate or the lip plate of the dock leveler, the traction surface having a first lower coefficient of friction. The method further comprises applying a coating to the traction surface of the deck plate or the lip plate of the dock leveler. The coating is a thermosetting super durable polyester powder coating comprising friction-increasing particles, the friction-increasing particles being applied as a part of the powder coating to the dock leveler. The method further comprises curing the coating on the traction surface of the deck plate or the lip plate of the dock leveler to increase friction on the traction surface of the deck plate or the lip plate to a second higher coefficient of friction.

In some examples, at least some of the friction-increasing particles may engage the traction surface of the deck plate or the lip plate. At least some of the friction-increasing particles may disrupt an upper surface of the cured coating to achieve the second higher coefficient of friction of the cured coating. Applying the coating to the traction surface of the deck plate or the lip plate of the dock leveler may include applying the coating to the traction surface of both the deck plate and the lip plate. The second higher coefficient of friction is within a range of 0.1-0.5 higher than the first lower coefficient of friction.

In some examples, applying the thermosetting super durable polyester powder coating to the traction surface of the deck plate or the lip plate may be performed using an electrostatic powder spray gun. The electrostatic powder spray gun may operate in a range of 60 kV to 100 kV to apply the thermosetting super durable polyester powder coating to the traction surface of the deck plate or the lip plate of the dock leveler.

In some examples, curing the thermosetting super durable polyester powder coating on the traction surface of the deck plate or the lip plate may be performed using one or more ovens. The one or more ovens may include a direct gas convection oven, an indirect gas convection oven, an electric oven, an infrared oven, or any combination thereof. The one or more ovens may cure the coating in a range of 9 to 11 minutes at a peak temperature of the deck plate or the lip plate in a range of 320 to 360 degrees Fahrenheit.

In some examples, pretreating the traction surface of the deck plate or the lip plate may include: cleaning the traction surface of the deck plate or the lip plate with a cleaning solution, conditioning the traction surface of the deck plate or the lip plate with a conditioner, laying a chemical conversion coating on the traction surface of the deck plate or the lip plate, sealing the traction surface of the deck plate or the lip plate with a sealer, rinsing the traction surface of the deck plate or the lip plate, and drying the traction surface of the deck plate or the lip plate.

In some examples, cleaning the traction surface of the deck plate or the lip plate may include spraying the cleaning solution on the traction surface of the deck plate or the lip plate or dipping the traction surface of the deck plate or the lip plate into the cleaning solution. Rinsing may be performed using water treated using a reverse osmosis process and/or a deionization process. The chemical conversion coating may be zinc phosphate, iron phosphate, zirconium, or any combination thereof. The sealer may be a chrome sealer, a non-chrome sealer, or a dry-in-place sealer. The conditioning and the laying a chemical conversion may be performed simultaneously, and a phosphate conditioner may be both the conditioner and the chemical conversion coating.

In some examples pretreating the traction surface of the deck plate or the lip plate may include blasting the traction surface of the deck plate or the lip plate with a shot-blasting material. The shot-blasting material may include metal, glass, coal, plastic, or walnut shells. The shot-blasting material may further include a primer.

Consistent with some examples, a dock leveler comprises: a face plate attached to a vertical wall of a loading dock, a deck plate hingedly connected to the face plate and having a traction surface, and a lip plate hingedly connect to the deck plate and having a traction surface. The traction surface of the deck plate or the traction surface of the lip plate has been coated with a thermosetting super durable polyester powder coating.

In some examples, a coefficient of friction of the coated traction surface of the deck plate or the lip plate may be higher than a coefficient of friction of the traction surface of the deck plate or the lip plate before being coated. In some examples, the method the dock leveler may further comprise at least one bumper attached to the vertical wall of the loading dock, and the at least one bumper may have a traction surface that has been coated with a thermosetting super durable polyester powder coating.

What is claimed is:

1. A dock leveler comprising:
- a deck plate; and
- a lip assembly hingedly connected to the deck plate, the lip assembly comprising:
  - a lip plate including a traction side, a bottom side, a lip plate crown, and a distal end; and
  - a lip subplate including a top side, a bottom side, a lip subplate crown, and a distal end, the lip subplate coupled to a bottom side of the lip plate in a manner that provides structural rigidity to the lip plate, wherein the lip subplate crown is aligned and nested with the lip plate crown, and wherein the distal end of the lip plate extends beyond the distal end of the lip subplate.

2. The dock leveler of claim 1, wherein the lip subplate comprises cutouts configured to receive attachment lug hinges on the lip plate.

3. The dock leveler of claim 2, wherein the lip plate comprises a proximal end and a distal end, the proximal end being disposed adjacent the deck plate, and wherein the lip subplate also comprises a proximal end and a distal end, a portion of the proximal end of the lip plate and the proximal end of the lip subplate being aligned.

4. The dock leveler of claim 3, wherein a second portion of the proximal end of the lip plate and the proximal end of the lip subplate are offset.

5. The dock leveler of claim 3, wherein the deck plate comprises a distal end and a proximal end, when the dock leveler is in an extended position the distal end of the deck plate abuts against the proximal end of the lip plate and does not abut against the lip subplate.

6. The dock leveler of claim 1, wherein the lip subplate has a thickness of about 50-150% of a thickness of the lip plate.

7. The dock leveler of claim 1, wherein the lip subplate crown and the lip plate crown are substantially flush against one another.

8. The dock leveler of claim 1, wherein a portion of the lip subplate covers more than half a width of the lip plate, and wherein another portion of the lip subplate covers less than half a width of the lip plate.

9. The dock leveler of claim 1, wherein the lip subplate crown separates the lip subplate into a distal portion and a proximal portion, and the lip plate crown separates the lip plate into a distal portion and a proximal portion, the distal portion of the lip subplate having an average width less than half of an average width of the distal portion of the lip plate.

10. The dock leveler of claim 1, wherein the lip subplate crown separates the lip subplate into a distal portion and a proximal portion, the distal portion of the lip subplate having an average width shorter than an average width of the proximal portion of the lip subplate.

11. The dock leveler of claim 1, wherein the lip subplate is coupled to the bottom side of the lip plate by at least one weld.

12. A lip assembly on a dock leveler, comprising:
- a lip plate including a traction side, a bottom side, a lip plate crown, and a distal end; and
- a lip subplate including a top side, a bottom side, a lip subplate crown, and a distal end, the lip subplate coupled to a bottom side of the lip plate in a manner that provides structural rigidity to the lip plate, wherein the lip subplate crown is aligned and nested with the lip plate crown, and wherein the distal end of the lip plate extends beyond the distal end of the lip subplate.

13. The lip assembly of claim 12, wherein the lip subplate crown and the lip plate crown are substantially flush against one another.

14. The lip assembly of claim 12, wherein the lip subplate comprises cutouts configured to receive attachment lugs hinges on the lip plate.

15. The lip assembly of claim 12, wherein the lip plate comprises a proximal end and a distal end, the proximal end being disposed adjacent a deck plate, and wherein the lip subplate also comprises a proximal end and a distal end, a portion of the proximal end of the lip plate and the proximal end of the lip subplate being offset.

16. The lip assembly of claim 12, wherein a deck plate comprises a distal end and a proximal end, when the dock leveler is in an extended position the distal end of the deck plate abuts against the proximal end of the lip plate and does not abut against the lip subplate.

17. A lip assembly on a dock leveler, comprising:
- a lip plate including a traction side and a bottom side and having a lip plate crown; and
- a lip subplate including a top side and a bottom side and having a lip subplate crown, the lip subplate coupled to a bottom side of the lip plate in a manner that provides structural rigidity to the lip plate, wherein the lip subplate crown is aligned and nested with the lip plate crown,
- wherein the lip plate comprises a proximal end and a distal end, the proximal end being disposed adjacent a deck plate, and wherein the lip subplate also comprises a proximal end and a distal end, a portion of the proximal end of the lip plate and the proximal end of the lip subplate being aligned.

18. The lip assembly of claim 17, wherein when the dock leveler is in an extended position, the lip subplate overlaps the deck plate.

19. The lip assembly of claim 17, wherein when the dock leveler is in an extended position, a distal end of the deck plate mates with both the proximal end of the lip plate and the proximal end of the lip subplate.

20. A dock leveler comprising:
- a deck plate; and
- a lip assembly hingedly connected to the deck plate, the lip assembly comprising:
  - a lip plate including a traction side and a bottom side and having a lip plate crown; and
  - a lip subplate including a top side and a bottom side and having a lip subplate crown, the lip subplate coupled to a bottom side of the lip plate in a manner that provides structural rigidity to the lip plate, wherein the lip subplate crown is aligned and nested with the lip plate crown, wherein the lip plate has a lip plate width and the lip subplate has a subplate width, the subplate width being in a range of about 20-70% of the lip plate width.

* * * * *